United States Patent
Lin-Hendel

(10) Patent No.: US 7,328,177 B1
(45) Date of Patent: Feb. 5, 2008

(54) SYSTEM AND METHOD FOR INTERACTIVE, COMPUTER ASSISTED PERSONALIZATION OF ON-LINE MERCHANDISE PURCHASES

(76) Inventor: Catherine Lin-Hendel, 18850 Blythswood Dr., Los Gatos, CA (US) 95030

( * ) Notice: Subject to any disclaimer, the term of this patent is extended or adjusted under 35 U.S.C. 154(b) by 797 days.

(21) Appl. No.: 09/619,255

(22) Filed: Jul. 19, 2000

Related U.S. Application Data

(60) Provisional application No. 60/144,712, filed on Jul. 20, 1999.

(51) Int. Cl.
G06F 17/30 (2006.01)
(52) U.S. Cl. ............... 705/27; 705/26; 707/5
(58) Field of Classification Search ............ 705/26–27; 707/5
See application file for complete search history.

(56) References Cited

U.S. PATENT DOCUMENTS

| | | | | |
|---|---|---|---|---|
| 5,724,522 A | * | 3/1998 | Kagami et al. ............ | 395/226 |
| 5,729,699 A | * | 3/1998 | Hashimoto et al. ......... | 395/227 |
| 5,943,049 A | * | 8/1999 | Matsubara et al. ......... | 345/338 |
| 6,091,417 A | * | 7/2000 | Lefkowitz .................. | 345/854 |
| 6,307,568 B1 | * | 10/2001 | Rom ......................... | 345/629 |
| 6,310,627 B1 | * | 10/2001 | Sakaguchi .................. | 345/630 |
| 6,317,718 B1 | * | 11/2001 | Fano .......................... | 705/1 |
| 6,327,588 B1 | * | 12/2001 | Danish et al. ................ | 707/3 |
| 6,384,835 B1 | * | 5/2002 | Reiter et al. ................ | 345/582 |
| 6,397,212 B1 | * | 5/2002 | Biffar ........................ | 707/5 |
| 6,404,426 B1 | * | 6/2002 | Weaver ...................... | 345/419 |
| 6,412,012 B1 | * | 6/2002 | Bieganski et al. .......... | 709/232 |
| 6,490,602 B1 | * | 12/2002 | Kraemer .................... | 715/513 |

FOREIGN PATENT DOCUMENTS

EP 1050830 * 8/2000

OTHER PUBLICATIONS

Bash, Reva, "searching in plain English", Link-up, Mar. 1994.*

* cited by examiner

*Primary Examiner*—Mark Fadok
(74) *Attorney, Agent, or Firm*—Jean-Marc Zimmerman

(57) ABSTRACT

A system and method for enabling on-line purchasers to customize and personalize their purchasing options by prompting the customer to indicate customer preferences regarding merchandise and services to be purchased on-line. The system and method use intelligent process and rule-driven inquiry-databases, intelligent product databases, artificial intelligence rules, data comparison algorithms, animation software, graphics and video input and output hardware and software and/or video streaming to (1) guide consumers in specifying customer preferences, (2) make purchasing recommendations to consumers, (3) narrow selections of merchandise or services, (4) determine the fit of merchandise, (5) configure and optimize various options of subsystems into a complete system, (6) layout, compose and/or animate merchandise or models wearing merchandise, and (7) display the fitted system of multiple items with the recommended and/or selected settings.

21 Claims, 81 Drawing Sheets

YAHOO! SHOPPING 

Shopping Home - Yahoo! - Help

Welcome, Guest

View Cart/Check Out - Order Status - Sign In

Yahoo! Shopping

Yahoo! prefers 

Featuring

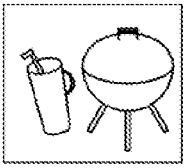

Swiss Army Officer's Watch $250
Buy it

New Featured Stores
- E-Com Plastics
- Aloha's Kona Coffee
- European-style Breads Yahoo! Resources
- Auctions
- Classifieds
- Yellow Pages
- Store Listings
- Get a Yahoo! Visa Card
- ClickRewards

Summer Shopping

Fun in the Sun NEW!
Woo hoo: summer's here! Before you head outside for a season of chillin' and grillin', browse our freshly picked selection of summer supplies. Hot stuff!

Star Wars merchandise section

Categories
Find your favorite products and brands, and compare prices.

[ Search ] [ All of Y! Shopping ▼ ]

Apparel & Accessories
Jewelry, Men's, Women's...

Books
Computers, Self-Help, Fiction...

Computers
Desktops, Software, Printers...

Electronics
Stereo, TV, Photography...

Flowers & Gifts
Balloons, Cards, Flowers, Cigars...

Food & Drink
Wine, Cheese, Chocolate, Coffee...

Health & Beauty
Bath & Body, Cosmetics, Supplements...

Home & Garden
Bed & Bath, Kitchen, Garden...

Movies & Video
Comedy, Drama, Science Fiction...

Music
Country, Jazz, R&B, Pop...

Office
Paper, Pens, Business Machines...

Sports & Fitness
Running, Golf, Outdoors...

Toys, Games & Hobbies
Beanies, Video Games, Collectibles...

Travel
Flights, Car Rentals, Hotels...

Copyright © 1994-99 Yahoo! Inc. All rights reserved. Privacy Policy - Security and Disclaimer
Questions, comments, suggestions? Send us feedback

*FIG. 2A*
*(PRIOR ART)*

YAHOO! APPAREL SHOPPING

Shopping Home - Yahoo! - Help

Welcome, Guest                           View Cart/Check Out - Order Status - Sign In Yahoo! Apparel and Accessories Shopping                           Apparel Home Home > Apparel and Accessories > Women's

Featuring

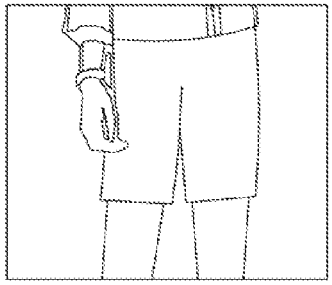

Womens RRS Stamina Shorts $14.99
Buy it

Yahoo! Top Sellers

1. The Heat Is On!(+): Bralette Set
2. The Hollywood Kiss: Bra (B & C Cups)
3. 3 Pack Butterfly: Panties (+): Crotchless 3 Pack
4. Smooth H20 Water Bra: Smooth H20 Bra
5. The Fantasy Bra: Bra
6. Soft Cotton Thongs: Solid Thong
7. Princess Mini Basque (+): 3 Piece Set
8. The Hollywood Kiss: Thong
9. It's A Jungle Out There!: 3 Pack Animal Print Thongs
10. Our Pretty Pump (+): Pump Newly Discounted Items 1. Wheat Print Tencel Dress: The Wheat Jacket — 40% off
2. Wheat Print Tencel Dress: The Dress — 31% off
3. Shakespeare Inspired Pearl Necklass — 11% off

Apparel and Accessories Categories

[            ] [Search] [All of Y! Shopping ▼]

- Accessories *(6703)*
- Athletic Wear *(204)*
- Coordinated Outfits *(12)*
- Dresses and Skirts *(146)*
- Hoisery *(190)*
- Junior's *(290)*
- Large and Tall *(372)*
- Lingerie and Sleepwear *(247)*
- Maternity *(6)*

- Outerwear *(59)*
- Pants *(73)*
- Petite *(42)*
- Shirts and Tops *(363)*
- Shoes *(200)*
- Shorts *(7)*
- Suits *(13)*
- Sweaters *(148)*
- more... *(9083)*

Shopping Ideas from Our Merchants

Women's Renaissance Stretch Woven Jacket    33.95

 Year 'round great looks...everyday ease. Classic style with notched collar and lapels, shoulder pads and single button closure. Wrinkle-free. Renaissance® stretch woven polyester: machine wash/dry. Made in USA.

from BLAIR Women's Wear CC

O.T.C. INTERNATIONAL:18" Sterling Hugs & Kisses Necklass   82.60

O.T.C INTERNATIONAL "Sterling Silver Hugs & Kisses 18 Inch Necklass" designed in an alternating X's and circles with a sturdy lobster claw clasp closure in polished finish. (18"L x 5/16"W) 35.28 grams. Karatage: Silver.

from netmarket

Tissot Mini PR 50 Basic   127.50

 Stainless steel case and bracelet, white dial, luminous hands, sweep second hand, silver stick hour markers, date at 3:00, sapphire crystal, 50 meters water resistance, battery end-of-life indicator. Swiss quartz movement. - One year factory warranty plus our FREE One Year Extended Warranty!

*FIG. 2B1*
*(PRIOR ART)*

Highlighted Merchants
- April Cornell
- BlueFly
- Bugle Boy
- Damart
- Fogdog Sports
- Frederick's of Hollywood
- Hanna Anderson
- J. Jill
- Lane Bryant
- Neiman Marcus - Essentials
- Road Runner Sports
- Silhouettes
- Tweeds Ladies 450 Series   371.25

 Stainless steel case and bracelet, black dial, luminous hands, sweep second hand, date, sapphire crystal, screw-down crown, unidirectional rotating bezel, double locking clasp with extender, 200 meter water resistant, swiss quartz movement, 30mm case - Two year factory warranty plus our FREE One Year Extended Warranty!

from Ashford.com

The Internet's Watch Store

Copyright © 1994-99 Yahoo! Inc. All rights reserved. Privacy Policy - Security and Disclaimer
Questions, comments, suggestions? Send us feedback

*FIG. 2B2*
*(PRIOR ART)*

YAHOO! APPAREL
SHOPPING

Shopping Home - Yahoo! - Help

Welcome, Guest                         View Cart/Check Out - Order Status - Sign In

| Yahoo! Apparel and Accessories Shopping | Apparel Home |

Home > Apparel and Accessories > Women's > Dresses and Skirts

Featuring

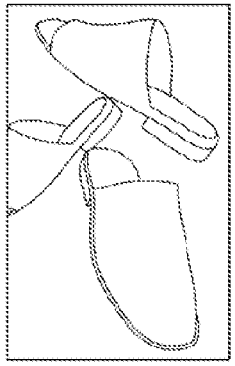

"Sandra" $69
Buy it

Apparel and Accessories Categories

[        Search  ] [ All of Y! Shopping ▼ ]

- Dresses *(87)*
- Juniors@ *(10)*
- Large and Tall@ *(75)*
- Skirts *(59)*

PLAY                                         AMERICA

Yahoo! Top Sellers
1. Bugle Boy Long Belted Denim Skirt
2. Velour Empire-Waist Dress: Velour Empire-Waist Dress: Size S-XL
3. Velour Short Skirt: Velour Short Skirt
4. Pleat-Front Sundress New
5. Sueded Silk Long Skirt
6. Antique Floral Knit Dress 30% Off
7. Knot-Strap Jumper New
8. Twill Bib Jumper
9. VANNA DRESS
10. Linen Sleeveless Dress Newly Discounted Items
1. Wheat Print Tencel Dress: The Wheat Jacket        40% off
2. Wheat Print Tencel Dress: The Dress        31% off
3. Shakespeare Inspired Pearl Necklass        11% off

*FIG. 2C1*
*(PRIOR ART)*

YAHOO! APPAREL
SHOPPING

Shopping Home - Yahoo! - Help

Welcome, Guest

View Cart/Check Out - Order Status - Sign In

Yahoo! Apparel and Accessories Shopping — Apparel Home

Home > Apparel and Accessories > Women's > Dresses and Skirts > Dresses

Featuring

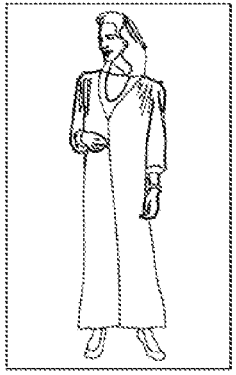

Linen Shirt Dress  $64
Buy it

Apparel and Accessories Categories

[ Search ] [ All of Y! Shopping ▼ ]

- Cocktail Dresses (5)
- Empire Waist (12)
- Jumpers (14)
- Long (18)
- Occasion Dresses (8)

- Pullovers (3)
- Sleeveless (11)
- Slip Dresses (3)
- more... (87)

Encarta 99 FREE after rebate from Beyond.com!

Yahoo! Top Sellers
1. Velour Empire-Waist Dress: Velour Empire-Waist Dress: Size S-XL
2. Pleat-Front Sundress New
3. Antique Floral Knit Dress 30% Off
4. Knot-Strap Jumper New
5. Embroidered Chiffon Shift Dress
6. Twill Bib Jumper
7. VANNA DRESS
8. Linen Sleeveless Dress
9. Crinkle Sheeting Jumper
10. Linen Shirt Dress Newly Discounted Items
1. Wheat Print Tencel Dress: The Wheat Jacket — 40% off
2. Wheat Print Tencel Dress: The Dress — 31% off
3. Shakespeare Inspired Pearl Necklass — 11% off

*FIG. 2C2*
*(PRIOR ART)*

YAHOO! APPAREL
*SHOPPING*

Shopping Home - Yahoo! - Help

Welcome, Guest

View Cart/Check Out - Order Status - Edit Acct - Sign In

Apparel: Found 12 products for "empire waist dresses"

Apparel Home

| greatest hits cds | CDNOW |
|---|---|
| for only $9.99 | |

Get your music now and SAVE!

Products: 1 - 10 of 12 matching 'empire waist dresses':

V-Neck Dress     from HomeBlvd     $37.50

This easy-to-care for dress features a V-neck, empire waist and side seam pockets. We've added durability and shape retention y taping the shoulders. 50% polyester/50% cotton jersey. Click photo to enlarge. What size should you order? Click here.

A-Twill Long-Sleeve Empire Dress: B-Twill Empire Waist Dress     from HomeBlvd     $44.00

Features short sleeves with two chest pockets and shirred empire waist for comfort. 100% cotton twill. Click photo to enlarge. What size should you order? Click here.

Denim Empire Waist Dress     from HomeBlvd     $44.00

This soft bleached 100% cotton 6? oz. denim dress offers a perfect canas for art or embroidery. Features a button-front closure with a comfortable shirred waist, short-sleeves scoop neck and two patch pockets. Click Photo to enlarge. What size should you order? Click here.

Long Sleeve Empire Dress     from HomeBlvd     $47.00

Features a scoop neckline, twelve button-front closure and two chest pockets. 100% cotton 8oz. denim. Click photo to enlarge. What size should you order? Click here.

TROPICAL DRESS     from Alloy Online     $38.00

Rayon dress with adjustable straps and key-hole tie front. Medium is 3.5" long. Hidden back zipper.

GINGHAM DRESS     from Alloy Online     $39.00

Cotton/Lycra stretch empire waist gingham dress. Light yellow rosettes at straps. Medium is 33.5" long.

CHELSEA DRESS     from Alloy Online     $48.00

Plaid cotton dress with empire waist, navy blue contrast piping straps and hidden back zipper. Medium is 33.5" long JAMILI DRESS     from Alloy Online     $34.00

Poly/cotton fully lined empire waist dress with all-over eyelet embroidery, detailed border embroidery and back zip closure. Medium is 36" long.

Velour Empire-Waist Dress: Velour Empire-Waist Dress Size S-XL     from Tweeds     $48.00

*FIG. 2D1*
*(PRIOR ART)* shaped bodice to a fluid A-line skirt. Scooped neckline trimmed with stretch satin falls to above the ankle. Cotton/polyester velour. 53-1/4 length. american made. Machine wash.

Matte Jersey Empire Dress            from Tweeds      $104.00

 A Tweeds exclusive and most flattering with a square neckline, elbow-cropped sleeves and a subtle A-line shape. 100% polyester is Italian-inspired so it drapes with refined sensuality and fluid elegance. Falls to the ankle. 53" length. American made. Hand wash/dry clean.

| greatest hits cds | CDNOW |
|---|---|
| for only $9.99 | |

Get your music now and SAVE!

Next 2 Matches      Search Auctions

Search Yahoo! Shopping Again

| empire waist dresses | Search | All of Y! Shopping ▾ |

---

Copyright © 1994-99 Yahoo! Inc. All rights reserved. Privacy Policy - Security in Cyberspace.
Questions, comments, suggestions? Send us feedback

*FIG. 2D2*
*(PRIOR ART)*

Show  About  Contact  Go

V-Neck Dress

This easy-to-care for dress features a V-neck, empire waist and side seam pockets. We've added durability and shape retention y taping the shoulders. 50% polyester/50% cotton jersey.

Click photo to enlarge.
What size should you order? Click here

6012 $37.50 Colors: [A-Cadet Blue ▼] Sizes: [Small ▼] [Order]

Don't like ordering online? Click here.

Search for an item: [  ] [Search]

What if you could get *paid*...

Copyright © 1998  SECURE ONLINE  215-364-5567-phone
HomeBlvd, Inc. All rights reserved SHOPPING HERE 215-364-5568-fax
                 Terms and Conditions
All photographs used with permission a featured store on...Yahoo! Privacy Policy
                 SHOPPING

*FIG. 2E*
*(PRIOR ART)*

YAHOO! SHOPPING

Yahoo! - Help

Welcome, Guest                                    Edit Acct - Sign In

Yahoo! Shopping Cart          Yahoo! prefers  visa          Shopping Home

|  | Item | Store | Options | Unit Price | Quantity | Subtotal |  |
|--|------|-------|---------|------------|----------|----------|--|
|  | V-Neck Dress | HomeBlvd | Colors: A-Cadet Blue<br>Sizes: Small | 37.50 | 1 | 37.50 | Remove |

Total for HomeBlvd:  37.50

[ Place Order ]   [ Keep Shopping ]   [ Update Quantities ]

Search for another product

[                    ] [ Search ] [ All of Y! Shopping ▼ ]

---

Copyright © 1994-99 Yahoo! Inc. Security - Yahoo! Privacy Policy

*FIG. 2F*
*(PRIOR ART)*

YAHOO! SHOPPING 

Shopping Home - Yahoo! - Help

Welcome, Guest　　　　　　　　　　View Cart/Check Out - Order Status - Sign In

Yahoo! Shopping　　　　　　　　　　　　　　　Yahoo! prefers 

Featuring　　　　Summer Shopping

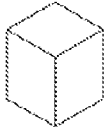

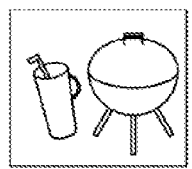

Fun in the Sun NEW!

Woo hoo: summer's here! Before you head outside for a season of chillin' and grillin', browse our freshly picked selection of summer supplies. Hot stuff!

Star Wars merchandise section

Microsoft Encarta 99
$40.00
Buy it

New Featured Stores
- E-Com Plastics
- Aloha's Kona Coffee
- European-style Breads Yahoo! Resources
- Auctions
- Classifieds
- Yellow Pages
- Store Listings
- Get a Yahoo! Visa Card
- ClickRewards Categories
Find your favorite products and brands, and compare prices.

[ Search ] [ All of Y! Shopping ▼ ]

Apparel & Accessories
Jewelry, Men's, Women's...

Books
Computers, Self-Help, Fiction...

Computers
Desktops, Software, Printers...

Electronics
Stereo, TV, Photography...

Flowers & Gifts
Balloons, Cards, Flowers, Cigars...

Food & Drink
Wine, Cheese, Chocolate, Coffee...

Health & Beauty
Bath & Body, Cosmetics, Supplements...

Home & Garden
Bed & Bath, Kitchen, Garden...

Movies & Video
Comedy, Drama, Science Fiction...

Music
Country, Jazz, R&B, Pop...

Office
Paper, Pens, Business Machines...

Sports & Fitness
Running, Golf, Outdoors...

Toys, Games & Hobbies
Beanies, Video Games, Collectibles...

Travel
Flights, Car Rentals, Hotels...

Copyright © 1994-99 Yahoo! Inc. All rights reserved. Privacy Policy - Security and Disclaimer
Questions, comments, suggestions? Send us feedback

FIG. 2G
*(PRIOR ART)*

YAHOO! APPAREL
*SHOPPING*

Shopping Home - Yahoo! - Help

Welcome, Guest    View Cart/Check Out - Order Status - Sign In

Yahoo! Apparel and Accessories Shopping    Apparel Home

Home > Apparel and Accessories > Women's

Featuring

Rayon Short Set $47
Buy it

Yahoo! Top Sellers
1. The Heat Is On!(+): Bralette Set
2. The Hollywood Kiss: Bra (B & C Cups)
3. 3 Pack Butterfly: Panties (+): Crotchless 3 Pack
4. Smooth H20 Water Bra: Smooth H20 Bra
5. The Fantasy Bra: Bra
6. Soft Cotton Thongs: Solid Thong
7. Princess Mini Basque (+): 3 Piece Set
8. The Hollywood Kiss: Thong
9. It's A Jungle Out There!: 3 Pack Animal Print Thongs
10. Our Pretty Pump (+): Pump

Newly Discounted Items
1. Wheat Print Tencel Dress: The Wheat Jacket    40% off

Apparel and Accessories Categories

[        Search  ] [ All of Y! Shopping ▼ ]

- Accessories *(6703)*
- Athletic Wear *(204)*
- Coordinated Outfits *(12)*
- Dresses and Skirts *(146)*
- Hoisery *(190)*
- Junior's *(290)*
- Large and Tall *(372)*
- Lingerie and Sleepwear *(247)*
- Maternity *(6)*
- Outerwear *(59)*
- Pants *(73)*
- Petite *(42)*
- Shirts and Tops *(363)*
- Shoes *(200)*
- Shorts *(7)*
- Suits *(13)*
- Sweaters *(148)*
- more... *(9083)*

Shopping Ideas from Our Merchants

Women's Renaissance Stretch Woven Jacket    33.95

 Year 'round great looks...everyday ease. Classic style with notched collar and lapels, shoulder pads and single button closure. Wrinkle-free. Renaissance ® stretch woven polyester: machine wash/dry. Made in USA.

from BLAIR Women's Wear CC

O.T.C. INTERNATIONAL:18" Sterling Hugs & Kisses Necklace 82.60

 O.T.C INTERNATIONAL "Sterling Silver Hugs & Kisses 18 Inch Necklace" designed in an alternating X's and circles with a sturdy lobster claw clasp closure in polished finish. (18"L x 5/16"W) 35.28 grams. Karatage: Silver.

from netmarket

Tissot Mini PR 50 Basic    127.50

 Stainless steel case and bracelet, white dial, luminous hands, sweep second hand, silver stick hour markers, date at 3:00, sapphire crystal, 50 meters water resistance, battery end-of-life indicator. Swiss quartz movement. - One year factory warranty plus our FREE One Year Extended Warranty!

from Ashford.com

*FIG. 2H1*
*(PRIOR ART)*

2. Wheat Print Tencel    31% off
   Dress: The Dress
3. Shakespeare Inspired  11% off
   Pearl Necklace Highlighted Merchants
- April Cornell
- BlueFly
- Bugle Boy
- Damart
- Fogdog Sports
- Frederick's of Hollywood
- Hanna Anderson
- J. Jill
- Lane Bryant
- Neiman Marcus - Essentials
- Road Runner Sports
- Silhouettes
- Tweeds

 Ladies 450 Series    371.25

Stainless steel case and bracelet, black dial, luminous hands, sweep second hand, date, sapphire crystal, screw-down crown, unidirectional rotating bezel, double locking clasp with extender, 200 meter water resistant, swiss quartz movement, 30mm case - Two year factory warranty plus our FREE One Year Extended Warranty!

from Ashford.com

Art.com: Where You Start For Art

---

Copyright © 1994-99 Yahoo! Inc. All rights reserved. Privacy Policy - Security and Disclaimer
Questions, comments, suggestions? Send us feedback

FIG. 2H2
(PRIOR ART)

YAHOO! APPAREL
*SHOPPING*

Shopping Home - Yahoo! - Help

Welcome, Guest                                    View Cart/Check Out - Order Status - Sign In Yahoo! Apparel and Accessories Shopping                              Apparel Home Home > Apparel and Accessories > Women's > Dresses and Skirts

Featuring

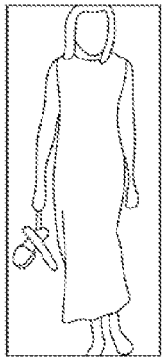

"Sleeveless Knit Dress"  $29
Buy it

Apparel and Accessories Categories

[                    ] [Search]  [All of Y! Shopping ▼]

- Dresses *(87)*
- Juniors@ *(10)*
- Large and Tall@ *(75)*
- Skirts *(59)*

Yahoo! Top Sellers
1. Bugle Boy Long Belted Denim Skirt
2. Velour Empire-Waist Dress: Velour Empire-Waist Dress: Size S-XL
3. Velour Short Skirt: Velour Short Skirt
4. Pleat-Front Sundress New
5. Sueded Silk Long Skirt
6. Antique Floral Knit Dress 30% Off
7. Knot-Strap Jumper New
8. Twill Bib Jumper
9. VANNA DRESS
10. Linen Sleeveless Dress

Newly Discounted Items
1. Wheat Print Tencel Dress: The Wheat Jacket — 40% off
2. Wheat Print Tencel Dress: The Dress — 31% off
3. Shakespeare Inspired Pearl Necklass — 11% off

*FIG. 21*
*(PRIOR ART)*

YAHOO! APPAREL
*SHOPPING*

Shopping Home - Yahoo! - Help

Welcome, Guest    View Cart/Check Out - Order Status - Sign In

Yahoo! Apparel and Accessories Shopping    Apparel Home

Home > Apparel and Accessories > Women's > Dresses and Skirts > Skirts

Featuring    Apparel and Accessories Categories

Raglan-Sleeve Tee  $34
Buy it

[ ] [Search] [All of Y! Shopping ▼]

- Long *(33)*
- Mid-Length *(6)*
- Short *(17)*
- Wrap *(3)* brother 600dpi Printer $236.95 Click Here   BUYCOMP *the Internet Superstore* Click Here   [Categories ▼] [ ] [GO]

Yahoo! Top Sellers
1. Bugle Boy Long Belted Denim Skirt
2. Velour Short Skirt: Velour Short Skirt
3. Sueded Silk Long Skirt
4. Velour Long Skirt: Velour Long Skirt
5. Sweater Skirt Newly Discounted Items
1. Wheat Print Tencel Dress: The Wheat Jacket    40% off
2. Wheat Print Tencel Dress: The Dress    31% off
3. Shakespeare Inspired Pearl Necklass    11% off

*FIG. 2J*
*(PRIOR ART)*

YAHOO! APPAREL
SHOPPING

Shopping Home - Yahoo! - Help

Welcome, Guest      View Cart/Check Out - Order Status - Edit Acct - Sign In

Apparel: Found 33 products in 8 stores for "long skirts"     Apparel Home

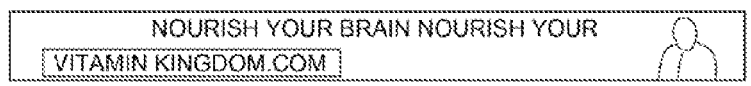
NOURISH YOUR BRAIN NOURISH YOUR
VITAMIN KINGDOM.COM

Products: Found 33 products in 8 stores matching "long skirts". Showing stores 1 - 8:

COMFY SKIRT     from Alloy Online - (First of 2 matches)     $28.00

 Soft cotton/poly jersey drawstring skirt with side slits and tonal contrast topstitch down center front and around hem. Medium is 42" long.

Velour Long Skirt: Velour Long Skirt     from Tweeds - (First of 24 matches)     $29.00

 A narrow column of plush velour with sophisticated european appeal. Soft, plush, drapey and very provocative with a high kick pleat in back. Elastic waist. Cotton/polyester blend. Falls to the ankle. 37-1/2" length. American made. Machine wash.

Easy Pieces-Skirt     from MerchantDirect - (1 match)     $69.00

 "I Need To Look Good Going From Day Into Evening So I Design 5 Easy Pieces That Can Go Anywhere. Mix And Match All Styles To Create Your Own Look." Skirt Textured Acetate Spandex Dry Clean Only Made In USA Of Imported Fabic Colors: Black Floral Print Georgette Skirt     from Smith & Hawken - (First of 2 matches)     $78.00

 Soft as a whisper and sheer as a fairy's wing, crinkled polyester georgette is fully lined to preserve propriety. This skirt is gently shirred at the waistband which is inset with elastic in back and buttons shut above the side zipper. Two slits at the seams, Dry clean. Imported. Sizes 4-16: falls...

Libertine Skirt     from girbaud online - (1 match)     $92.00

 Stretch & Nylon combination. Strategically placed pockets. Velcro snaps & Zippers secure personal cargo Theory Black Skirts (45% off)     from Bluefly - (1 match)     $115.00

 This Theory, 52% polyester 43% wool 5 % lycra. Sarah very straight, zip/tab fly, ankle length skirt has a center back slit. This style has stretch to the fabric and is constructed to give a slim silhouette. Dry clean only. Made in the USA.

Shirred Top with Butterflies: Fishtail Long...     from Cache - (1 match)     $175.00

 Capturing romantic appeal, cache's matte jersey fishtail long skirt is sleek yet sensous, it flows with grace.

Bugle Boy Long Belted Denim Skirt     from Bugle Boy - (1 match)     $14.00

 Made from 100% cotton. This A-Line button down skirt featues a braided belt. Imported. CARE INSTRUCTIONS Machine Wash Cold. Wash Seperately. Tumble Dry Low. Use Only Non-Chlorine Bleach When Needed. Do Not Dry Clean.

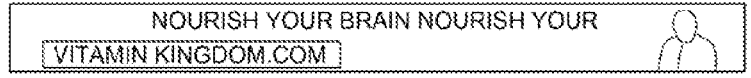
NOURISH YOUR BRAIN NOURISH YOUR
VITAMIN KINGDOM.COM

*FIG. 2K1*
*(PRIOR ART)*

Search Yahoo! Shopping Again

| long skirt | Search | All of Y! Shopping ▼ |

Copyright © 1994-99 Yahoo! Inc. All rights reserved. Privacy Policy - Security in Cyberspace.
Questions, comments, suggestions? Send us feedback

*FIG. 2K2*
*(PRIOR ART)*

| Smith&Hawken | catalog | company | store | |
| | site map | | | |
| | feedback | | | |

Home at home books clothing composting footwear and accessories for the birds furniture garden ornament gates and fencing gift certificate kids and games kitchen and dining lighting outdoor living plants pots and containers sale stone and statuary tools trellises and borders watering watering cans wreaths Show Order Info Help Search

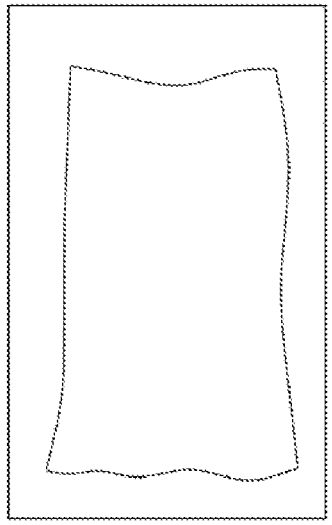

Floral Print Georgette Skirt

Soft as a whisper and sheer as a fairy's wing, crinkled polyester georgette is fully lined to preserve propriety. This skirt is gently shirred at the waistband, which is inset with elastic in back and buttons shut above the side zipper. Two slits at the seams. Dry-Clean. Imported. Sizes 4-16; falls 34" from waist.

Click for sizing info

Floral Print Georgette Skirt w611954 $78.00

Size: [ 6 ▼ ] [ Order ]

*FIG. 2L*
*(PRIOR ART)*

YAHOO! SHOPPING   Yahoo! - Help

Welcome, Guest                                                    Edit Acct - Sign In

| Yahoo! Shopping Cart | Yahoo! prefers | visa | Shopping Home |

| Item | Store | Options | Unit Price | Quantity | Subtotal | |
|---|---|---|---|---|---|---|
|  V-Neck Dress | HomeBlvd | Colors: A-Cadet Blue<br>Sizes: Small | 37.50 | 1 | 37.50 | Remove |
| 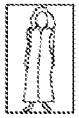 Floral Print Georgette Skirt | Smith & Hawken | Size: 6 | 78.00 | 1 | 78.00 | Remove |

Total:  115.50

[Place Order]  [Keep Shopping]  [Update Quantities]

Search for another product

[          ] [Search] [All of Y! Shopping ▼]

---

Copyright © 1994-99 Yahoo! Inc. Security - Yahoo! Privacy Policy

*FIG. 2M*
*(PRIOR ART)*

Show   About   Contact   Go

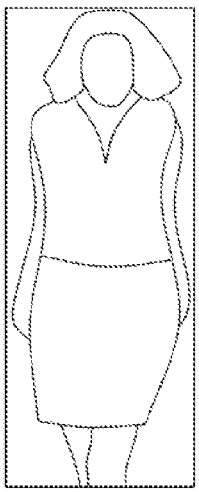

V-Neck Dress

This easy-to-care for dress features a V-neck, empire waist and side seam pockets. We've added durability and shape retention y taping the shoulders. 50% polyester/50% cotton jersey.

Click photo to enlarge.
What size should you order? Click here

6012   $37.50   Colors: [ A-Cadet Blue ▼ ]   Sizes: [ Small ▼ ]   [ Order ]

Don't like ordering online? Click here.

Search for an item: [          ]   [ Search ]

What if you could get *paid*...

Copyright © 1998
HomeBlvd, Inc. All rights reserved

All photographs used with permission

SECURE ONLINE
SHOPPING HERE a featured store on...Yahoo!
SHOPPING 215-364-5567-phone
215-364-5568-fax
Terms and Conditions
Privacy Policy

*FIG. 2N*
*(PRIOR ART)*

| Smith&Hawken | catalog | company | store | |
| | site map | | | |
| | feedback | | | |

Home
at home
books
clothing
composting
footwear and accessories
for the birds
furniture
garden ornament
gates and fencing
gift certificate
kids and games
kitchen and dining
lighting
outdoor living
plants
pots and containers
sale
stone and statuary
tools
trellises and borders
watering
watering cans
wreaths
Show Order
Info
Help
Search

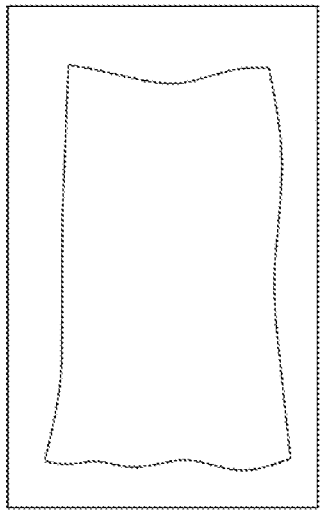

Floral Print Georgette Skirt

Soft as a whisper and sheer as a fairy's wing, crinkled polyester georgette is fully lined to preserve propriety. This skirt is gently shirred at the waistband, which is inset with elastic in back and buttons shut above the side zipper. Two slits at the seams. Dry-Clean. Imported. Sizes 4-16; falls 34" from waist.

Click for sizing info

Floral Print Georgette Skirt w611954  $78.00
Size: [ 4 ▼ ]  [ Order ]

*FIG. 20*
(PRIOR ART)

YAHOO! SHOPPING 

Shopping Home - Yahoo! - Help

Welcome, Guest      View Cart/Check Out - Order Status - Edit Acct - Sign In

Search Result: Found 4 products for "romantic dresses"      Shopping Home

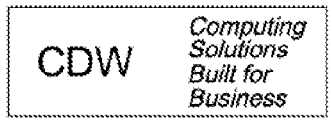 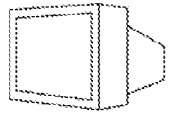

Products: 1 - 4 of 4 matching 'romantic dresses":

**Pug: A Romantic New Musician by *Original London***      $14.99 -
*Cast*      from Yahoo! Music Shopping      17.72

 Song List: Matter Of Minutes, A: That's My Father, Pretty Dresses: Come Away With Me (a); Ethel's Waltz (a);...
Facts: Available Formats: CD; Original Release Date: 07/14/95; Label: That's Entertainment; Stereo:

from Advantage Discount Bridal Gowns.
Bridesmaid Dresses, Tiaras, Bridal Shoes.      $41.95
Set 954      Accessories and Wedding Invitations.

 Set 954 A romantic and delicate set with hearts, pearls and rhinestones. This popular set can be worn for everyday too, making it a great choice for the bride and her bridesmaids. ENB954

Cotton Pointelle Cardigan      from Tweeds      $49.00

 Cotton Pointelle Cardigan Born to be worn over romantic skirts and dresses. Pointelle-stitched with a rare vintage feeling. Delicate in a budding flower motif, we've detailed it with crocheted trim and genuine shell buttons. Falls to mid-hip. American made. Hand wash or dry clean. 730771

Pointelle Ribbon Cardigan      from Tweeds      $74.00

 Pointelle Ribbon Cardigan Delicate and romantic enough to wear with dresses soft and feminine. Knit of a ribbon yarn in an open, allover pointelle diamond. Reach for it every sun-kissed day, breezy night. Polyester. Imported. Hand Wash. 732211

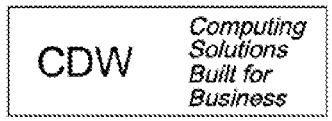 

Search product Catalog Again

| romantic dress | Search | All of Y! Shopping ▼ |

*FIG. 3A*
*(PRIOR ART)*

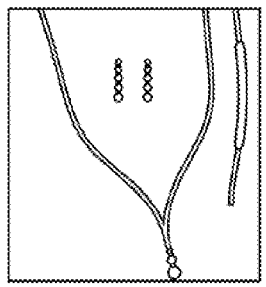

| | |
|---|---|
| Home |  Advantage Discount Bridal |
| Bridal Tiaras | |
| Gowns & Bridesmaids | |
| Flower Girls | |
| Shoes | |
| Jewelry | |
| Accessories | |
| Invitations | |
| Books, Software | |
| Shower Linens | |
| Undergarments | *Necklace, Earring and Bracelet Set 954* |
| Favors | |
| Gifts | A romantic and delicate set with hearts, pearls snd rhinestones. This popular set can be worn for everyday too, making it a great choice for the bride and her bridesmaids. |
| E-Mail | |
| Gown Reservation | |
| Show Order | Set 954 |
| Info | ENB954 $41.95 |
| Help | Setting/Pearl Color: [Silver/White ▼] [Order] |
| Search | |
| Index | |
| Y! SHOPPING | | http://st5.yahoo.com/advantagebridal/set954.html

*FIG. 3B*
(PRIOR ART)

TWEEDS
*american spirit...euro style...*

*home*
*intimates*
*blouses & tops*
*sweaters*
*pants & slacks*
*skirts*
*dresses*
*coats & jackets*
*shoes & accessories*
*special sale*
*travel*
*view order*
*order now*
*up a level*
*next*

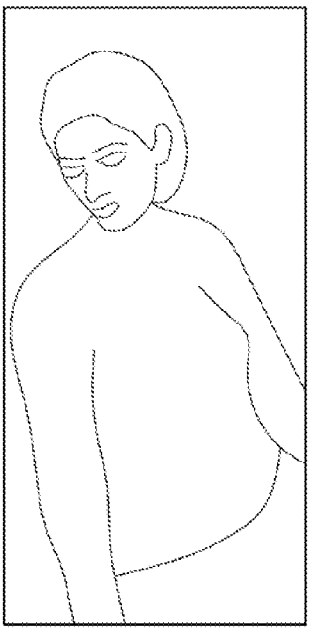

*Cotton Pointelle Cardigan*

Born to be worn over romantic skirts and dresses. Pointelle-stitched with a rare vintage feeling. Delicate in a budding flower motif, we've detailed it with crocheted trim and genuine shell buttons. Falls to mid-hip. american made. Hand wash or dry clean.

730771  $49.00  Color: [Buff ▼]  Size: [S ▼] [Order]

THIS IS A SECURE SITE

You can order on-line using our secure server, or by calling 1.800.999.7997 anytime
Please read Terms and Conditions for use of this site. Use of this site means you agree to the terms
Trademarks are owned by Tweeds, LLC or Hanover Holdings, Inc.

Web site design © 1998, Hanover Holdings, Inc.

*FIG. 3C*
(PRIOR ART)

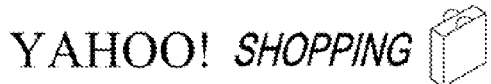

| | |
|---|---|
| Welcome, Guest | View Cart/Check Out - Order Status - Sign In |
| Yahoo! Shopping | Yahoo! prefers  |

Featuring

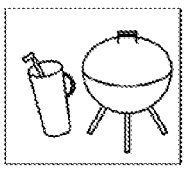

Swiss Army Officer's
Watch $250
Buy it

New Featured Stores
- E-Com Plastics
- Aloha's Kona Coffee
- European-style Breads Yahoo! Resources
- Auctions
- Classifieds
- Yellow Pages
- Store Listings
- Get a Yahoo! Visa Card
- ClickRewards Summer Shopping Fun in the Sun NEW!
Woo hoo: summer's here! Before you head outside for a season of chillin' and grillin', browse our freshly picked selection of summer supplies. Hot stuff!

Star Wars
merchandise
section

Catagories
Find your favorite products and brands, and compare prices.

↓ Click

| Skirt | Search | All of Y! Shopping ▼ |

Apparel & Accessories
Jewelry, Men's, Women's...

Books
Computers, Self-Help, Fiction...

Computers
Desktops, Software, Printers...

Electronics
Stereo, TV, Photography...

Flowers & Gifts
Balloons, Cards, Flowers, Cigars...

Food & Drink
Wine, Cheese, Chocolate, Coffee...

Health & Beauty
Bath & Body, Cosmetics, Supplements,...

Home & Garden
Bed & Bath, Kitchen, Garden...

Movies & Video
Comedy, Drama, Science Fiction...

Music
Country, Jazz, R&B, Pop...

Office
Paper, Pens, Business Machines...

Sports & Fitness
Running, Golf, Outdoors...

Toys, Games & Hobbies
Beanies, Video Games, Collectibles...

Travel
Flights, Car Rentals, Hotels...

Copyright © 1994-99 Yahoo! Inc. All rights reserved. Privacy Policy - Security and Disclaimer
Questions, comments, suggestions? Send us feedback

FIG. 3D
(PRIOR ART)

YAHOO! APPAREL
*SHOPPING*

Shopping Home - Yahoo! - Help

Welcome, Guest

View Cart/Check Out - Order Status - Edit Acct - Sign In

Shopping Home

Search Result: Found 2949 products in 283 stores for "skirts"

Categories: 10 matching 'skirts'

- Apparel and Accessories > Women's > Dresses and Skirts - 146 products
- Apparel and Accessories > Women's > Juniors > Dresses and Skirts - 10 products
- Apparel and Accessories > Women's > Dresses and Skirts > Skirts - 59 products
- Apparel and Accessories > Women's > Juniors > Dresses and Skirts > Skirts - 5 products
- Apparel and Accessories > Women's > Petite > Dresses and Skirts - 18 products
- Apparel and Accessories > Women's > Large and Tall > Dresses and Skirts - 75 products
- Home and Garden > Housewares > Decorative > Holiday Decorations > Christmas > Tree Skirts - 3 products
- Apparel and Accessories > Women's > Suits > Skirt Suits - 3 products
- Kids' Choice Bedding
- Kids' Choice Bedding Products: Found 2949 products in 283 stores matching 'skirts', showing stores 1 - 20:

| | | |
|---|---|---|
| Lucy & Ethel in Grass skirts | TOP SERVICE from Fridgedoor.com - The Web's Biggest Magnet Store! - (1 match) | $3.99 |

Lucy & Ethel in Grass skirts High quality glossy image draped over metal with a full strong magnetic back. Measures approximately 2" w x 3" h. 20170LU LLadro Nao: Girl Picking Up Her Skirts — TOP SERVICE from Best Wishes Home Page - (First of 2 matches) — $50.00

LLadro Nao: Girl Picking Up Her skirts 7" high 1290

Velcro Bed Skirts 10% Off: Eyelet Bed Sk... — from Domestications - (First of 405 matches) — $35.99

Velcro Bed Skirts 10% Off: Eyelet Bed Skirts, Twin/Full A343213B

Batik Mini Wrap Sarong Skirts — from Coral Island Traders - (1 match) — $6.50

Batik Mini Wrap Sarong Skirts Click on picture to enlarge. Here is the very popular Mini Wrap Sarong Skirt-Perfect for wearing over a swim suit when you don't want to let it all hang out! Be cool and comfortable with this quick wrap without showing all your assets! Tons of colors - see some samples...

Ultimate Travel Skirts: Petite Ultimate Tra... — from TravelSmith Outfitting Guide and Catalog [CC] - (First of 38 matches) — $59.00

Ultimate Travel Skirts: Petite Ultimate Travel Skirt R5366

Parellel Black Skirts (56% off) — from Bluefly - (First of 28 matches) — $79.95

Parallel Black Skirts (56% off) this ankle length cargo skirt by Parallel has a streetwear edge with its black vinyl-like material, cargo pockets, elongated silhouette, back slit and nylon lining. The coordinating sleeveless shirt gives the skirt a kind of Miu twist, if you don't mind...

MAZDASPEED Aero Body Kits II Side Skirts — from Moss Motors, Ltd. - (First of 3 matches) — $449.00

MAZDASPEED Aero Body Kits Type II Side Skirts Roadster Aeor Kits give a more aggressive look without ridiculous "boy racer" bulges all over the place. Rear wings are available on special order. Pieces must be painted to match your car. 975.130

*FIG. 3E1*
*(PRIOR ART)*

| | | |
|---|---|---|
| KLYMAXX LEATHER HALTER TOPS SKIRTS & MATCHI... | from A La Kiss Designs Online Catalog - (First of 12 matches) | $325.00 |

 KLYMAXX LEATHER HALTER TOPS SKIRTS & MATCHING CATSUITS Klymaxx Leather Halter Size S,M,L,XL, Color Black. Also Available item # 40-720 Klymaxx Leather Skirt Size S,M,L,XL, Price 219.00 Color Black item# 93-912 spider Catsuit One size fits all. Color Black. 40-620

| | | |
|---|---|---|
| Bed Rizers™: Twin Ruffled Bed Skirts | from Improvement - (First of 7 matches) | $34.99 |

Bed Rizers™: Twin Ruffled Bed Skirts 34317900

| | | |
|---|---|---|
| Crash Bar Skirts: "Desert Dawgs" Soft Lower... | from Kuryakyn - (First of 2 matches) | $74.95 |

Crash Bar Skirts: "Desert Dawgs" Soft Lower with Studs None

| | | |
|---|---|---|
| Infant and Child Hula Skirts | from aloha-store.com - (First of 3 matches) | $3.49 |

 Infant and Child Hula skirts If unsure about the fit order the next size up because one can always adjust the skirt to fit smaller. hula 1

| | | |
|---|---|---|
| Squid Skirts - Assorted pack | from Wolff Fishing Products - (First of 20 matches) | $6.95 |

 Squid Skirts - Assorted pack This assorted pack has 10 squid skirts in different shapes, colors and sizes. Excellent when combined with natural bait. A must in every tackle box. SQSK

| | | |
|---|---|---|
| Cowgirl Rodeo Skirts | from CRY BABY RANCH - Cowkid Clothing, Cowgirl Gifts & Cry Baby Rancho - (First of 3 matches) | $30.60 |

 Cowbot Rodeo Skirts Cowgirl Rodeo Skirts made in Colorado. Each One Unique. Perfect for a summer afternoon at the Rodeo. RS1

| | | |
|---|---|---|
| GIRLS SKIRTS AND KILTS: KILT TEEN CHUBBIE S... | from School Uniforms Cap & Gown - (First of 9 matches) | $48.44 |

GIRL SKIRTS AND KILTS: KILT TEEN CHUBBIE SIZES None

| | | |
|---|---|---|
| Solid Colored Bed Skirts: Twin Bed Skirt... | from Clearanceworld - (First of 42 matches) | $9.99 |

Solid Colored Bed Skirts: twin Bed Skirts K368373B

| | | |
|---|---|---|
| Bumper Babies: Add Fender Skirts | from Supere-store - (1 match) | $100.00 |

Bumper Babies: Add Fender Skirts None

| | | |
|---|---|---|
| Wings West Side Skirts (95+) | from Mach V Motorsports - (1 match) | $465.00 |

 Wings West Side Skirts (95+) Give your base model second generation Eclipse or Talon top-of-the-line looks with factory-style side skirts like the turbo cars have. Comes with left and right side skirts, plus matching door caps. 71101

| | | |
|---|---|---|
| Overstocked Kilted Skirts | from Scottish Lion Import Shop Inc. - (1 match) | $119.00 |

 Overstocked Kilted Skirts Our first quality kilted skirts, available in several tartans and sizes. Order by waist size. Length is 28" - 29". Unfortunately only the sizes and tartans listed are available at these prices. Once these catalog overstock items are gone - they're gone! If you would like...

| | | |
|---|---|---|
| Skirts by *Mimi Alberi* | from Yahoo! Video Shopping - (First of 23 matches) | $15.20-16.00 |

Publisher: Baskerville Publishers, Incorporated
Publication Date: 04/01/1994
Available Format: Hardcover
Pages: 259

| | | |
|---|---|---|
| Skirts Ahoy! (1952) by *Sidney Lanfield* | from Yahoo! Video Shopping - (First of 2 matches) | |

Synopsis: The story of ten weeks of training in boot camp for three Navy waves and their boyfriends.
Actors: Esther Williams; Joan Evans; Vivian Blaine; Barry Sullivan; Debbie Reynolds...
Director: Sidney Lanfield
Other: Facts: Available Format - VHS - 1 hr. 49 MIN. - Not Rated

*FIG. 3E2*
*(PRIOR ART)*

Next 20 Matches          Search Auctions

Search Product Catalog Again

| Mid length skirts | Search | All of Y! Shopping ▼ |

↑ Click

---

Copyright © 1994-99 Yahoo! Inc. All rights reserved. Privacy Policy - Security and Disclaimer
Questions, comments, suggestions? Send us feedback

*FIG. 3E3*
*(PRIOR ART)*

YAHOO! APPAREL  
*SHOPPING*

Shopping Home - Yahoo! - Help

Welcome, Guest

View Cart/Check Out - Order Status - Edit Acct - Sign In

Apparel: Found 6 products for "mid-length skirts"

Apparel Home

```
Save on your music now          CDNOW
[Choose Your Music ▼]           ⇢ go
```

Products: 1 - 6 of 6 matching 'mid-length skirts'.

DITSY FLORAL SKIRT     from Alloy Online     $24.00

Stretch poly-blend floral drawstring skirt, contrast topstitch down center front at waistband and hem. Medium is 19" long.

CHERRY BLOSSOM SKIRT     from Alloy Online     $29.00

100% polyester skirt with all-over Asian floral print and elastic waistband. Medium is 20" long.

HAWAIIAN SCENIC SKIRT     from Alloy Online     $22.00

Rayon low-waisted bias cut skirt with side zipper. Medium is 19" long.

Theory Black Skirts (45% off)     from Bluefly     $115.00

This Theory, 89% polyacrylic 11% lycra, Meg. below knee, zip back, skirt has four front pleats with the left forming a slit. This style has a stretch to the fabric and is constructed to give an A-line silhouette. dry clean only. Made in the USA.

Theory Black Skirts (45% off)     from Bluefly     $115.00

This Theory, 89% polyacrylic 21% lycra, Ying wrap to the back skirt with velcro closing falls just below the knee. This style has a stretch to the fabric and is constructed to give an A-line silhouette. Dry clean only. Made in the USA.

Theory Cement Skirts (45% off)     from Bluefly     $115.00

This Theory, 89% polyacrylic 11% lycra, Meg. below knee, zip back, skirt has four front pleats with the left forming a slit. This style has a stretch to the fabric and is constructed to give an A-line silhouette. Dry clean only. Made in the USA.

```
Save on your music now          CDNOW
[Choose Your Music ▼]           ⇢ go
```

Search Stores on the Web

*FIG. 3F1*
*(PRIOR ART)*

Search Yahoo! Shopping Again

[long skirt] [Search] [All of Y! Shopping ▼]

---

Copyright © 1994-99 Yahoo! Inc. All rights reserved. Privacy Policy - Security and Disclaimer
Questions, comments, suggestions? Send us feedback

*FIG. 3F2*
*(PRIOR ART)*

YAHOO! SHOPPING

Shopping Home - Yahoo! - Help

Welcome, Guest

View Cart/Check Out - Order Status - Edit Acct - Sign In

Search Result: Found 2 products for "mid-length skirts"

Shopping Home

Categories: 1 matching 'mid-length skirts'

- Apparel and Accessories > Women's > Dresses and Skirts > Skirts > Mid-Length - 6 products

Products: 1-2 of 2 matching 'mid-length skirts':

Press Conference        from KC DOLLS & COLLECTIBLES      $44.95

Press Conference Continuing the USO theme in an appeal for the war effort. Gene wears a two-piece, fitted day suit in a pale peach textured fabric top accented with brown crepe trim to match the sheath skirt. Accessorized with mid-length tan gloves, corsage, bracelet, earrings, nude hose, brown...

FI-6230X        from 1001 lingerie      $48.75

FI-6230X CLICK IMAGE TO ENLARGE 3PC. SET LONG GOWN HAS UNDERWIRED TIE-FRONT ADJ. STRAPS & LACE TRIM SKIRT, LONG SLEEVE MID-LENGTH COAT IS TRIMMED WITH LACE, MATCHING BIKINI FI-6230X

Search Stores on the Web      Search Auctions

Search Product Catalog Again

[ mid-length skirts ] [Search] [All of Y! Shopping ▼]

---

Copyright © 1994-99 Yahoo! Inc. All rights reserved. Privacy Policy - Security and Disclaimer
Questions, comments, suggestions? Send us feedback

*FIG. 3F3*
*(PRIOR ART)*

YAHOO! APPAREL
*SHOPPING*

Shopping Home - Yahoo! - Help

Welcome, Guest

View Cart/Check Out - Order Status - Edit Acct - Sign In

Shopping Home

Search Result: Found 354 products in 96 stores for "long skirts"

Categories: 3 matching 'long skirts'

- Apparel and Accessories > Women's > Dresses and Skirts > Skirts > Long - 33 products
- Apparel and Accessories > Women's > Juniors > Dresses and Skirts > Skirts > Long - 3 products
- Apparel and Accessories > Women's > Dresses and Skirts > Dresses > Long - 18 products

Products: Found 354 products in 96 stores matching 'long skirts. Showing stores 1 - 20:

JUNGLE LOVE LONG SLIT SKIRTS AND HAL...    from A La Kiss Designs Online Catalog - (First of 2 matches)    $89.00

JUNGLE LOVE LONG SLIT SKIRTS AND HALTER TOP SETS BY A LA KISS DESIGNS Jungle Love Set Top & Long Skirt. 4 way stretch Panne Velvet. Size S/M, M/L. Color Black, White, Forest Green or Leopard 80-501

Misses - Plain Front Long Skirt    from Adatom's Internet Superstore - (First of 3 matches)    $21.43

Misses - Plain Front Long Skirt Lee Company Available colors: Retro Dark String Available sizes 4 6 8 10 12 14 16 18 Length: M - 34" L - 36" From the Lee Casual Pants and Skirts Collection 17082016502

Long Khimar - To the knee    from Al Hediya - Kuwait - (First of 3 matches)    $38.00

Long Khimar - To the knee This special design is a longer khimar (reaches to the knee - you need to specify the length below by measuring from your CHIN to the KNEE) with cuffs added close to the bottom so that you can stick your hands out and still be concealed without wearing a long sleeve shirt...

Parallel Lavender Long Sleeve Shirts (56% o...)    from Bluefly - (First of 5 matches)    $37.95

Parallel Lavender Long Sleeve Shirts (56% off) This long sleeve tee shirt by Parallel stands out with its deep V-slitted neckline, slitted arm at cuff and 70's inspired shiny screen printed design in silver. Click here for coordinating skirts. 100% cotton. Hand wash. Lavender. Made in the U.S.A...

Long Linen Skirt: Long Linen Skirt - ...    from Tweeds - (First of 59 matches)    $69.90

Long Linen Skirt: Long Linen Skirt - 36-1/2" long 776931

Lullaby Links Bassinet Set with Long Bassin...    from Now On Special! - (1 match)    $155.00

Lullaby Links Bassinet Set with Long Bassinet Skirt Heavily embroidered eyelet, with braided chains running along horizontally. A two-tier stark bassinet liner with a top gathered ruffle to give you a chic look. This traditional style that fits your high-class standard is available in white or...

Croped Top and Long, Shaped Skirt: Top    from Frederick's of Hollywood - (First of 2 matches)    $19.00

Croped Top and Long, Shaped Skirt: Top 73058

Mondi Long Polka Dot Skirt Save 75%    from CyberShop - (First of 7 matches)    $74.99

Mondi Long Polka Dot Skirt Save 75% Original Price $297.50. Our Price $74.99. You Save 75% Splashes of white dots float across swirls of silver thread on the gold background of this elegant ankle-length skirt. Cut to flatter most figures it will add a touch of class to any location you choose to...

Mac & Jac Long Floral Skirt Save 52%    from CyberShop - (First of 7 matches)    $29.99

Mac & Jac Long Floral Skirt Save 52% Original Price $62. Our Price $29.99. You Save 52% A small fabric belt circles you and hangs delicately from your waist on this floral print skirt. A field of wicker and tan flowers is splashed across a black

*FIG. 3G1*
*(PRIOR ART)*

Gabardine Wardrobe: Long Gardine Skirt 14W-...    from Silhouettes - (First of 13 matches)    $59.90
     Gabardine Wardrobe: Long Gardine Skirt 14W-26W 7225862

Long Skirt Set & Thong by Teensy Weensy: Ho...    from Brief Encounters - (First of 6 matches)    $65.00
     Long Skirt Set & Thong by Teensy weensy: Hot Pants Tie Top & Thong 704-044

Lace T-Shirt Long Full Skirt    from Go Clothing Company - (1 match)    $90.00
     Lace T-Shirt: Long Full Skirt This is a very full skirt that glides as you walk. It is a perfect match for many of our basic pieces Black Acetate Slinky S996

Long Gored Skirt    from Cowboy Outfitters - (First of 6 matches)    $94.00
 Long Gored Skirt This long skirt is an elegant accompaniment to your ensemble. Black shown at left, chocolate in inset. Approximately 38 inches long, it goes great with boots. 100% rayon gabardine, dry clean. 501

Mondi Long Polka Dot Skirt Save 75%    from CyberShop - (First of 7 matches)    $74.99
 Mondi Long Polka Dot Skirt Save 75% Original Price $297.50. Our Price $74.99. You Save 75% Splashes of white dots float across swirls of silver thread on the gold background of this elegant ankle-length skirt. Cut to flatter most figures it will add a touch of class to any location you choose to...

Shirred Top with Butterflies: Fishtail Long...    from Cache - (First of 2 matches)    $175.00
 Shirred Top with Butterflies: Fishtail Long Skirt Capturing romantic appeal, Cache's matte jersey fishtail long skirt is sleek yet sinuous, it flows with grace. Skirt Style 22037U01296030

Tab Top with Long Skirt: Crushable Raffia H...    from Chloe's.com - (1 match)    $30.00
 Tab Top with Long Skirt: Crushable Raffia Hat Made on the island of Madagascar, this lightweight raffia straw is harvested from tall palms. This crushable straw hat is a favorite of our's. They may be folded or flattened - a quick shake returns them to their original shape. A raffia drawstring...

Long :Car Wash" skirt: Padded Underwire Hal...    from The Fetish Factory - (First of 2 matches)    $35.50
     Long "Car Wash" Skirt: Padded Underwire Halter Top Bra One Size. s916

Long Skirt Set w/Scoop Neck Top    from Pinupgirlclothing - (First of 3 matches)    $65.00
 Long Skirt Set w/Scoop Neck Top Ankle length skirt has two mid-thigh side slits. Scoop neck top includes fabric tie for tying around the front of the top to create a "bra" look (not shown). It's like having two tops in one. Best for small to medium cup sizes, with matching thing d306

Mesh Long Straight Skirt    from The Dark Gift - (1 match)    $134.00
 Mesh Long Straight Skirt Mesh Long Straight Skirt. VTC50

HomeComing Long Denim Skirt    from LITTLE HOUSE FASHIONS-Fine Womens Apparel - (First of 17 matches)    $58.00
     HomeComing Long Denim Skirt 33" Denim Skirt. Design details borrowed from Pendleton's trouser make this skirt a versatile alternative to pants or shorts. Denim fabric, two back patch pockets and belt loops team with a flattering A-line cut and longer length, pocket lined. 100% cotton, machine wash...

Next 20 Matches      Search Auctions

Search Product Catalog Again

[ long skirts ]   [ Search ]   [ All of Y! Shopping ▼ ]

*FIG. 3G2*
*(PRIOR ART)*

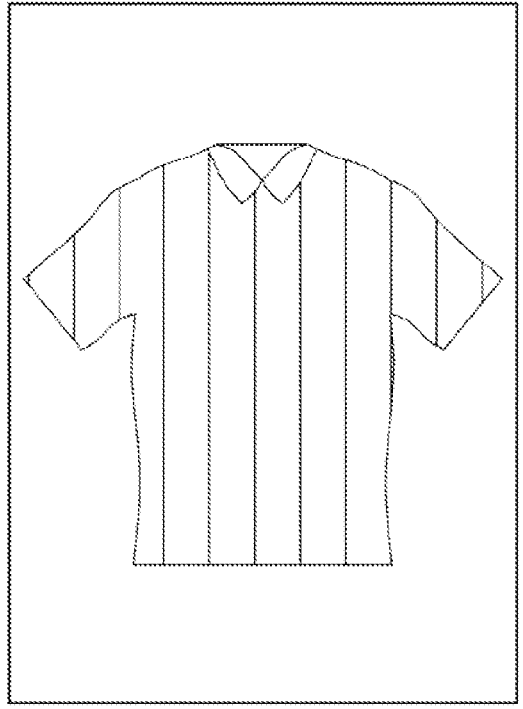

T-shirts
arm-strip T new
chest-striped T new
pocket-T
classic T
ribbed T
classic V
long-sleeved T
ribbed V
arm-striped logo T
colorblock logo T
hawaiian floral T
athleteic logo tank
chest-stripe crewneck shirt sale polo shirts
shoulder-strip polo shirt new
pique polo shirt new
contrast-stitch polo shirt sale
double-strip polo shirt sale

double-strip polo shirt

Questions? Feedback? Email us or call 1-800-GAP-STYLE (1-800-427-7865).

sites: [ gap | gapkids | babygap ]
departments: [ gift central | men's | women's | jeans | khakis | gapbody ]
services: [ help | your info | directory | shopping bag ]

*FIG. 4C*
*(PRIOR ART)*

| GAP | gap | gapkids | babygap | shopping bag |
|-----|-----|---------|---------|--------------|
|     | departments: [ gift central | men's | women's | jeans | khakis | gapbody ] |

You're not signed in. [sign in]

your shopping bag

To change your order, click on the item name below.
To remove an item from your order, check the box to the left of the item, then click on the update button.
To continue shopping select the Gap, GapKids, or babyGap store from above.

ship to: you

| remove | store | item name | size | color | quantity | each | total |
|--------|-------|-----------|------|-------|----------|------|-------|
| ☐ | Gap | classic T #1151420220002 | M | gray | 1 | $14.50 | $14.50 |

[ update ]  [ checkout ]

If you e decide not to purchase the items in your shopping bag on this visit, they will remain there for two week. However, leaving items in your shopping bag does not guarantee availability.

For the best Gap Online shopping experience, make sure you set your browser preferences to accept cookies Information on our return policy, shipping options, and answers to other questions can be found in our help section. If you need assistance, please email us or call us at 1-800-GAPSTYLE and let us know how we can help. Our customer service hours are 24 hours a day, 7 days a week.

At this time, we are able to accept and deliver orders within the United States only.

Questions? Feedback? Email us or call 1-800-GAP-STYLE (1-800-427-7895).

sites: [ gap | gapkids | babygap ]
departments: [ gift central | men's | women's | jeans | khakis | gapbody ]
services: [ help | your info | directory | shopping bag ]

*FIG. 4E*
*(PRIOR ART)*

GE INFORMATION

GE Ranges

*Dinner is on the way*

- 24 hours a day
- 7 days a week
- 365 days a year

*GE Answer Center*

Things to consider while shopping for appliances
- Appearance
- Capacity
- Cleanability
- Dimensions

*Est. Retail - Prices may vary by dealer.     To VIEW complete list of products, click [LIST]

| GE | Profile | Profile Performance | Monogram |
|---|---|---|---|
| $339* View<br>JGP626AEVAA<br>GE Built-In Gas Cooktop | $1069* View<br>JGP645WEXWW<br>GE Profile~ 36" Downdraft Gas Cooktop with Sealed Cooktop Burners and Up-Front controls | | $6949* View<br>ZDP48L4GWSS<br>GE Monogram~ 48" Professional Range with 4 Burners, Grill, and Griddle |
| $339* View<br>JGP626BEVBB<br>GE Built-In Gas Cooktop | $989* View<br>JGP645BEXBB<br>GE Profile~ 36" Downdraft Gas Cooktop with Sealed Cooktop Burners and Up-Front Controls | | $6899* View<br>ZDP48N4GWSS<br>GE Monogram~ 48" Professional Range with 4 Burners, Grill, and Griddle |
| $339* View<br>JGP626WEVWW<br>GE Built-In Gas Cooktop | $799* View<br>JGP389BEVBB<br>GE Profile~ 30" Built-In Downdraft modular Gas Cooktop with Fixed Gas Burners and Up-Front Controls (Accepts Optional Module) | | $6549* View<br>ZDP48L6DWSS<br>GE Monogram~ 48" Professional Range with 6 Burners, Grill, and Griddle |
| $289* View<br>JGP326AEVAA<br>GE Built-In Gas Cooktop | $799* View<br>JGP389WEVWW<br>GE Profile~ 30" Built-In Downdraft modular Gas Cooktop with Fixed Gas Burners and Up-Front Controls (Accepts Optional Module) | | $6549* View<br>ZDP48L6RWSS<br>GE Monogram~ 48" Professional Range with 6 Burners and Grill |
| $289* View<br>JGP326BEVBB<br>GE Built-In Gas Cooktop | $619* View<br>JGP636AEVAA<br>GE Profile~ 36" Built-In Gas Cooktop with Sealed Cooktop Burners and Up-Front Controls | | $6499* View<br>ZDP48N6DWSS<br>GE Monogram~ 48" Professional Range with 6 Burners and Griddle |
| $289* View<br>JGP326WEVWW<br>GE Built-In Gas Cooktop | $619* View<br>JGP636BEVBB<br>GE Profile~ 36" Built-In Gas Cooktop with Sealed Cooktop Burners and Up-Front Controls | | $6499* View<br>ZDP48N6RWSS<br>GE Monogram~ 48" Professional Range with 6 Burners and Grill |
| $239* View<br>JGP320EVBL<br>GE Built-In Gas Cooktop | $619* View<br>JGP636WEVWW<br>GE Profile~ 36" Built-In Gas Cooktop with Sealed Cooktop Burners and Up-Front Controls | | $5349* View<br>ZDP36L4DWSS<br>GE Monogram~ 36" Professional Range with 4 Burners and Griddle |
| | $519* View<br>JGP336AEVAA<br>GE Profile~ 30" Built-In Gas Cooktop with Sealed Cooktop Burners and Right-Side Controls | | $5349* View<br>ZDP36L4RWSS<br>GE Monogram~ 36" Professional Range with 4 Burners and Grill |
| | $519* View<br>JGP336BEVBB<br>GE Profile~ 30" Built-In Gas Cooktop with Sealed Cooktop Burners and Right-Side Controls | | $5349* View<br>ZDP36L6WSS<br>GE Monogram~ 36" Professional Range with 6 Burners |
| | | | $5299* View<br>ZDP36N4DWSS<br>GE Monogram~ 36" Professional Range with 4 Burners |

*FIG. 5C*
*(PRIOR ART)*

GE Search Engine - Results                                              Page 1 of 1

Search for "Appliances"

Your search matched 296 of 24021 documents
10 are presented, ranked by relevance 1 2 3 4 5 6 7 8 9 10 11 12 13 14 15 16 17 18 19 20 [Next]

| Rank | Score | Title/Information |
|---|---|---|
| 1 | 0.88 | http://www.ge.com/appliances/usa/inbusiness/main.htm *GE Appliances works with a wide range of valued customers and suppliers to deliver products and services to consumers around the world. Click on one of the on-line areas below for more information about GE Appliances, our products and services. GE Applia...* |
| 2 | 0.87 | http://www.ge.com/appliances/usa/inbusiness/main.htm *GE Appliances can provide important information and assistance to our partners involved in retail sales. GE CustomerNet provides a seamless, complete on-line connection to GE! A relationship with GE Appliances not only offers our industry-leading produc...* |
| 3 | 0.87 | http://www.ge.com/appliances/usa/inbusiness/bsrvmain.htm *GE Appliances can provide important information and assistance to our partners involved in retail sales. GE CustomerNet provides a seamless, complete on-line connection to GE! A relationship with GE Appliances not only offers our industry-leading produc...* |
| 4 | 0.87 | http://www.ge.com/appliances/usa/searchmain.htm *Begin your search of the GE Appliances web site by making a selection from the pull down list below. You may also search all GE businesses with the advanced search. At Home with GE Appliances In Business with GE Appliances Where to Buy Financing Literatur...* |
| 5 | 0.86 | GE Appliances: Real Life Design *Real Life Design can be viewed as a new way of approaching the design process. A. Virtually any size kitchen can have Real Life Design features. GE's Real Life Design project was not inspired by any laws, but by the real needs of real people--people who...* |
| 6 | 0.86 | http://www.ge.com/appliances/usa/inbusiness/bcontmain.htm *GE CustomerNet provides a seamless, complete on-line connection to GE! GE has the largest manufacturer-owned and authorized service organization in the appliance industry. This plan provides service protection, including parts and labor on major applianc...* |
| 7 | 0.84 | http://www.ge.com/appliances/usa/monogram/camco/cmmain.htm *Not all models available in Canada, B. C>   Vancouver Coast Wholesale8410 Main StreetVancouver, B.C. V5X 3M2(604) 321.6644   West Vancouver YFranks503 15th StreetWest Vancouver, B.C. V7T 2S6 (888) 937.2657 (Toll Free)(604) 926.0124   Victoria...* |
| 8 | 0.82 | GE Appliances: Real Life Design *Design adapting to people rather than people adapting to design. GE's Real Life Design Kitchen features gE Profile appliances and Kraftmaid Cabinetry. It's design puts people first and meets the kitchen design giudelines of the National Kitchen and Bath...* |
| 9 | 0.82 | http://www.ge.com/appliances/usa/qecaf/appeq/main.htm *Take advantage of special financing offers from General Electric Consumer Appliances Financing(GECAF®)! Your new GECAF® credit card may be used at over 3000 participating dealers. For your protection, the GECAF® online application is only suppo...* |
| 10 | 0.82 | http://www.ge.com/appliances/usa/anscty/aosarmain.htm *Dial 800.626.2000 in the U.S. or 800.665.3711 in Canada at any hour of the day or night -- even on weekends and holidays -- to contact the GE Answer Center® and get answers to your questions about GE Monogram®, GE Profile Performance®, GE Profile.®* |

1 2 3 4 5 6 7 8 9 10 11 12 13 14 15 16 17 18 19 20 [Next]

http://www.ge.com/cgi-bn/verify.pi                                      7/13/99

↓Click    *FIG. 5D*
          *(PRIOR ART)*

*GE Appliances Search*

Home　Where to buy　Financing　Literature　Services & Parts

Page 1 of 1

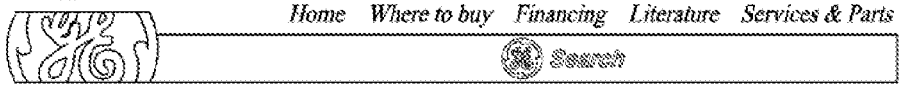

Search for "Range"

Your search matched 88 of 813 documents
10 are presented, ranked by relevance 1 2 3 4 5 6 7 8 9 [Next]

| Rank | Score | Title/Information |
|------|-------|-------------------|
| 1 | 1.00 | MODEL LIST  *Models represent HOTPOINT GAS RANGE. Select any model to see detail information with a color photo. Models represent GENERAL ELECTRIC GAS RANGE.* |
| 2 | 0.91 | http://www.ge.com/appliances/usa/inbusiness/builders/bcokemain.htm  *Free-Standing ranges can be installed free from surrounding cabinetry. Slide-In ranges offer a custom built-in look by a simple slide-in installation within surrounding countertops and cabinets. Built-In ovens offer a true built-in appearance becasue th...* |
| 3 | 0.91 | http://www.ge.com/appliances/usa/inbusiness/architects/acokemain.htm  *Free-Standing ranges can be installed free from surrounding cabinetry. Slide-In ranges offer a custom built-in look by a simple slide-in installation within surrounding countertops and cabinets. Built-In ovens offer a true built-in appearance becasue th...* |
| 4 | 0.90 | http://www.ge.com/appliances/usa/inbusiness/remodelers/rcokemain.htm  *Free-Standing ranges can be installed free from surrounding cabinetry. Slide-In ranges offer a custom built-in look by a simple slide-in installation within surrounding countertops and cabinets. Built-In ovens offer a true built-in appearance becasue th...* |
| 5 | 0.90 | http://www.ge.com/appliances/usa/inbusiness/managers/mcokemain.htm  *Free-Standing ranges can be installed free from surrounding cabinetry. Slide-In ranges offer a custom built-in look by a simple slide-in installation within surrounding countertops and cabinets. Because slide-in ranges do not have "appearance" finished...* |
| 6 | 0.90 | http://www.ge.com/appliances/usa/monogram/mpbg30main.htm  *All GE Monogram® professional ranges require the addition of a backguard for proper installation. when located against a wall, the ranges accept either a 12" backguard or a 22" model with a warming shelf. The ranges require 1-1/2" trim when positioned...* |
| 7 | 0.90 | http://www.ge.com/appliances/usa/monogram/mpbg36main.htm  *All GE Monogram® professional ranges require the addition of a backguard for proper installation. When located against a wall, the ranges accept either a 12" backguard or a 22" model with a warming shelf. The ranges require 1-1/2" trim when positioned...* |
| 8 | 0.89 | http://www.ge.com/appliances/usa/monogram/mpbg48main.htm  *All GE Monogram® professional ranges require the addition of a backguard for proper installation. When located against a wall, the ranges accept either a 12" backguard or a 22" model with a warming shelf. The ranges require 1-1/2" trim when positioned...* |
| 9 | 0.88 | http://www.ge.com/appliances/usa/inbusiness/builders/bcokgmain.htm  *Free-Standing ranges can be installed free from surrounding cabinetry. Slide-In ranges offer a custom built-in look by a simple slide-in installation within surrounding countertops and cabinets. Built-In ovens offer a true built-in appearance becasue th...* |
| 10 | 0.88 | http://www.ge.com/appliances/usa/inbusiness/architects/acokgmain.htm  *Free-Standing ranges can be installed free from surrounding cabinetry. Slide-In ranges offer a custom built-in look by a simple slide-in installation within surrounding countertops and cabinets. Built-In ovens offer a true built-in appearance becasue th...* |

1 2 3 4 5 6 7 8 9 [Next]

http://www.ge.com/appliances/usa/asearch.htm　　　　　　　　　　　　　7/13/99

*FIG. 5E*
*(PRIOR ART)*

Page 1 of 1

Search for "Monogram"

| GEsearch engine | Search for "Monogram" |

Your search matched 93 of 24021 documents
10 are presented, ranked by relevance 1 2 3 4 5 6 7 8 9 10 [Next]

| Rank | Score | Title/Information |
|---|---|---|
| 1 | 0.93 | http://www.ge.com/appliances/usa/monogram/mservmain.htm  *Every Monogram appliance boasts a benefit no other can offer: an exclusive package of services designed to ensure reliable performance long after your vision of the ultimate kitchen becomes a reality. If your Monogram appliance should ever require service...* |
| 2 | 0.88 | http://www.ge.com/appliances/usa/inbusiness/new2main.htm  *All Monogram® professional ranges deliver power and the ability to perform, but these models exceed even these extraordinary performance levels - with the advantages of both gas and electric cooking. Gas Ovens feature Four Gas Burners; Cast Iron Burner G...* |
| 3 | 0.87 | http://www.ge.com/appliances/usa/monogram/camco/cmmain.htm  *The Monogram® Collection® is now available in Canada. The Monogram Collection,® a superb line of appliances as grand as your vision. The entire The Monogram Collection,® with specific information on products, dimensions, and installation information is av...* |
| 4 | 0.86 | http://www.ge.com/appliances/usa/monogram/mmain.htm  *Introducing the Monogram Collection,® a superb line of appliances as grand as your vision. Uniting intelligently engineered systems with the best of European and American design, Monogram® presents an enticing selection of professional, free standing...* |
| 5 | 0.82 | http://www.ge.com/appliances/usa/monogram/moutaccmain.htm  *Monogram outdoor accessories are designed to complement any built-in installation and provide protection against the elements. The insulated jacket shields combustible cabinetry from the heat generated by the grill or dual burner cooktop. Covers are custo...* |
| 6 | 0.82 | http://www.ge.com/appliances/usa/monogram/mhdpmain.htm  *A GE Monogram 48" or 36" stainless-steel, wall-mounted hood perfectly complements your Monogram professional range or cooktop. This canopy of stainless steel creates a complete cooking center, efficiently drawing away steam and aromas with the power, th...* |
| 7 | 0.82 | http://www.ge.com/appliances/usa/monogram/mmwomain.htm  *The Monogram® built-in in microwave oven is an invaluable resource. The oven fits beautifully into a wall, installed alone or paired with a GE Monogram 27" single oven. The Monogram countertop/Built-In microwave ovens can rest on a countertop, or be buil...* |
| 8 | 0.82 | http://www.ge.com/appliances/usa/monogram/mfsrefmain.htm  *The Monogram® free-standing refrigerator is a blend of timeless style and professional beauty. Not only is it the first refrigerator from GE that is completely encased in stainless steel, it's also the first free-standing refrigerator in the Monogram.®* |
| 9 | 0.80 | http://www.ge.com/appliances/usa/inbusiness/monogram/mmain.htm  *Some people refuse to compromise. The Monogram Collection unites brilliantly engineered systems with the best of bothe European and American design. You compromise neither performance nor aesthetics...* |
| 10 | 0.80 | http://www.ge.com/appliances/usa/inbusiness/builders/bsrvmain.htm  *GE provides the kind of service that can make the difference to your homes and your customers! Any hour of the day or night-even on weekends and holidays-the GE Answer Center®service is available to answer questions about Monogram,® GE Profile Per...* |

1 2 3 4 5 6 7 8 9 10 [Next]

http://www.ge.com/cgi-bn/verify.pi

*Est. Retail - Prices may vary by dealer.    To VIEW complete list of products, click [LIST]

MONOGRAM

Refrigerators

| | | | |
|---|---|---|---|
| $5499* View<br>ZISS48DASS<br>GE Monogram~ 48" Built-In Side-by-Side Refrigerator with Exterior Dispenser | $5199* View<br>ZISS42DASS<br>GE Monogram~ 42" Built-In Side-by-Side Refrigerator with Exterior Dispenser | $4999* View<br>ZICS36NALH<br>GE Monogram~ 36" Built-In Stainless Steel Bottom Freezer Refrigerator with Icemaker | $4999* View<br>ZICS36NARH<br>GE Monogram~ 36" Built-In Stainless Steel Bottom Freezer Refrigerator with Icemaker |
| $4999* View<br>ZISS48NASS<br>GE Monogram~ 48" Built-In Side-by-Side Refrigerator with Automatic Icemaker | $4699* View<br>ZISS42NASS<br>GE Monogram~ 42" Built-In Side-by-Side Refrigerator with Automatic Icemaker | $4699* View<br>ZISW48DY<br>GE Monogram~ 48" Built-In Side-by-Side Refrigerator with Exterior Dispenser | $4499* View<br>ZISB48DY<br>GE Monogram~ 48" Built-In Side-by-Side Refrigerator with Exterior Dispenser |
| $4199* View<br>ZISW42DY<br>GE Monogram~ 42" Built-In Side-by-Side Refrigerator with Exterior Dispenser | $4099* View<br>ZIC36NALH<br>GE Monogram~ 36" Built-In Bottom Freezer Refrigerator with Icemaker | $4099* View<br>ZIC36NARH<br>GE Monogram~ 48" Built-In Bottom Freezer Refrigerator with Icemaker | $3999* View<br>ZIS48NY<br>GE Monogram~ 48" Built-In Side-by-Side Refrigerator with Automatic Icemaker |
| $3999* View<br>ZISB42DY<br>GE Monogram~ 42" Built-In Side-by-Side Refrigerator with Exterior Dispenser | $3899* View<br>ZISW36DY<br>GE Monogram~ 36" Built-In Side-by-Side Refrigerator with Exterior Dispenser | $3699* View<br>ZISB36DY<br>GE Monogram~ 36" Built-In Side-by-Side Refrigerator with Exterior Dispenser | $3599* View<br>ZIS42NY<br>GE Monogram~ 42" Built-In Side-by-Side Refrigerator with Automatic Icemaker |
| $3299* View<br>ZIS36NY<br>GE Monogram~ 36" Built-In Side-by-Side Refrigerator with Automatic Icemaker | $2799* View<br>ZFSB27DASS<br>GE Monogram~ 26.6 cu. ft. Free Standing Stainless Steel Refrigerator with Exterior Dispenser | $1045* View<br>ZDB24ABB<br>GE Monogram Beverage Center with Adjustable Temperature Control | $1045* View<br>ZDB24AWW<br>GE Monogram Beverage Center with Adjustable Temperature Control |
| $999* View<br>ZDIB50Y<br>GE Monogram~ High Production, Large Capacity Automatic Icemaker with Drop-Down Door | $999* View<br>ZDIW50Y<br>GE Monogram~ High Production, Large Capacity Automatic Icemaker with Drop-Down Door | $989* View<br>ZDW24ABB<br>GE Monogram Wine Chiller with 7 Slide-Out Shelves and Temperature Control | $989* View<br>ZDW24AWW<br>GE Monogram Wine Chiller with 7 Slide-Out Shelves and Temperature Control |

Dishwashers

| | | | |
|---|---|---|---|
| $1029* View<br>ZBD5900DSS<br>GE Monogram Dishwasher with Stainless Steel Interior | $929* View<br>ZBD5700DBB<br>GE Monogram Dishwasher with Stainless Steel Interior | $929* View<br>ZBD5700DWW<br>GE Monogram Dishwasher with Stainless Steel Interior | $799* View<br>ZBD3900CSS<br>GE Monogram Dishwasher with PermaTuff Interior |
| $749* View<br>ZBD5600DBB<br>GE Monogram Dishwasher with Stainless Steel Interior | $749* View<br>ZBD5600DWW<br>GE Monogram Dishwasher with Stainless Steel Interior | $649* View<br>ZBD3500ZZBB<br>GE Monogram Dishwasher with PermaTuff Interior | $649* View<br>ZBD3500ZZWW<br>GE Monogram Dishwasher with PermaTuff Interior |

Microwaves

| | | | |
|---|---|---|---|
| $979* View<br>ZMC1090WV<br>GE Monogram~ 1.0 Cu. Ft. Built_In Microwave/Convection Oven with Sensor Cooking Controls | $929* View<br>ZMC1090BV<br>GE Monogram~ 1.0 Cu. Ft. Built_In Microwave/Convection Oven with Sensor Cooking Controls | $339* View<br>ZE1660SA<br>GE Monogram Full Size Countertop Microwave Oven | $329* View<br>ZEM200SY<br>GE Monogram~ .9 Cu. Ft. Compact Microwave Oven with Sensor Cooking Controls |
| $299* View<br>ZEM200WY<br>GE Monogram~ .09 Cu. Ft. Compact Microwave Oven with Sensor Cooking Controls | $289* View<br>ZEM200GY<br>GE Monogram~ .9 Cu. Ft. Compact Microwave Oven with Sensor Cooking Controls | | |

Gas Ranges

| | | | |
|---|---|---|---|
| $3419* View<br>ZGG48L42ASS<br>GE Monogram~ 48" Outdoor Cooking Center | $3369* View<br>ZGG48N42YSS<br>GE Monogram~ 48" Outdoor Cooking Center with 4 Grill Burners, Rotisserie, and Smoker | $2789* View<br>ZGG48L31ASS<br>GE Monogram~ 48" Outdoor Cooking Center | $2739* View<br>ZGG48N31YSS<br>GE Monogram~ 48" Outdoor Cooking Center with 3 Grill Burners, 2 Cooktop Burners, Rotisserie, and Smoker |
| $2599* View<br>ZGG36L31ASS<br>GE Monogram~ 36" Outdoor Cooking Center | $2569* View<br>ZGG36N31YSS<br>GE Monogram~ 36" Outdoor Cooking Center with 3 Grill Burners, Rotisserie, and Smoker | $2549* View<br>ZGU48L4GWSS<br>GE Monogram~ 48" Professional Gas Cooktop with 4 Burners, Grill, and Griddle | $2509* View<br>ZGG48L40ASS<br>GE Monogram~ 48" Outdoor Cooking Center with 4 Grill Burners and Smoker |

| $2499* View ZGU48NGWSS GE Monogram~ 48" Professional Gas Cooktop with 4 Burners, Grill, and Griddle | $2499* View ZGG36L21ASS GE Monogram~ 48" Outdoor Cooking Center | $2459* View ZGG48N40YSS GE Monogram~ 48" Outdoor Cooking Center with 4 Grill Burners and Smoker | $2409* View ZGG36N21YSS GE Monogram~ 36" Outdoor Cooking Center with 2 Grill Burners, 2 Cooktop Burners, Rotisserie, and Smoker |
|---|---|---|---|
| $2399* View ZGG48L30ASS GE Monogram~ 48" Outdoor Cooking Center with 3 Grill Burners, 2 Cooktop Burners and Smoker | $2349* View ZGG48N30YSS GE Monogram~ 48" Outdoor Cooking Center with 3 Grill Burners and 2 Cooktop Burners | $2299* View ZGU48L6DWSS GE Monogram~ 48" Professional Gas Cooktop with 6 Burners and Griddle | $2299* View ZGU48L6RWSS GE Monogram~ 48" Professional Gas Cooktop with 6 Burners and Grill |
| $2249* View ZGU48N6DWSS GE Monogram~ 48" Professional Gas Cooktop with 6 Burners and Griddle | $2249* View ZGu48n6rwss GE Monogram~ 48" Professional Gas Cooktop with 6 Burners and Grill | $2159* View ZGG36L30ASS GE Monogram~ 36" Outdoor Cooking Center with 3 Grill Burners and Smoker | $2149* View ZGU36L4DYSS GE Monogram~ 36" Professional Gas Cooktop with 4 Burners and Griddle |
| $2149* View ZGU36L4RYSS GE Monogram~ 36" Professional Gas Cooktop with 4 Burners and Grill | $2109* View ZGG36N30YSS GE Monogram~ 36" Outdoor Cooking Center with 3 Grill Burners and Smoker | $2099* View ZGU36L4DYSS GE Monogram~ 36" Professional Gas Cooktop with 4 Burners and Griddle | $2099* View ZGU36N4RYSS GE Monogram~ 36" Professional Gas Cooktop with 4 Burners and Grill |
| $2059* View ZGG36L20ASS GE Monogram~ 36" Outdoor Cooking Center with 2 Grill Burners, 2 Cooktop Burners and Smoker | $2049* View ZGU36L6YSS GE Monogram~ 36" Professional Gas Cooktop with 6 Burners | $2009* View ZGG36N20YSS GE Monogram~ 36" Outdoor Cooking Center with 2 Grill Burners, 2 Cooktop Burners and Smoker | $1999* View ZGU36N6YSS GE Monogram~ 36" Professional Gas Cooktop with 6 Burners |
| $1529* View ZGG27L21ASS GE Monogram~ 27" Outdoor Cooking Center | $1469* View ZGG27N21YSS GE Monogram~ 27" Outdoor Cooking Center with 2 Grill Burners and Rotisserie | $1349* View ZGU565WEXWG GE Monogram~ Gas Downdraft Cooktop with 5 Burners and Retractable Vent | $1299* View ZGU665BEXBG GE Monogram~ Gas Downdraft Cooktop with 5 Burners and Retractable Vent |
| $1199* View ZGG27L20ASS GE Monogram~ 27" Outdoor Cooking Center with 2 Grill Burners | $1169* View ZGG27N20YSS GE Monogram~ 27" Outdoor Cooking Center with 2 Grill Burners | $899* View ZGU551ESWG GE Monogram~ Gas Updraft Cooktop with 5 Burners | $849* View ZGU650ESBG GE Monogram~ Gas Updraft Cooktop with 5 Burners |
| $469* View ZGW124ENSS GE Monogram~ Component Cooking Surfaces with 2 Burners and Right-Hand Controls | $469* View ZGW125ENSS GE Monogram~ Component Cooking Surfaces with 2 Burners and Left-Hand Controls | | |
| *Electric Cooktops* | | | |
| $3399* View ZET857SYSS GE Monogram~ 30" Convection Self-Cleaning Double Oven with Concealed Bake Element and Bread Proofing Mode | $3299* View ZET857DYSB GE Monogram~ 30" Convection Self-Cleaning Double Oven with Concealed Bake Element and Bread Proofing Mode | $3149* View ZET857WYWW GE Monogram~ 30" Convection Self-Cleaning Double Oven with Concealed Bake Element and Bread Proofing Mode | $2999* View ZET857BYBB GE Monogram~ 30" Convection Self-Cleaning Double Oven with Concealed Bake Element and Bread Proofing Mode |
| $2199* View ZET757WAWW GE Monogram~ 30" Convection Double Oven | $2149* View ZEK757WAWW GE Monogram~ 27" Convection Double Oven | $2119* View ZET757BABB GE Monogram~ 30" Convection Double Oven | $2069* View ZEK757BABB GE Monogram~ 27" Convection Double Wall Oven |
| $1829* View ZET837SYSS GE Monogram~ 30" Convection Self-Cleaning Single Oven with Concealed Bake Element and Bread Proofing Mode | $1729* View ZET837DYSB GE Monogram~ 30" Convection Self-Cleaning Single Oven with Concealed Bake Element and Bread Proofing Mode | $1669* View ZET837WYWW GE Monogram~ 30" Convection Self-Cleaning Single Oven with Concealed Bake Element and Bread Proofing Mode | $1599* View ZET837BYBB GE Monogram~ 30" Convection Self-Cleaning Single Oven with Concealed Bake Element and Bread Proofing Mode |
| $1399* View ZEU676YSB GE Monogram~ Ribbon Cooktop with 7 Cooking Areas | $1349* View ZEU36WMRABG GE Monogram~ 36" Digital Electric Cooktop with Ribbon Elements, Warming Burner and Bridge Burner | $1339* View ZET737WAWW GE Monogram~ 30" Convection Single Oven | $1299* View ZEU365ABG GE Monogram~ 36" Digital Electric Cooktop with Ribbon Elements and Bridge Burner |

*FIG. 5H*
(PRIOR ART)

| | | | |
|---|---|---|---|
| $1279* View<br>ZET737BABB<br>GE Monogram~ 30" Convection Single Oven | $1249* View<br>ZEK737WAWW<br>GE Monogram~ 27" Convection Single Oven | $1199* View<br>ZEK737BABB<br>GE Monogram~ 27" Convection Single Oven | $1179* View<br>ZEU304ABG<br>GE Monogram~ 30" Digital Electric Cooktop with Ribbon Elements and Bridge Burner |
| $949* View<br>ZEU669AWW<br>GE Monogram~ Halogen and Ribbon Cooktop with 6 Cooking Areas | $799* View<br>ZEW166YSS<br>GE Monogram~ 500 CFM Downdraft Grill Component with Remote Blower Capability | $779* View<br>ZTD910SBSS<br>GE Monogram~ 30" Warming Drawer | $729* View<br>ZTD910BBBB<br>GE Monogram~ 30" Warming Drawer |
| $725* View<br>ZTD910WBWW<br>GE Monogram~ 30" Warming Drawer | $679* View<br>ZKD910SBSS<br>GE Monogram~ 27" Warming Drawer | $629* View<br>ZKD910BBBB<br>GE Monogram~ 27" Warming Drawer | $629* View<br>ZKD910WBWW<br>GE Monogram~ 27" Warming Drawer |
| $599* View<br>ZEW145VSS<br>GE Monogram~ Halogen and Ribbon Component with 2 Hot Surface Indicator Lights | $599* View<br>ZEW155NSS<br>GE Monogram~ Updraft Grill Component Cooking Surface | $499* View<br>ZEW176YSS<br>GE Monogram~ 300 CFM Downdraft Vent Component with Remote Blower Capability | $0* View<br>ZEU304BWG<br>GE Monogram~ 30" Digital Electric Cooktop with Ribbon Elements and Bridge Burner |
| $0* View<br>ZEU365BWG<br>GE Monogram~ 36" Digital Electric Cooktop with Ribbon Elements and Bridge Burner | $0* View<br>ZEU36WMRBWG<br>GE Monogram~ 36" Digital Electric Cooktop with Ribbon Elements, Warming Burner and Bridge Burner | | |
| *Gas Cooktops* | | | |
| $3419* View<br>ZGG48L42ASS<br>GE Monogram~ 48" Outdoor Cooking Center | $3389* View<br>ZGG48N42YSS<br>GE Monogram~ 48" Outdoor Cooking Center with 4 Grill Burners, Rotisserie, and Smoker | $2789* View<br>ZGG48L31ASS<br>GE Monogram~ 48" Outdoor Cooking Center | $2739* View<br>ZGG48N31YSS<br>GE Monogram~ 48" Outdoor Cooking Center with 3 Grill Burners, 2 Cooktop Burners, Rotisserie, and Smoker |
| $2599* View<br>ZGG36L31ASS<br>GE Monogram~ 36" Outdoor Cooking Center | $2569* View<br>ZGG36N31YSS<br>GE Monogram~ 36" Outdoor Cooking Center with 3 Grill Burners, Rotisserie, and Smoker | $2549* View<br>ZGU48L4GWSS<br>GE Monogram~ 48" Professional Gas Cooktop with 4 Burners, Grill, and Griddle | $2509* View<br>ZGG48L40ASS<br>GE Monogram~ 48" Outdoor Cooking Center with 4 Grill Burners and Smoker |
| $2499* View<br>ZGU48N4GWSS<br>GE Monogram~ 48" Professional Gas Cooktop with 4 Burners, Grill, and Griddle | $2459* View<br>ZGG36L21ASS<br>GE Monogram~ 36" Outdoor Cooking Center | $2459* View<br>ZGG48N40YSS<br>GE Monogram~ 48" Outdoor Cooking Center with 4 Grill Burners and Smoker | $2409* View<br>ZGG36N21YSS<br>GE Monogram~ 36" Outdoor Cooking Center with 2 Grill Burners, 2 Cooktop Burners, Rotisserie, and Smoker |
| $2399* View<br>ZGG48L30ASS<br>GE Monogram~ 48" Outdoor Cooking Center with 3 Grill Burners, 2 Cooktop Burners and Smoker | $2349* View<br>ZGG48N30YSS<br>GE Monogram~ 48" Outdoor Cooking Center with 3 Grill Burners, 2 Cooktop Burners | $2299* View<br>ZGU48L6DWSS<br>GE Monogram~ 48" Professional Gas Cooktop with 6 Burners and Griddle | $2299* View<br>ZGU48L6RWSS<br>GE Monogram~ 48" Professional Gas Cooktop with 6 Burners and Grill |
| $2249* View<br>ZGU48N6DWSS<br>GE Monogram~ 48" Professional Gas Cooktop with 6 Burners and Griddle | $2249* View<br>ZGU48N6RWSS<br>GE Monogram~ 48" Professional Gas Cooktop with 6 Burners and Grill | $2159* View<br>ZGG36L30ASS<br>GE Monogram~ 36" Outdoor Cooking Center with 3 Grill Burners and Smoker | $2149* View<br>ZGU36L4DYSS<br>GE Monogram~ 36" Professional Gas Cooktop with 4 Burners and Griddle |
| $2149* View<br>ZGU36L4RYSS<br>GE Monogram~ 36" Professional Gas Cooktop with 4 Burners and Grill | $2109* View<br>ZGG36N30YSS<br>GE Monogram~ 36" Outdoor Cooking Center with 3 Grill Burners and Smoker | $2099* View<br>ZGU36N4DYSS<br>GE Monogram~ 36" Professional Gas Cooktop with 4 Burners and Griddle | $2099* View<br>ZGU36N4RYSS<br>GE Monogram~ 36" Professional Gas Cooktop with 4 Burners and Grill |
| $2059* View<br>ZGG36L20ASS<br>GE Monogram~ 36" Outdoor Cooking Center with 2 Grill Burners, 2 Cooktop Burners, and Smoker | $2049* View<br>ZGU36L6YSS<br>GE Monogram~ 36" Professional Gas Cooktop with 6 Burners | $2009* View<br>ZGG36N20YSS<br>GE Monogram~ 36" Outdoor Cooking Center with 2 Grill Burners, 2 Cooktop Burners and Smoker | $1999* View<br>ZGU36N6YSS<br>GE Monogram~ 36" Professional Gas Cooktop with 6 Burners |
| $1529* View<br>ZGG27L21ASS<br>GE Monogram~ 27" Outdoor Cooking Center | $1469* View<br>ZGG27N21YSS<br>GE Monogram~ 27" Outdoor Cooking Center with 2 Grill Burners and Rotisserie | $1349* View<br>ZGU665WEXWG<br>GE Monogram~ Gas Downdraft Cooktop with 5 Burners and Retractable Vent | $1299* View<br>ZGU665BEXBG<br>GE Monogram~ Gas Downdraft Cooktop with 5 Burners and Retractable Vent |

1 of 5     *FIG. 5I* (PRIOR ART)     6/17/1999 12:21 PM

| $1199* View ZGG27L20ASS GE Monogram~ 27" Outdoor Cooking Center with 2 Grill Burners | $1169* View ZGG27L20YSS GE Monogram~ 27" Outdoor Cooking Center with 2 Grill Burners | $899* View ZGU651ESWG GE Monogram~ Gas Updraft Cooktop with 5 Burners | $849* View ZGU650ESBG GE Monogram~ Gas Updraft Cooktop with 5 Burners |
|---|---|---|---|
| $469* View ZGW124ENSS GE Monogram~ Component Cooking Surfaces with 2 Burners and Right-Hand Controls | $469* View ZGW125ENSS GE Monogram~ Component Cooking Surfaces with 2 Burners and Left-Hand Controls | | |
| *Ovens* | | | |
| $3399* View ZET857SYSS GE Monogram~ 30" Convection Self-Cleaning Double Oven with Concealed Bake Element and Bread Proofing Mode | $3299* View ZET857DYSB GE Monogram~ 30" Convection Self-Cleaning Double Oven with Concealed Bake Element and Bread Proofing Mode | $3149* View ZET857WYWW GE Monogram~ 30" Convection Self-Cleaning Double Oven with Concealed Bake Element and Bread Proofing Mode | $2999* View ZET857BYBB GE Monogram~ 30" Convection Self-Cleaning Double Oven with Concealed Bake Element and Bread Proofing Mode |
| $2199* View ZET757WAWW GE Monogram~ 30" Convection Double Oven | $2149* View ZEK757WAWW GE Monogram~ 27" Convection Double Oven | $2119* View ZET757BABB GE Monogram~ 30" Convection Double Oven | $2069* View ZEK757BABB GE Monogram~ 27" Convection Double Wall Oven |
| $1829* View ZET837SYSS GE Monogram~ 30" Convection Self-Cleaning Single Oven with Concealed Bake Element and Bread Proofing Mode | $1729* View ZET837DYSB GE Monogram~ 30" Convection Self-Cleaning Single Oven with Concealed Bake Element and Bread Proofing Mode | $1669* View ZET837WYWW GE Monogram~ 30" Convection Self-Cleaning Single Oven with Concealed Bake Element and Bread Proofing Mode | $1599* View ZET837BYBB GE Monogram~ 30" Convection Self-Cleaning Single Oven with Concealed Bake Element and Bread Proofing Mode |
| $1339* View ZET737WAWW GE Monogram~ 30" Convection Single Oven | $1279* View ZET737BABB GE Monogram~ 30" Convection Single Oven | $1249* View ZEK737WAWW GE Monogram~ 27" Convection Single Oven | $1199* View ZEK737BABB GE Monogram~ 27" Convection Single Oven |
| *Compactors* | | | |
| $559* View ZCG3300VWW GE Monogram~ 12" Built-In Compactor with Reversible Panel, Powerful Side-Out Compacting Drawer, and Safety Lock and Key | $549* View ZCG3100VBB GE Monogram~ 12" Built-In Compactor with Reversible Panel, Powerful Side-Out Compacting Drawer, and Safety Lock and Key | | |
| *Disposers* | | | |
| $1029* View ZBD5900DSS GE Monogram Dishwasher with Stainless Steel Interior | $929* View ZBD5700DBB GE Monogram Dishwasher with Stainless Steel Interior | $929* View ZBD5700DWW GE Monogram Dishwasher with Stainless Steel Interior | $799* View ZBD3900CSS GE Monogram Dishwasher with Permatuff Interior |
| $749* View ZBD5600DBB GE Monogram Dishwasher with Stainless Steel Interior | $749* View ZBD5600DWW GE Monogram Dishwasher with Stainless Steel Interior | $649* View ZBD3500ZZBB GE Monogram Dishwasher with Permatuff Interior | $649* View ZBD3500ZZWW GE Monogram Dishwasher with Permatuff Interior |
| $559* View ZCG3300VWW GE Monogram~ 12" Built-In Compactor with Reversible Panel, Powerful Side-Out Compacting Drawer, and Safety Lock and Key | $549* View ZCG3100VBB GE Monogram~ 12" Built-In Compactor with Reversible Panel, Powerful Side-Out Compacting Drawer, and Safety Lock and Key | | |
| *Vent Hoods* | | | |
| $2149* View ZV881WSS GE Monogram~ 48" Professional Vent Hood with 2 Infrared Warming Lamps and 2 Halogen Lamps | $2149* View ZV891YSS GE Monogram~ 48" Professional Vent Hood with 2 Infrared Warming Lamps and 2 Halogen Lamps | $2049* View ZV890YSS GE Monogram~ 48" Professional Vent Hood with 2 Halogen Lamps | $1999* View ZV880WSS GE Monogram~ 48" Professional Vent Hood with 2 Halogen Lamps |
| $1649* View ZV871WSS GE Monogram~ 36" Professional Vent Hood with Infrared Warming Lamp and 2 Halogen Lamps | $1599* View ZV681YSS GE Monogram~ 36" Professional Vent Hood with Infrared Warming Lamp and 2 Halogen Lamps | $1549* View ZV670WSS GE Monogram~ 36" Professional Vent Hood with 2 Halogen Lamps | $1529* View ZV371YSS GE Monogram~ 30" Professional Vent Hood with Infrared Warming Lamp 2 Halogen Lamps |

*FIG. 5J*
*(PRIOR ART)*

| $1499* View ZV680YSS GE Monogram~ 36" Professional Hood with 2 Halogen Lamps | $1429* View ZV670YSS GE Monogram~ 30" Professional Hood with 2 Halogen Lamps | $1099* View ZV750SY GE Monogram~ 36" Vent Hood with 4 Halogen Lamps | |
|---|---|---|---|
| *Outdoor Cooking* | | | |
| $3419* View ZGG48L42ASS GE Monogram~ 48" Outdoor Cooking Center | $3369* View ZGG48N42YSS GE Monogram~ 48" Outdoor Cooking Center with 4 Grill Burners, Rotisserie, and Smoker | $2789* View ZGG48L31ASS GE Monogram~ 48" Outdoor Cooking Center | $2739* View ZGG48N31YSS GE Monogram~ 48" Outdoor Cooking Center with 3 Grill Burners, 2 Cooktop Burners, Rotisserie, and Smoker |
| $2599* View ZGG36L31ASS GE Monogram~ 36" Outdoor Cooking Center | $2569* View ZGG36N31YSS GE Monogram~ 36" Outdoor Cooking Center with 3 Grill Burners, Rotisserie, and Smoker | $2549* View ZGU48L4GWSS GE Monogram~ 48" Professional Gas Cooktop with 4 Burners, Grill, and Griddle | $2509* View ZGG48L40ASS GE Monogram~ 48" Outdoor Cooking Center with 4 Grill Burners and Smoker |
| $2499* View ZGU48N4GWSS GE Monogram~ 48" Professional Gas Cooktop with 4 Burners, Grill, and Griddle | $2459* View ZGG36L21ASS GE Monogram~ 36" Outdoor Cooking Center | $2459* View ZGG48N40YSS GE Monogram~ 48" Outdoor Cooking Center with 4 Grill Burners and Smoker | $2409* View ZGG36N21YSS GE Monogram~ 36" Outdoor Cooking Center with 2 Grill Burners, 2 Cooktop Burners, Rotisserie, and Smoker |
| $2399* View ZGG48L30ASS GE Monogram~ 48" Outdoor Cooking Center with 3 Grill Burners, 2 Cooktop Burners and Smoker | $2349* View ZGG48N30YSS GE Monogram~ 48" Outdoor Cooking Center with 3 Grill Burners and 2 Cooktop Burners | $2299* View ZGU48L6DWSS GE Monogram~ 48" Professional Gas Cooktop with 6 Burners and Griddle | $2299* View ZGU48L6RWSS GE Monogram~ 48" Professional Gas Cooktop with 6 Burners and Grill |
| $2249* View ZGU48N6DWSS GE Monogram~ 48" Professional Gas Cooktop with 6 Burners and Griddle | $2249* View ZGU48N6RWSS GE Monogram~ 48" Professional Gas Cooktop with 6 Burners and Grill | $2159* View ZGG36L30ASS GE Monogram~ 36" Outdoor Cooking Center with 3 Grill Burners and Smoker | $2149* View ZGU36L4DYSS GE Monogram~ 36" Professional Gas Cooktop with 4 Burners and Griddle |
| $2149* View ZGU36L4RYSS GE Monogram~ 36" Professional Gas Cooktop with 4 Burners and Grill | $2109* View ZGG36N30YSS GE Monogram~ 36" Outdoor Cooking Center with 3 Grill Burners and Smoker | $2099* View ZGU36N4DYSS GE Monogram~ 36" Professional Gas Cooktop with 4 Burners and Griddle | $2099* View ZGU36N4RYSS GE Monogram~ 36" Professional Gas Cooktop with 4 Burners and Grill |
| $2059* View ZGG36L20ASS GE Monogram~ 36" Outdoor Cooking Center with 2 Grill Burners, 2 Cooktop Burners and Smoker | $2049* View ZGU36L6YSS GE Monogram~ 36" Professional Gas Cooktop with 6 Burners | $2009* View ZGG36N20YSS GE Monogram~ 36" Outdoor Cooking Center with 2 Grill Burners, 2 Cooktop Burners and Smoker | $1999* View ZGU36N6YSS GE Monogram~ 36" Professional Gas Cooktop with 6 Burners |
| $1529* View ZGG27L21ASS GE Monogram~ 27" Outdoor Cooking Center | $1469* View ZGG27N21YSS GE Monogram~ 27" Outdoor Cooking Center with 2 Grill Burners and Rotisserie | $1349* View ZGU665WEXWG GE Monogram~ Gas Downdraft Cooktop with 5 Burners and Retractable Vent | $1299* View ZGU665BEXBG GE Monogram~ Gas Downdraft Cooktop with 5 Burners and Retractable Vent |
| $1199* View ZGG27L20ASS GE Monogram~ 27" Outdoor Cooking Center with 2 Grill Burners | $1169* View ZGG27N20YSS GE Monogram~ 27" Outdoor Cooking Center with 2 Grill Burners | $899* View ZGU651ESWG GE Monogram~ Gas Updraft Cooktop with 5 Burners | $849* View ZGU650ESBG GE Monogram~ Gas Updraft Cooktop with 5 Burners |
| $469* View ZGW124ENSS GE Monogram~ Component Cooking Surfaces with 2 Burners and Right-Hand Controls | $469* View ZGW125ENSS GE Monogram~ Component Cooking Surfaces with 2 Burners and Left-Hand Controls | | |

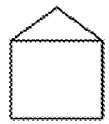 homeportfolio

THE WORLD'S BEST HOME DESIGN PRODUCTS what's new
PRODUCT EXPLORER
YOUR PORTFOLIO
brochure express™
resource guide
about us

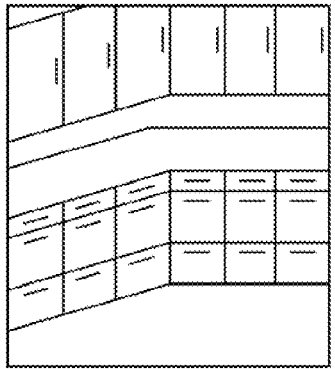

product of the day

July 3, 1999
Cheerful color in custom-built laminate-front cabinets adds brightness to even the dreariest of kitchens, from Arthur Bonnet.

quick start
Appliances, Architectural Hardware, Bath Accessories, Bathroom Fixtures & Fittings, Cabinetry, Cabinet Knobs & Pulls, Countertops, Fireplaces & Wood Stoves, Flooring, Furniture & Home Furnishings, Kitchen Sinks & Faucets, Lighting, Outdoor & Garden, Saunas & Steam Baths, Tile & Stone, Windows & Exterior Doors search for products (go)

kitchens • bath • *new!* home furnishings save your favorites   see sample portfolio what's new!
Let the light shine.

 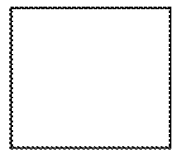 

text search
[_____|go]

category search
[Choose a Category |go]

what we're all about
HomePortfolio presents an independent editorial selection of the world's best home design products, coupled with electronic brochures created for paying manufacturers. It offers a broad selection of products, informative content, easy-to-use search capabilities, and personalized tools for rating products and saving or sharing favorites. By combining product information in new ways and offering it for free over the Web, HomePortfolio offers time-strapped consumers a dramatically more convenient way to shop for premium home design products.

PRODUCT EXPLORER • YOUR PORTFOLIO
home - product of the day  what's new  brochure express  resource guide  about us BuildingBlocks, HomePortfolio, Personal Portfolio, and Brochure Express are trademarks of BuildingBlocks Interactive Corporation and all rights therein are reserved.

*FIG. 6A*
*(PRIOR ART)*

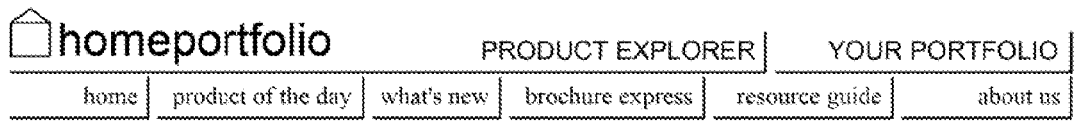

product explorer

Search History

All categories
Appliances

Refine Your Search
[_____] go

VIKING

GAGGENAU

Appliances

Barbeque Grills
Cooktops
Dishwashers
Range Hoods
Ranges
Refrigerators
Small Aplliances
Wall Ovens
Warming Drawings
Washers & Dryers
Wine Chillers
Woodburning Ovens

---

PRODUCT EXPLORER • YOUR PORTFOLIO
home - product of the day  what's new  brochure express  resource guide  about us BuildingBlocks, HomePortfolio, Personal Portfolio, and Brochure Express
are trademarks of BuildingBlocks Interactive Corporation and all rights therein are reserved.

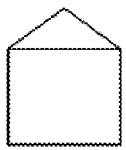

BuildingBlocks

Copyright - BuildingBlocks Interactive Corporation - 1997, 1998, 1999

*FIG. 6B*
*(PRIOR ART)*

product explorer

Search History

All categories
Appliances
Ranges

Refine Your Search
[____] go

How to Find & Choose Ranges

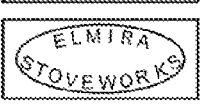

Ranges (view all 102)

products with in-depth information:
DCS (1), Elmira Stove Works (2), Viking® (8)

view products by brand:
AGA (3), Dacor (5), DCS (4), Dynasty (8), Elan (1) Elmira Stove Works (6), Five Star (5), Garland (6), GE Monogram (7), Heartland Appliances (6), Jenn-Air (8), KitchenAid (1), La Comue (6), St. George (3), Thermador (18), Viking®(10), Wolf Range (5)

view products by style:
Colonial (2), Commercial (53), Contemporary (49), Country (18), Hip (3), Modern (16), Retro (3), Traditional (60)

---

PRODUCT EXPLORER • YOUR PORTFOLIO
home - product of the day  what's new  brochure express  resource guide  about us BuildingBlocks, HomePortfolio, Personal Portfolio, and Brochure Express
are trademarks of BuildingBlocks Interactive Corporation and all rights therein are reserved.

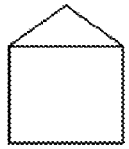

BuildingBlocks

Copyright - BuildingBlocks Interactive Corporation - 1997, 1998, 1999

*FIG. 6C*
*(PRIOR ART)* portfolio  PRODUCT EXPLORER | YOUR PORTFOLIO home | product of the day | what's new | brochure express | resource guide | about us

Search History

All categories
"Ranges"

Search Results:
premium
products
matching "Range"

showing 1 to 25
out of 266

Refine Your Search [____] go

10" High Interior Power Ventilation Hood
Viking®
click here to see more
electronic brochure available 18" High Ventilation Hood Ventilation Hood
Viking®
click here to see more
electronic brochure available 24" Undercounter Wine Cooler
Viking®
click here to see more
electronic brochure available 24" Wide Undercounter Refrigerator
Viking®
click here to see more 30" All-Gas Convection Range
Five Star
click here to see more

*FIG. 6D1*
*(PRIOR ART)*

30" Built-In Range with Cook'n'Vent Downdraft
Thermador
click here to see more 30" Downdraft Range
Thermador
click here to see more 30" Duel Fuel Slide-In Range
Thermador
click here to see more

30" Professional Range
Viking
click here to see more
electronic brochure available

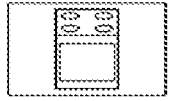
30" Free-Standing Range
Radiant
Jenn-Air
click here to see more

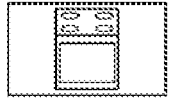
30" Free-Standing Range
Radiant
Jenn-Air
click here to see more

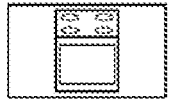
30" Free-Standing Range
Thermador
click here to see more

30" Free-Standing Range
Thermador
click here to see more

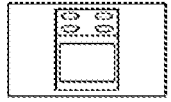
30" Professional Range
GE Monogram
click here to see more

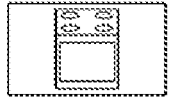
30" Slide-In Range
Thermador
click here to see more

30" Traditional Stock Wall Hood
Thermador
click here to see more

30" All Gas Range
Dacor
click here to see more

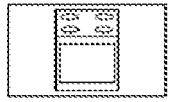
30" Antique System Gas Range
Elmira Stove Works
click here to see more

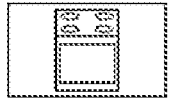
30" Convection-Thermal Built-In
Thermador
click here to see more

30" Duel Fuel Pro-Style
Radiant
Jenn-Air
click here to see more

*FIG. 6D2*
(PRIOR ART)

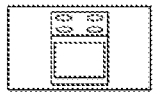 30" Duel Fuel Range
Viking®
click here to see more
electronic brochure available

 30" Duel Fuel Range
Dacor
click here to see more

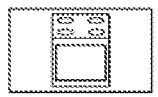 30" Electric Convection Thermal Range
Thermador
click here to see more

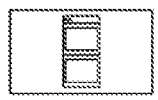 30" Electric Duel Oven
Viking®
click here to see more
electronic brochure available

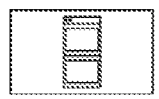 30" Electric Duel Oven
Viking®
click here to see more
electronic brochure available

Page 1 2 3 4 5 6 7 8 9 10
11 12 13 14 15 16 results per page  25  go

PRODUCT EXPLORER • YOUR PORTFOLIO
home - product of the day  what's new  brochure express  resource guide  about us BuildingBlocks, HomePortfolio, Personal Portfolio, and Brochure Express
are trademarks of BuildingBlocks Interactive Corporation and all rights therein are reserved.

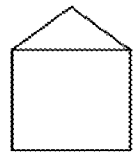

BuildingBlocks

Copyright - BuildingBlocks Interactive Corporation - 1997, 1998, 1999

*FIG. 6D3*
*(PRIOR ART)*

product explorer

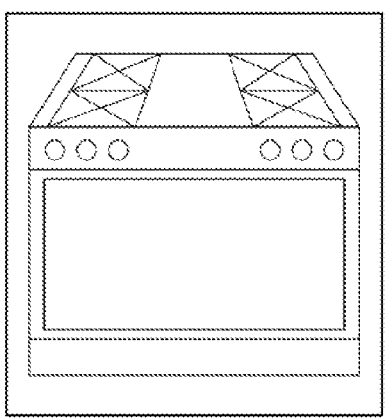

6 of 7 ◀ ▶ back to thumbnails

GE Monogram

48" Professional Range
Stainless Steel
ZDP48N6RWSS

Range with six porcelainized cast iron gas burners and grill. Electronic, pilotless ignition. Two electric ovens: large convection and small thermal.

Rate & Save
this product to your Personal Portfolio™ as:

- love it
- like it
- not my style
- email to a friend
- find similar our profile of GE Monogram other links
other Ranges from Ge Monogram
thumbnails of all featured products from GE Monogram
index of all featured products from GE Monogram featured Ranges

---

PRODUCT EXPLORER • YOUR PORTFOLIO
home - product of the day  what's new  brochure express  resource guide  about us BuildingBlocks, HomePortfolio, Personal Portfolio, and Brochure Express
are trademarks of BuildingBlocks Interactive Corporation and all rights therein are reserved.

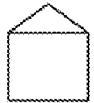

BuildingBlocks

Copyright - BuildingBlocks Interactive Corporation - 1997, 1998, 1999

*FIG. 6G*
*(PRIOR ART)*

product explorer

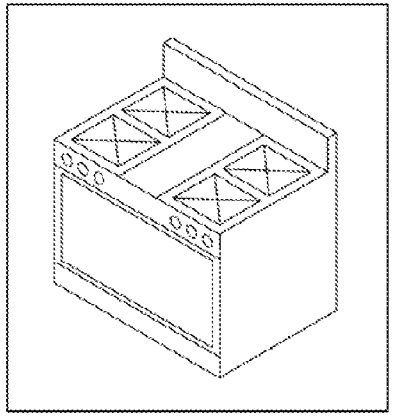

 7 of 7 ◀ ▶ back to thumbnails

GE Monogram

48" Professional Range
Stainless Steel
ZDP48N4GWSS

Range with four cast iron gas burners, grill, and stainless steel griddle. Electronic, pilotless ignition. Two electric ovens: large convection and small thermal.

Shown with 24" Backguard.

our profile of GE Monogram

--- other links
other Ranges from Ge Monogram
thumbnails of all featured products from GE Monogram
index of all featured products from GE Monogram featured Ranges

Rate & Save
this product to your Personal Portfolio™ as:

- love it
- like it
- not my style
- email to a friend
- find similar

---

PRODUCT EXPLORER • YOUR PORTFOLIO
home - product of the day  what's new  brochure express  resource guide  about us BuildingBlocks, HomePortfolio, Personal Portfolio, and Brochure Express
are trademarks of BuildingBlocks Interactive Corporation and all rights therein are reserved.

BuildingBlocks

Copyright - BuildingBlocks Interactive Corporation - 1997, 1998, 1999

*FIG. 6H*
*(PRIOR ART)*

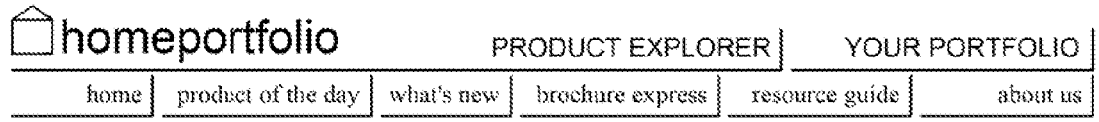

product explorer

Search History

All categories
Appliances
Range Hoods

Refine Your Search
[_____] go

How to Find & Choose Ranges

[ GAGGENAU ]

[ VIKING ]

( DCS )

Range Hoods (view all 75)

products with in-depth information:
DCS (1), Gaggenau (3), Viking®(3)

view products by brand:
Abbaka (9), Best by Broan (5), Broan (5), Cheng Design (6), Creda (1), DCS (1), FiveStar (1), Gaggenau (4), Garland (1), GE Monogram (3), Jenn-Air (1), KitchenAid (2), Miele (1), Modern-Aire (2), Prestige (5), Rangecraft (4), St. George (1), Stoves of America (1), Thermador (12), Vent-A-Hood®(6), Viking®(3), Wof Range (1)

view products by style:
Commercial (25), Contemporary (58), Country (7), Hip (9), Modern (34), Traditional (36)

---

PRODUCT EXPLORER • YOUR PORTFOLIO
home - product of the day  what's new  brochure express  resource guide  about us BuildingBlocks, HomePortfolio, Personal Portfolio, and Brochure Express
are trademarks of BuildingBlocks Interactive Corporation and all rights therein are reserved.

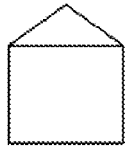

BuildingBlocks

Copyright - BuildingBlocks Interactive Corporation - 1997, 1998, 1999

*FIG. 61*
*(PRIOR ART)*

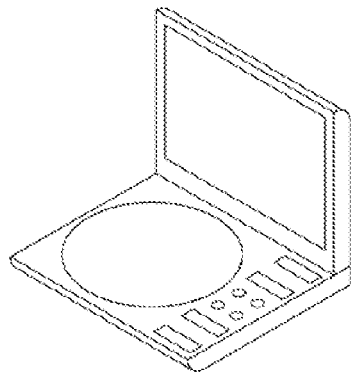
FIG. 7

Provisional Application #            Wizard Process Steps for Appliances

STEP ONE:

*FIG. 9A1*

Shopper enters, selects, or clicks on: Appliances
Wizard: Please select (click on) the words or phrases that best describe your need.

| Appliances: | | | |
|---|---|---|---|
| | | Kitchen | High-end, Extra features |
| Large | Large | Bath | |
| Small | Multiple | Laundry | Mid-range |
| | | House | |
| | | Other | Economy pricing & solid performance |

STEP TWO:

Shopper selects the following words and phrases, and the
Wizard: bolds and underlines the words and phrases as the Shopper selects them:

| Appliances: | | | |
|---|---|---|---|
| | | Kitchen | High-end, Extra features |
| Large | Large | Bath | |
| Small | Multiple | Laundry | Mid-range |
| | | House | |
| | | Other | Economy pricing & solid performance |

STEP THREE:

Wizard responds:
**please select any number of items
from the menu below:**

A. Appliance Menu

| Whole Kitchen |
|---|
| Built-in Ovens |
| Cook-tops |
| Dishwashers |
| Microwave Oven |
| Ranges |
| Ventilation hoods |
| Refrigerators |
| Ice Makers, stand-alone |
| Hot-water Dispensers |
| Wine Cellars |
| Food-Waste Disposers |
| Trash Compactors |
| Freezers |

Shopper selects the Whole Kitchen

B. Wizard pops up the Maker Menu:

| Makers |
|---|
| Bosh |
| Creda |
| Dacor |
| Dynasty |
| Gaggenau |
| GE Monogram |
| Jenn-Air |
| KitchenAid |
| La Cornue |
| Miele |
| Thermador |
| Viking |

Shopper selects GE Monogram

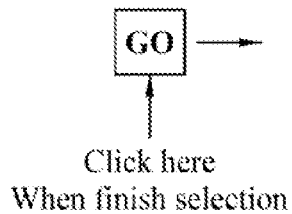

Click here
When finish selection

Copyright, Make Communications & Computing        March 10, 1999

Provisional Application #  Wizard Process Steps for Appliances

FIG. 9A2

STEP FOUR:

Wizard presents the following two options for entering Kitchen Dimensions:

Please enter the approximate dimensions of your kitchen in the Table.
Or skip the Table, and enter data in the boxes on the diagram below the Table, easy to use, automated drawing tool box is provided for varying shapes and dimensions.

Width [ ] feet [ ] inches
Length [ ] feet [ ] inches
Wall Height [ ] feet [ ] inches

|  | Height (inches) | Width (inches) | From Floor | From Corner 1 | From Corner 2 | From Corner 3 | From Corner 4 |
|---|---|---|---|---|---|---|---|
| Window 1 | | | | | | | |
| Window 2 | | | | | | | |
| Window 3 | | | | | | | |
| Window 4 | | | | | | | |

Kitchen Dimensions Data Entry Diagram:

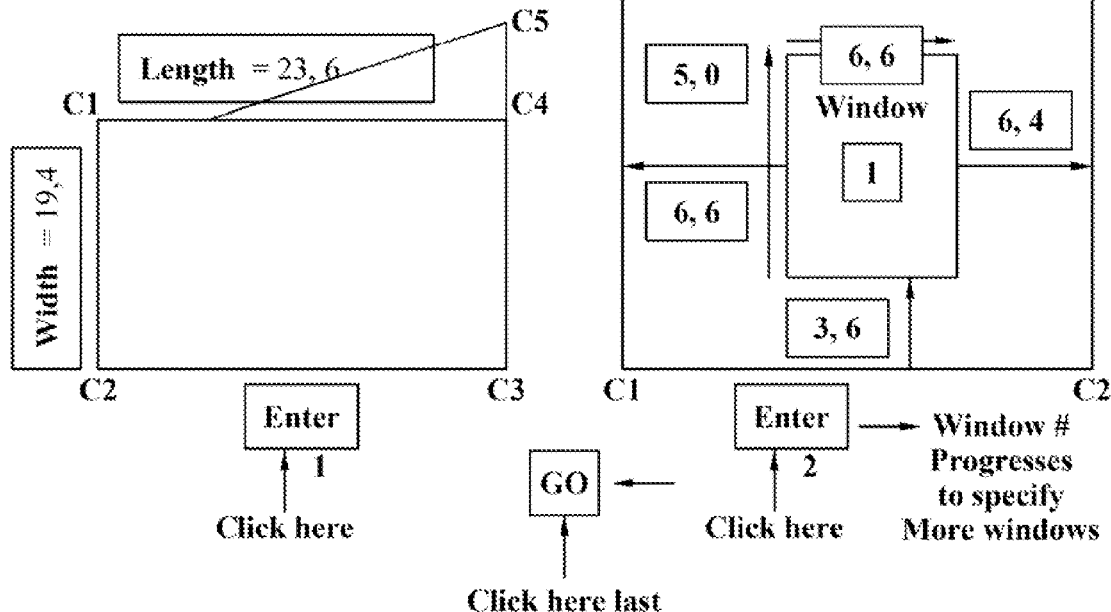

Copyright, Make Communications & Computing                March 10, 1999

Provisional Application #        Wizard Process Steps for Appliances

FIG. 9A3

STEP FIVE:

Enter Counter Top Material and Color:
| Granite, Dark brown |

Enter Cabinet Style, Wood, Color:
| Euro, Birch, Light Honey |

Select Appliance Exterior:
| Stainless Steel, Smoke Glass, White Glass, Almond Glass, Build-in with Cabinetry |

STEP SIX:

Wizard presents the GE Monogram Kitchen as shown in Figure 9B as a first recommendation, and states: Please click on the appliance you wish to configure first.

Shopper clicks on the Range.

STEP SEVEN:

Wizard presents the configuration chart as shown in Figure 9C, and states: Please click on the circles before the options you desire. When you finish, Click on "Submit" at the end of the Configuration Chart.

STEP EIGHT:

Wizard presents the configured result, price, and an order function screen: As shown in Figure 9D. The shopper can either order now, or store the configured data in a personal folder.

STEP NINE:

Shopper fills in the Order Screen (or store the result in the Personal Folder), Clicks on "Submit". Wizard logs order data, confirm the order, and Presents Figure 9B again for configuring the next appliances.

STEP TEN:

Repeat STEPS FIVE THROUGH EIGHT/NINE, or Exit (data is saved in the Personal Folder).

STEP ELEVEN: and continuing, or Exit (data would be saved in the Personal Folder):

Cabinet, Counter Top, Fixtures, Lighting, Flooring Detailed selection Processes.

Copyright, Make Communications & Computing        March 10, 1999

GE Monogram HomePage     The Portal to Good Living

- Shopping
- Auction, Sales
- Build to Order
- Personal Concierge

- Registration
- MyFolder
- Listings
- Search

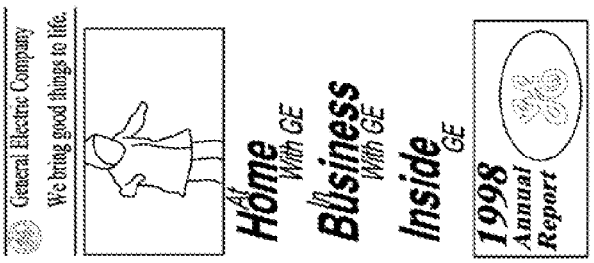

Bon Vivre    GE Monogram

Communications
Concierge
Executive
Web Concierge

- Articles, Magazines
- News, Events
- Chat, Forum
- Bulletin Board
- RFP, RFQ

- E-mail
- Calendar
- Reminder
- Address Book
- Net2Phone
- Click2Dial

GE Appliances

BonVivre.com : Home Furnishings : Kitchen : Appliances : GE Monogram

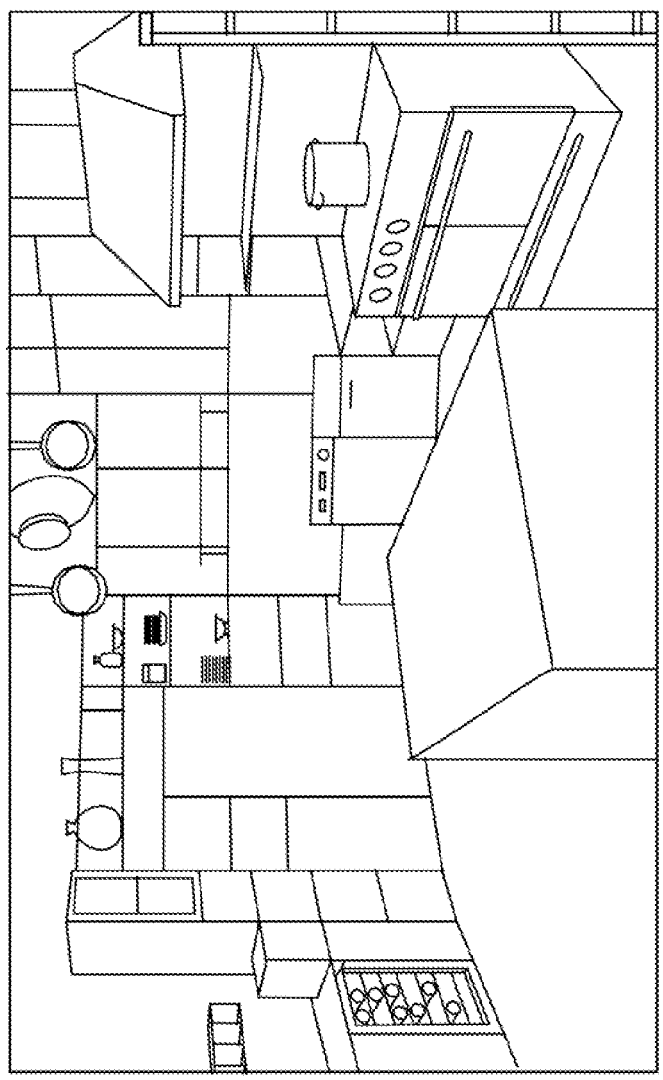

Every Kitchen need a Great Beginning

GE Monogram | Professional Cooking | Built-In Refrigerators | Hoods | Microwave Ovens | Wine Chillers | Dishwashers
| Merchant Services | FAQ | Help | Site Map | Home | Top file://D:\BVProject\BonnieVie\GEMonogram\Main.html

The Portal to Good Living

Bon Vivre

- Shopping
- Auction, Sales
- Build to Order
- Personal Concierge

- Registration
- My Folder
- Listings
- Search

- Communications Concierge
- Executive Web Concierge

- Articles, Magazines
- News, Events
- Chat, Forum
- Bulletin Board
- RFP, RFQ

BonVivre | Home Furnishing | Kitchen | Appliances | GE Monogram | Professional Range

GE Monogram® Professional-Cooking Products
The GE Monogram® professional free-standing ranges include built-in cooktops, backguards, and hoods.

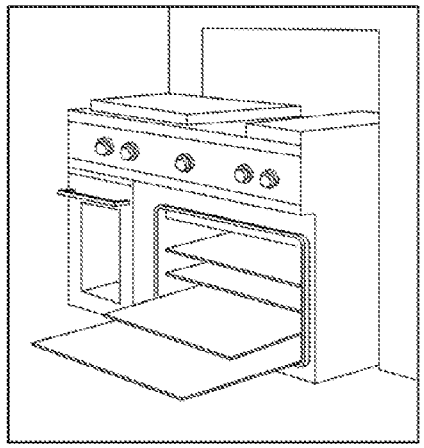

| Range Width: | ○ 48"  ○ 36"  ○ 30" | |
|---|---|---|
| Fuel: | ○ Natural Gas  ○ Liquid Propane Gas | |
| With Oven: | ○ Yes  ○ No | |
| 48" Cooktop: | ○ 6 Burners & 1 Grill | Picture |
| | ○ 6 Burners & 1 Griddle | Picture |
| | ○ 4 Burners, 1 Grill & 1 Griddle | Picture |
| 36" Cooktop: | ○ 6 Burners & 1 Grill | Picture |
| | ○ 6 Burners & 1 Grill | Picture |
| | ○ 4 Burners, 1 Grill & 1 Griddle | Picture |
| 30" Cooktop: | ○ 4 Burners | Picture |
| Backguard: | ○ 1-1/2" Trim  ○ 12" Height  ○ 22" Height | |
| Hood Styles: | ○ Professional Hoods (48" & 36") | Picture |
| | ○ Professional Straight-Sided Hood (48", 36" & 30") | Picture |
| | ○ Professional European-Style Hoods (36" only) | Picture |
| Hood Lamps: | ○ 2 Infrared Warnings & 2 Halogens (48" only) | |
| | ○ 1 Infrared Warnings & 2 Halogens (36" & 30" only) | |
| | ○ 2 Halogens (48", 36" & 30") | |
| | ○ 4 Halogens (36" European-Style only) | |
| Hood Accessories: | ○ 6" Duct Cover (48" & 36") | Detail |
| | ○ 12" Duct Cover (48" & 36") | Detail |
| | ○ Transition Adaptor for Horizontal Venting (48" Professional only) | Detail |
| | ○ Transition Adaptor for Vertical Venting (48" Professional only) | Detail |

*Detailed Information*

View Configuration    Model Specifications

Owners Manual ☐    Installation Dimensions ☐

Similar Products    Other Makers

*Other GE Monogram® Products*

Beverage Centers    Built-in Ovens
Compactors    Dishwashers
Icemakers    Microwave Ovens
Outdoor Cooking    Refrigerators
Water Systems    Wine Chillers © 1998, 1999 BonVivre.com Inc. All Rights Reserved.

[ Next ]  [ Reset ]

*FIG. 9C*

The Portal to Good Living

- Shopping
- Auction, Sales
- Build to Order
- Personal Concierge

- Registration
- My Folder
- Listings
- Search

Bon Vivre

- Communications Concierge
- Executive Web Concierge

- Articles, Magazines
- News, Events
- Chat, Forum
- Bulletin Board
- RFP, RFQ

BonVivre | Home Furnishing | Kitchen | Appliances | GE Monogram | Order Form

| Code | Item | Price |
|---|---|---|
| ZDP48N4GWSS | Natural Gas 48" Professional Range with 4 Burners, Grill and Griddle | $6,899.00 |
| ZX22B48WSS | 22" Backguard | $300.00 |
| ZV881WSS | 48" Professional Vent Hood with 2 Infrared Warming and 2 Halogen Lamps | $2,149.00 |
| Total | | $9,348.00 |

To Place an Order, Have a Customer service Personnel Contract Me, or both:

Member ID: [          ]
Name: [First Name] [M] [Last Name]
Address: [          ]
City: [          ] State: [  ] Zip: [    ]
Phone: ( [   ] ) [   ] - [    ]
Fax: ( [   ] ) [   ] - [    ]
E-mail: [          ] @ [          ]

Preferred Method of Initial Contact: (Please select ONE)
○ Post Mail  ● E-mail  ○ Telephone  ○ Fax ---Place an Order---
(A 10% down payment will be charged to your credit card)
Approximate Delivery Date:
[--Week--▼] week, [--Month--▼], [--Year--▼]
Credit Card Number:
[    ] - [    ] - [    ] - [    ]
Valid Through [08▼] / [1999▼]

☐ Configure Other Appliances
☐ See Cabinetry
☐ Have a Sales repetitive contact me
☐ Have a Kitchen Designer contact me
Comments and Requests
[                    ]

[Submit] [Reset]

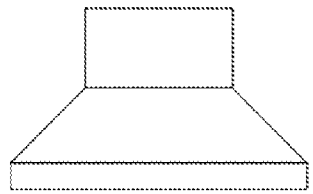
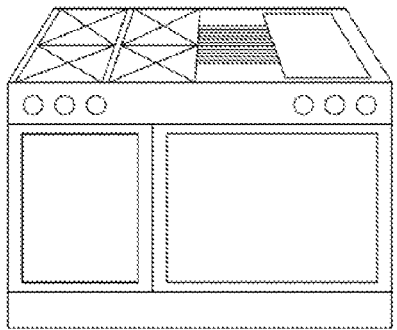

| Merchant services | FAQ | Help | Site Map | Home | Top |
© Copyright Make Communications & Computing   Phone: (408) 354-6273   Fax: (408) 354-6293
18850 Blythswood Dr., Los Gatos, CA. 95030   3/16/1999

Provisional Patent Application     Lin-Hendel Apparel Wizard

Apparel Wizard: Apparel Wizard is invoked from the Wizard Library when the category is selected through category listing, search, or graphical icons.

*STEP ONE:* Instance Specific Profiling

Shoppers enters the primary purpose of this e-shopping trip either through Search, Icon, or Category paths. In this example: Apparel \ Women \ Business Formal, is selected.

Wizard presents the featured items in that category, and a set of questionnaires in the from of "menu" choices and a data entry tables. See Figure 11B.

Wizard: Click on or Check your selections.
You may skip making selections for any topic to keep your options open. However, you may get more recommendations than you would like to see.

You are shopping Business Formal Apparel for use in:

| X | Spring, | X | Summer, | | Fall, | | Winter. |
| | Customer Visits, | | Business Meetings, | | Giving Speech. |

Check here [ ] for making Exclusion-selections in the tables below. You may also double-check the boxes in the Table below to mark fabric or colors you don't want.

Fabric:          Color Tones:

| | Fabric | | Color Tones | | Color Tones |
|---|---|---|---|---|---|
| | Cotton | | White, Cream | | Green |
| | Linen | | Sand, Beige | | Aqua |
| | Silk | | Brown | | Pale Blue |
| | Wool | xx | Pink, Peach | | Navy Blue |
| | Wool Blends | | Red | | Violet |
| | Spandex Blends | xx | Orange | | Purple |
| xx | Synthetics | xx | Yellow, Gold | | Black |
| | Viscose | | Mint | | Charcoal, Grey |

Types: Suits (with Trousers, with Skirts, with Both), Dresses, Coordinates, Separates,

BonVivre Select: Business Formal Brands are presented as "featured" to the left.

(as the pointer is brought to a designer, a brief description shows up in the pointer box.)

| | DKNY | | Dolce & Gabbana | | Elegance | | Max Mara | |

Copyright, Make Communications & Computing          March 10, 1999

*FIG. 11A2*

Provisional Patent Application			Lin-Hendel Apparel Wizard

_STEP TWO:_ Personal Measurements Profiling:

Wizard: for the best fit, please measure and enter your (or intended wearer's) dimensions as completely and accurately as you can.

|  | Inches |
| --- | --- |
| Chest (largest around) |  |
| Waist (smallest around) |  |
| Hip (largest around) |  |
| Shoulder to Shoulder |  |
| Arm Length |  |
| Neck to Waist |  |
| Waist to Hip |  |
| Waist to Crouch |  |
| Waist to Knee |  |
| Waist to Ankle |  |

Or, you may enter your size below. Note there are sizing variations between different makers and designers.

☐

_STEP THREE:_ Style Preference Profiling

Styles: Check the boxes to choose the Styles you prefer, or Double Check to exclude.
(as the pointer is brought to a style, the brief description and key designers appears)

|  |  |
| --- | --- |
|  | Conceptual Chic |
|  | Easy Does It |
|  | Ethnic |
|  | Form Fitting Feminine |
|  | Great Romantics |
|  | Modern Classics |
|  | Perfect Cutters |
|  | Urban Sporty |

Other Styles: Enter keywords here to describe other styles not included above.

Your Favorite Labels: Enter your favorite labels, designers, or makers here. Or, you may use the guide in the next Table Copyright, Make Communications & Computing			March 10, 1999

Provisional Patent Application #

*FIG. 11A3*
Lin-Hendel Apparel Wizard

STEP FOUR: Designer Preference Profiling

Wizard: Please click on favored designers, or skip if you have no preference.

| Conceptual Chic | Ethnic | Easy Does It | Form Fitting | Romantics |
|---|---|---|---|---|
| Ally Capellino | Bruuns Bazaar | Armani | Antonio Berardi | Helen David |
| Ann Demeulemeester | Christa Davis | Nichoe Farhi | Copperwheat Blundell | Pearce Fionda |
| Comme des Garcons | Dosa | Herm'es | Chlo'e | John Galliano |
| Shirin Guild | Marni | Betty Jackson | Collette Dinnigan | Ghost |
| Calvin Klein | Dries van Norten | Donna Karan | Alberta Ferretti | Maria Grachvogel |
| Martin Margiela | Sonja Nuttall | Ben de Lisi | Bella Freud | |
| Deborah Milner | Clements Ribeiro | Missoni | Dolce & Gabbana | |
| Issey Miyake | John Rocha | Amanda Wakeley | Elspeth Gibson | |
| Mui Mui | Anna Sui | | Christian Lacroix | |
| Josephus Thimister | | | Versace | |
| Yohji Yamamoto | | | Vivienne Westwood | |
| | | | Matthew Williamson | |
| | | | | |

| Modern Classics | Perfect Cutters | Urban Sporty | Enter Others Below |
|---|---|---|---|
| Burberry | Hussein Chalayan | Katharine Hamnett | |
| C'eline | Owen Gaster | Tommy Hilfiger | |
| Chanel | Jean Paul Gaultier | Calvin Klein | |
| Jasper Conran | Y'ves Saint Laurent | Helmut Lang | |
| Gucci | Alexander McQueen | Prada | |
| Ralph Lauren | Olivier Theyskens | Jill Sander | |
| Jean Muir | | Narciso Rodriguez | |
| Sonia Rykiel | | | |
| Paul Smith | | | |
| Louis Vuitton | | | |
| | | | |

Enter your favorite style or designers here, if not shown above. Please also enter any comments or suggestions to help us improve our Wizard.

Copyright, Make Communications & Computing   March 10, 1999

Provisional Patent Application

*FIG. 11A4*
Lin-Hendel Apparel Wizard

STEP FOUR: Designer Preference Profiling

Wizard: Please click on favored designers, or skip if you have no preference.

| Conceptual Chic | Ethnic | Easy Does It | Form Fitting | Romantics |
|---|---|---|---|---|
| Ally Capellino | Bruuns Bazaar | Armani | Antonio Berardi | Helen David |
| Ann Demeulemeester | Christa Davis | Nichoe Farhi | Copperwheat Blundell | Pearce Fionda |
| Comme des Garcons | Dosa | Herm'es | Chlo'e | John Galliano |
| Shirin Guild | Marni | Betty Jackson | Collette Dinnigan | Ghost |
| Calvin Klein | Dries van Norten | Donna Karan | Alberta Ferretti | Maria Grachvogel |
| Martin Margiela | Sonja Nuttall | Ben de Lisi | Bella Freud | |
| Deborah Milner | Clements Ribeiro | Missoni | Dolce & Gabbana | |
| Issey Miyake | John Rocha | Amanda Wakeley | Elspeth Gibson | |
| Mui Mui | Anna Sui | | Christian Lacroix | |
| Josephus Thimister | | | Versace | |
| Yohji Yamamoto | | | Vivienne Westwood | |
| | | | Matthew Williamson | |

| Modern Classics | Perfect Cutters | Urban Sporty | Enter Others Below |
|---|---|---|---|
| Burberry | Hussein Chalayan | Katharine Hamnett | |
| C'eline | Owen Gaster | Tommy Hilfiger | |
| Chanel | Jean Paul Gaultier | Calvin Klein | |
| Jasper Conran | Y'ves Saint Laurent | Helmut Lang | |
| Gucci | Alexander McQueen | Prada | |
| Ralph Lauren | Olivier Theyskens | Jill Sander | |
| Jean Muir | | Narciso Rodriguez | |
| Sonia Rykiel | | | |
| Paul Smith | | | |
| Louis Vuitton | | | |

Enter your favorite style or designers here, if not shown above. Please also enter any comments or suggestions to help us improve our Wizard.

Copyright, Make Communications & Computing          March 10, 1999

Provisional Patent Application  
\#

FIG. 11A5  
Lin-Hendel Apparel Wizard

STEP FIVE: Wizard searches for qualified items to recommend to the shopper.

The Shopper makes selections in the tables above, and/or enters favored designers not included in the table.

The Wizard compiles data, create comparison files, combine the pre-determined apparel rules database, and search the intelligent apparel database for products that qualify. (See Figure 11C)

STEP SIX: Interactive Selection and Accessory Configuration (See Figure 11D)

The Wizard presents the recommendations in a graphical array format.

The Shopper reviews the recommendations and details, with the aid of the Wizard, makes selections, adjustments, color choices, and request accessory recommendations, make choices and shopping decisions. Or, the shopper may request Wizard to modify input and search for other recommendations.

STEP SEVEN: Fitting and Alteration Alert

The Wizard formats the final selected apparel sets, redisplay with correct chosen combinations and specifications, as well as recommend alterations if needed.

STEP EIGHT: Personalized Display/Demonstration Option

The Shopper may request Personalized Display/Demonstration Option by entering descriptions of personal physical makeup and characteristics.
The Wizard selects and composes suitable model, and simulates run-way display with the assembled apparel ensembles.

STEP NINE: Place Order, Continue Shopping, Store Data, or Exit

The shopper can (1) approve the ensembles, place order and exit, or (2) add purchases to the shopping cart and continue shopping; (3) make further modifications; (4) store data in his/her Personal Folder for later revisit.

| Order | After Order Process, the shopper has the option either to continue shopping or exit. |
|---|---|
| Add to Cart, Continue Shopping | The Wizard assist in shopping either in the same category, other categories, or for a different wearer (buying for someone else.) |
| Modify | The profile and ensemble data are presented for modification. |
| Save in Personal Folder | The data can be automatically saved, while the shopper retains the option to delete. |
| Exit | |

Copyright, Make Communications & Computing                    March 10, 1999

The Portal to Good Living
Bon Vivre

- Shopping
- Auction, Sales
- Build to Order
- Personal Concierge
- Registration
- My Folder
- Listings
- Search
- Communications Concierge
- Executive Web Concierge
- Articles, Magazines
- News, Events
- Chat, Forum
- Bulletin Board
- RFP, RFQ
- Email
- Calender
- Reminder
- AddressBook
- Net2Phone
- Click2 Dial BonVivre.com | Apparel | Women | Business Formal | Featured

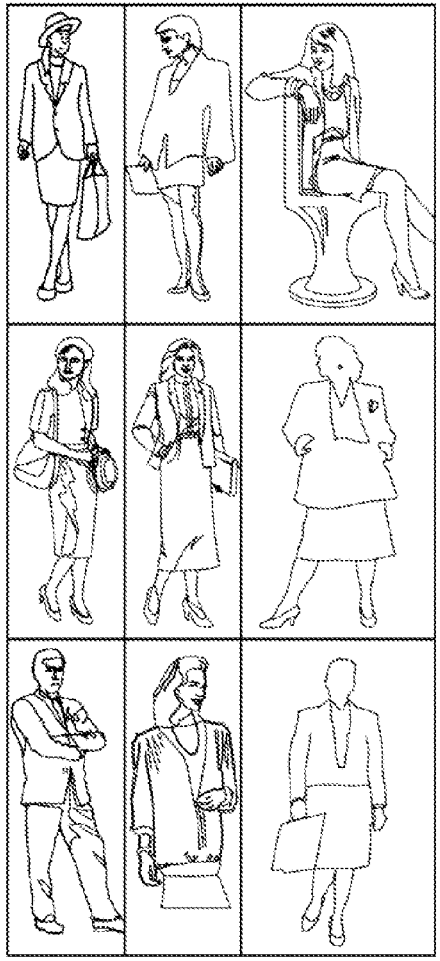

Apparel Wizard | Women | Business Formal
If you have no preferences to any of the questions below, you may leave them blank.

For
☐ Spring ☐ Summer ☐ Autumn ☐ Winter
☐ Customer Visit ☐ Giving Speech ☐ Board Meeting

Color Tones ☐ Check here for Exclusions
☐ White, Cream ☐ Red ☐ Green ☐ Violet
☐ Sand, Beige ☐ Orange ☐ Aqua ☐ Purple
☐ Brown ☐ Yellow, Gold ☐ Pale Blue ☐ Black
☐ Pink, Peach ☐ Mint ☐ Navy Blue ☐ Charcoal Gray

Fabric ☐ Check here for Exclusions
☐ Cotton ☐ Silk ☐ Woolx Blends ☐ Synthetics
☐ Linen ☐ Wool ☐ Spandex Blends ☐ Voscose

Measurement:
A. Chest (largest around): _____
B. Waist (smallest around): _____
C. Hip (largest around): _____
D. Shoulder to Shoulder: _____
E. Arm Length: _____
F. Neck to Waist: _____
G. Waist to Hip: _____
H. Waist to Crouch: _____
I. Waist to Knee: _____
J. Waist to Ankle: _____

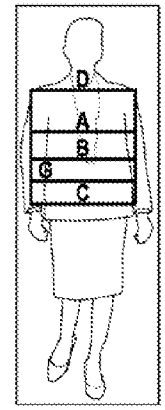

Styles ☐ Check here for Exclusions
Check the boxes before the Styles you prefer.
☐ Conceptual Chic ☐ Easy Does it ☐ Etnic
☐ Form Fitting Feminine ☐ Great Romantics ☐ Modern Classic
☐ Perfect Cutters ☐ Urban Sporty Other Styles _____

BonVivre™ Select Designer/Maker
☐ DKNY ☐ Dolce & Gabbana ☐ Elegance ☐ Max Mara
Add your favorite designers to our library; help us improve...

- Shopping
- Auctions, Sales
- Build to Order
- Personal Concierge

- Registration
- My Folder
- Listings
- Search

The Portal to Good Living

Bon Vivre

- Communications
  Concierge
- Executive
  Web Concierge

- Articles, Magazines
- News, Events
- Chat, Forum
- Bulletin Board
- RFP, RFQ

BonVibre.com | Apparel | Women | Business Formal | Featured

Drag & drop selected shoes to the dress/suit you want to match with.

My Choices: Spring & Summer

Color Tones — ☐ Check here for Exclusions
- ☑ White, Cream  ☐ Red          ☐ Green
- ☑ Sand, Beige   ☐ Orange       ☐ Aqua
- ☐ Brown         ☐ Yellow, Gold ☐ Pale Blue
- ☑ Pink, Peach   ☐ Mint         ☑ Navy Blue Fabric — ☐ Check here for Exclusions
- ☐ Cotton  ☐ Silk  ☐ Woolx Blends   ☐ Synthetic
- ☐ Linen   ☐ Wool  ☐ Spandex Blends ☐ Viscose Submit    Reset

*FIG. 11C2*

SYSTEM AND METHOD FOR INTERACTIVE, COMPUTER ASSISTED PERSONALIZATION OF ON-LINE MERCHANDISE PURCHASES

PRIORITY NOTICE

This Non-Provisional U.S. Patent Application claims the benefit of the Jul. 20, 1999 filing date of Provisional U.S. Patent Application Ser. No. 60/144,712.

COPYRIGHT NOTICE

Contained herein is material that is subject to copyright protection. The owner has no objection to the facsimile reproduction of the patent disclosure by any person as it appears in the Patent and Trademark Office files or records, but otherwise reserves all rights to the copyright whatsoever.

BACKGROUND OF THE INVENTION

1. Field of the Invention

The present invention relates to methods and apparatus to mass-personalize and customize merchandize, and provide online services for their purchase. These services include personalized configuration, intelligent recommendations, guided selection, and simplified purchase processes.

2. Description of Related Art

The advent of the Internet and Internet Commerce allows consumers to search for, or purchase merchandize on-line over a global computer network from anywhere at anytime. The browsing, selection, and purchasing processes on the Internet Commerce sites are similar to that of the information sites: "browse a list, select one item, view, back to the list, select another item, view, back to the list, and repeat," thus cycling, until desired information is found, or a purchasing decision is made. FIG. 1 illustrates this conventional Internet shopping process in detail. It is repetitive, click/wait intensive, and lack intelligent computerized assistance.

The home pages of Internet shopping sites universally contain three parts: a category list, a "featured" merchandize list, and a "search" box. Shoppers can choose to browse by categories, or by entering a "search" phrase in the "search" box. Or, if the "featured" list looks interesting, browse the featured list. All three routes can only be done with a "one-at-a-time" process. The shopper can only select one category among the list of categories at a certain categorization level, by moving the cursor to the text-string representing the category, using the computer input device—the "mouse." Then, click the left button on the "mouse," and wait for the linked page to download to the shopper's computer from the site server. The page usually contains the next level categories organized under that particular category, unless the end of the particular category path is reached.

Similarly, only one "featured item" can be selected and clicked, for its linked descriptions to download, and viewed. The search function usually yields either too large a list, or too small and incomplete of a list, or nothing at all.

Even the most advanced state-of-the-art search engines do not always work effectively to find "all" of the items that truly "qualify" the intended/desired rendered with the search phrase. When a search phrase is entered to command the search engine, the search engine looks for descriptions containing any number of words present in the search phrase. For example, if "romantic summer dresses" is entered, the search engine will likely return with a very large list of all items with descriptions containing any combination of the three words, such as "romantic" anything, "summer" anything, and anything with "dresses" In the description. Such example is shown with Shopping.Yahoo.Com (FIG. 2). In FIG. 3A1. "Romantic Dresses" is entered into the "search" box of Shopping.Yahoo.Com under Women's Apparel category. The result list contains a "Romantic" CD, a "Romantic" jewelry set, and two "Romantic" cardigans. No "dresses" were found, probably because the descriptions of dresses do not contain the word "dresses," but use "dress" as a descriptor instead. The more advanced engines allow users to specify searching for "all of the words," or the "exact phrase." Such engines limit the size of the result list. However, they also risk not finding or not including qualified items on the result list.

Therefore, in most cases, category browsing is the preferred path for serious browsers looking for information or merchandize. The basic steps of the category browsing process can be described as the following:

I. Browse and surf the first level of available/listed categories of the site on the home page.

II. Choose a category of interest, click, wait for a web page to download onto the shopper's computer screen, and view the subcategories thus brought forth to the shopper's computer from the site server.

III. Repeat step II, until the last level of the categorization path on the site is reached, and a merchandize item list is displayed on the shopper's computer screen.

IV. Review the item list, and choose and click on ONE item from the list that seems interesting.

V. Wait for the description of the item to be sent from the site-server.

VI. Review the description, and decide whether you wish to purchase the item.

VII. If affirmative, "add" the item into the virtual "shopping cart" of the site. If negative, click on the "back" function icon, and return to the list to choose another item on the list. Thus cycling.

VIII. Choose to "check out," or "continue shopping."

IX. If "continue shopping" is chosen, the server sends the home page onto the shopper's computer, and steps I through VIII are repeated.

X. You may view the items in the "shopping-cart," one-at-a-time, by clicking on ONE item among the list of items you have "added" into the "shopping cart;" wait for the description to download from the server onto the shopper's computer display screen. Review the information. Return to the "shopping cart" content list, and repeat the process. What you see in this process is exactly the image and description of the item as seem in Step V.

There is no artificial intelligence or process automation applied to enable or perform selection, recommendation, configuration, or custom order functions.

A manifestation of this known-art Internet shopping process is illustrated in the purchasing of women's apparel items from Shopping.Yahoo.Com, the largest, best funded, and the most advanced E-Commerce portal. For details, see FIG. 2, and its description in the "BRIEF DESCRIPTION OF THE DRAWINGS" section.

The "search" function bypasses the category-browsing steps. By entering a short text string in the "search" box, and invoke the search function by clicking on the "search" button," the search engine looks for items in the site-server database containing either any combination of words in the text string, and sends a listing of search result with a brief description to each item on the list to the desk-top display screen. Usually some items on the list are relevant, and some are not. The viewer of the list performs the intelligence process: "browse" the list, make judgment, select one item, click, wait, view the description page sent forth, make a decision, return to the list, pick another item, and repeat."

The "search" process is illustrated with the Shopping.Yahoo.Com site. When the word "skirt" (itself also a category in women's apparel) is entered in the "search" box on the site home-page FIG. 3B1, FIG. 3B2 is sent from the site-server. There are 10 category-paths where the word "skirt" is found, and 2,949 product entries found in the product database containing a word "skirt." The first 1 through 20 items are listed in FIGS. 3B2, 3B3, and 3B4. In order to narrow the search result to a manageable size, we enter into the "search box" on FIG. 3B4, "mid-length skirts" (a text string that is also a subcategory for "Skirts" on the category listing), click on the "search" button, and wait. FIG. 3C1 is sent from the site server, showing one category path with 6 items, as well as the 2 other items found outside of the category path. When the category path is clicked, the listing of the 6 items is shown on the subsequent page sent from the site-server as shown in FIG. 3C2. If the search phrase is changed to "long skirts," itself also a subcategory under "Skirts" category, FIGS. 3D1 and 3D2 are sent to the shopper's computer screen from the site server, showing the 3 category paths where the phrase "long skirts" are found, and the first 20 of the 354 items found in the Shopping.Yahoo.Com linked e-stores outside of the 3 search category paths. Search results are less convincing when a "non-category" phrase is entered. As described earlier in FIG. 3A, results for "romantic dresses." The two items of the four found are not apparel items, and the other two items are cardigans, not dresses. FIG. 4 shows a similar shopping process at another state-of-the-art site, GAP.COM.

Other examples of merchandize that require fitting and coordination of sub-systems are large Kitchen Appliances. While there are sites that provide information and refer appliance shoppers to dealers and resellers, there exists no Internet site to date, where large appliances, such as kitchen appliances can be purchased. The most advanced sites that contain the most comprehensive information, graphics, specifications, and sophistication of kitchen appliances presentations are the GEAppliances.Com and the HomePortfolio.com sites. The GEAppliances.Com (FIG. 5) is the appliances section of the General Electric site, GE.Com. The HomePortfolio.Com (FIG. 6) is an up-scale home furnishing information portal site. The algorithm and processes on these two sites are the same as other sites, generally described in the process flowchart FIG. 1 and the process step descriptions in pages 3 and 4 of this application. There is no correlation in the database between a number of required items that form a subsystem or a system; such as correlating Ventilation Hoods, lighting components and other accessories, and Back-splashes, to a group of Cooking Ranges with various options. The Cooking Ranges, for example, is presented as a category separate from the Hoods and the Back-guards, listed with separate and individual model numbers under each brand, with various available combinations of options of size, width, cook-top/oven arrangements, and fuel options. Each combination of is treated as an individual product with its own model number and an individual view button to view details one-at a time, and otherwise uncorrelated (See FIG. 5). The Back-guards (back-splashes) to the ranges and the Ventilation Hoods are treated as separate product lines. It is entirely up to the shopper to surf and view all information, category-by-category, and item-by-item, to figure out what are out there:

the options, the connections between models, what is available to match what. This is an intimidating and tedious task even for the professionals in the "know." Thus, all appliance sites serve only as information posting, lead generation, and dealer referral network, without purchasing or ordering functions.

The most recent "Virtual-Reality" or "3D software, such as Macromedia Shockwave are devised to allow using the pointer and mouse to rotate a still photograph of an individual still-object on the computer screen to connect to, and view images of the other sides of the object (the shopper's computer needs to be equipped with the required client software), as shown in FIG. 7. In other instances, Apple Quick-Time allows computer users to use the mouse device to "rotate" a room, by downloading and accessing images taken by a "360°" rotating/panning camera to scan a stationary house or a store from continually varying angles. Primitive motion-video or streaming-video are used to broadcast conferences, motion-pictures/movies, or television-like programming to the shopper's computer over the Internet or the Corporate Intranet.

An object container, such as a "folder," a "shopping cart," or a "shopping bag," are used to deposit multiple individual items as a list of unrelated individual instances, when the on-line shopper purchases multiple items, as individual instances of purchases, unassisted and self-coordinated, or, randomly. These containers can be "opened" to see the collected items listed separately as individual items. Only one link token representing one single particular item can be clicked to allow the shopper to view the graphics and the detailed descriptions of the item again, as seen before it was deposited into the shopping container (FIGS. 2M, 1N, and 1O).

No process, method or apparatus exists to-date on the Internet that performs recommendation, selection, coordination, and composition and display systematically, of the gathering of information of, and/or purchases of multiple items.

SUMMARY OF THE INVENTION

The present invention relates to methods and apparatus to mass-personalize and customized merchandize and purchase services on-line, such as intelligent recommendations, guided selection and purchase processes, configuration, coordination, fitting, composed and animated presentation, demonstration, etc., based on individual customer input and intelligence rules-databases and comparison algorithms.

Interactive, intelligent process and rule-driven enquiry-database, intelligent product databases, artificial intelligence rules, data comparison algorithm, graphics and video design, composition, animation software, graphics and video input and output hardware and software, and/or video streaming are used to (1) guide consumers through needs and tastes definition process, (2) make recommendations, (3) narrow selections, (4) determine the fit, (5) configure and optimize various options of subsystems into a complete system, (6) layout, compose and/or animate, and (7) display the fitted system of multiple items with the recommended and/or selected settings. Automated virtual reality that does not require shopper's mouse movement command and control is used for displaying stationary objects where desired, and modeled and animated motion video is used where appropriate or desired to display those objects to be used in motion.

BRIEF DESCRIPTION OF THE DRAWINGS

FIG. 2. Shopping.Yahoo.Com Process—Known Art.

1. FIG. 2A is the home-page of Shopping.Yahoo.Com, listing the available categories of the site.
2. FIGS. 2B1 and 2B2 are sent from the site server, when and if "Women's" under the "Apparels and Accessories" is selected and clicked, listing the subcategories under the "Women's" category of the top-level "Apparels and Accessories" category.
3. FIG. 2C is sent from the site server, showing the list of subcategories under "Dresses and Skirts," when and if the "Dresses and Skirts" category on FIG. 2B1 is chosen and clicked.
4. When and if the "Dresses" subcategory is chosen and clicked, FIG. 2D is sent from the site-server, listing the subcategories under the "Dresses" category.
5. When and if the "Empire Waist" subcategory on FIG. 2D is chosen and clicked, FIGS. 2E1 and 2E2 are sent from the site server, indicating that 12 "Empire Waist Dresses" are found from the site, and list the first 10 of the 12 dresses found. The "Next" button can be clicked to see the "next" 10 items or the remaining items. In this case, there are only 2 items remaining.
6. When and if the V-Neck Dress is chosen and clicked in FIG. 2E1, FIG. 2F is sent from the site server, showing an enlarged picture of the dress, and the textual information regarding the item. The shopper, if so decide, can then choose the "color" and the size of the item to purchase. In our example, "A-Cadet Blue" is chosen for the color, and "Small" is chosen for the size, and then the "Order" button clicked.
7. FIG. 2G is brought forth from the site-server, showing the content of the "shopping cart," listing the V-Neck Dress just purchased. If the V-Neck Dress text-string is clicked, FIG. 2F is sent to the screen again, still with the red color of the dress, even though the order was placed for "A-Cadet Blue." The color order is indicated with the text-string in the "color" option box only.
8. When and if the "keep shopping" button at the end of the page is clicked, the Shopping.Yohoo.Com homepage, FIG. 2H is sent from the site server again, showing the primary shopping categories. The steps 2 through 7 are repeated. Here we choose "Women" again under the "Apparels and Accessories" category, FIGS. 2I1 and 2I2 are brought forth. Click the on the "Dresses and Skirts," FIG. 2I3 is sent from the site server, listing subcategories for "Dresses and Skirts." Click the "Skirts" category, the list of sub-categories under "Skirt" is sent from the site-server, as shown in FIG. 2J. The "long" category is chosen and clicked. FIGS. 2K1 and 2K2 is sent from the site server, showing 33 "long skirts" from 8 e-stores linked to Shopping.Yahoo.Com. We choose the 4$^{th}$ item, the "Floral Print Georgette Skirt," and click. The enlarged photo is sent to the shopper's computer from the site server, and shown in FIG. 2L. We select the desired size "6," and clicked "order."
9. The "shopping cart" FIG. 2M is brought forth from the site-server again, listing the added item. By clicking on the V-Neck Dress item, FIG. 2N (Same as FIG. 2F) is sent, showing your selection. By clicking on the Floral Print Georgette Skirt, size 6 as purchased, FIG. 2O is sent, here still showing the default size 4 before the selection, an error at the Yahoo site.

FIG. 3. The Shopping.Yahoo.Com "Search" Process—Known-Art.

5A: The Home Page listing 1$^{st}$ level categories.

5B: Lists the 2$^{nd}$ level categories under "Ovens, Ranges & Cooktops," sent from the site server when it is clicked on 5A.

5C: Sent from the site server when "Ranges" is clicked on 5B. The "scroll bar" at the right side of the page scrolls down to list more individual models. Clicking on the "View" button in each box representing a model, and wait, allows you to see a picture of that model sent from the site server.

5D: "Search" for "Appliances" by entering the word in the "search" box, and click, causes the site server to send a list of URLs (web addresses) containing a word "appliances" in its entry tag.

5E: "Search" for "Range" in the same fashion, brings a list of URLs containing the word "range" or "ranges." There are 9 pages of listing. Each page can be access by clicking on the page index at the top and the bottom of the list, one-at-a-time. Each item/entry on a page can be access by clicking on the entry, one at a time.

5F: "Search" result for "Monogram."

5G1 to 5G5: The listing of "Monogram" Products. You read the tables, and decide what interest you, if you can, and click on the "view" button to view the picture, which would link you to other details.

Figure 6E:
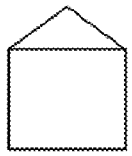
Figure 6F:
Figure 6J:
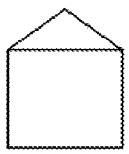

FIG. 6. The Home Portfolio.Com Process—Known-Art.

6A: The home page, showing the 1$^{st}$ level categories and the two ways for "search on the left of the page.

6B: Lists the 2$^{nd}$ level categories under the "Appliances" category." The page is sent from the site server to the shopper's computer screen, when "Appliances" is clicked on the home page 6A, or entered into the search boxes, and "Go" clicked.

6C: When "Ranges" is clicked, this page is loaded from the server to the computer screen, showing the number of "Ranges" under each Manufacturer, a total of 102 items. Clicking on ONE underlined text, brings you a listing of the products by that manufacturer.

6D: Is the result of "search" for "Ranges" within "all categories." The list states that there are 266 items, and lists the first 25 items on 3 pages. To see lists of more items, click on the page number index on the third of the 3 pages. The search resulted in more than twice the number of items identified with category path. It could be that the search result included the Hoods.

6E: When GE Monogram is clicked on 6C, this page is loaded to the screen. Information on each item is accessed through clicking on the item.

6F: When the first of the three "48" Professional Range" entries on 6E is clicked, the 1$^{st}$ level detail is show.

6G: The 1$^{st}$ level detail of the second "48" Professional Range." It is up to the shopper to read, and figure out the difference between the two entries on his/her own.

6H: The 3$^{rd}$ "48" Professional Range" entry.

6I: If you happen to know that a Range would need a Hood in practical use, you go back to the 1$^{st}$ level categories on the home page 6A, and look for the "Range Hoods."

6J: If the "GE Monogram" is clicked on the entry listings for "Range Hoods" on 6I, this page is loaded to the screen. From here, you click one item at a time, to "see more" about each item.

FIG. 7. The SharperImage.Com Virtual Reality 3D presentation, where the pointer can be used to rotate a still-object, if the needed software is installed on the shopper's computer.

Figure 8:
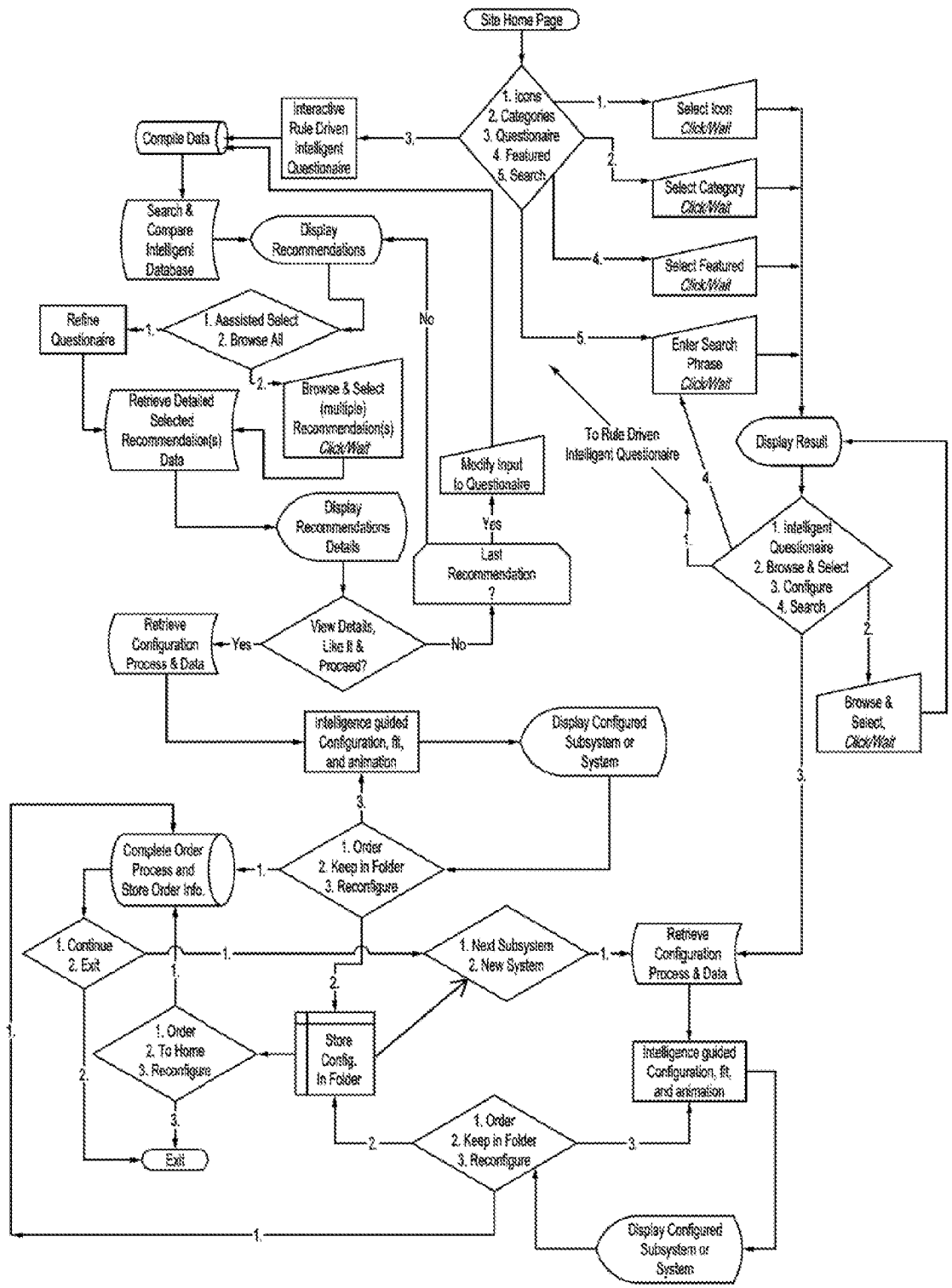

FIG. 8. The Present Invention, the Computer-Aided Intelligent Process Flow Chart.

FIG. 9. The Present Invention Example—the Appliance-Wizard.

9A-1 through 9A-3:
The Interactive, Intelligent, Process and Rule Driven Wizard Questionnaire and Process Steps.
9B: The "Computer Recommended" Kitchen.
9C: The Computer-Aided "Configuration Process."
9D: The Configuration Result and the Order Screen.

Figure 10:
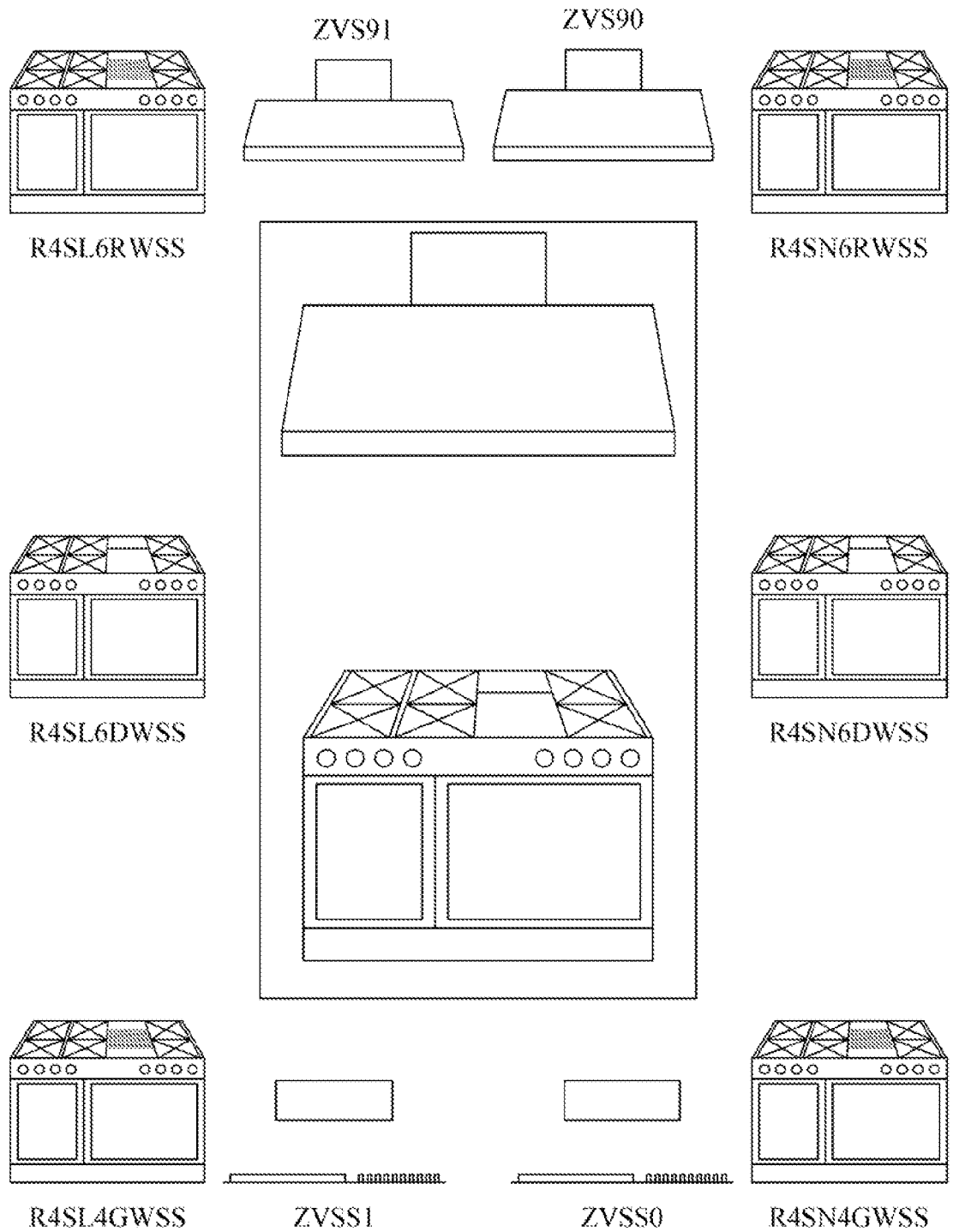

FIG. 10: The Inner Working of a temporary, instant and customer specific working database, the "Configuration Database." The Configuration Database contains only the configuration relevant data. It can either be sent to the shopper's computer, or reside at the server, or both. The configuration process/wizard searches for needed parts and information from this much smaller database, thus greatly improves the speed of the process and cuts data traffic and loading time.

Figure 11C1:
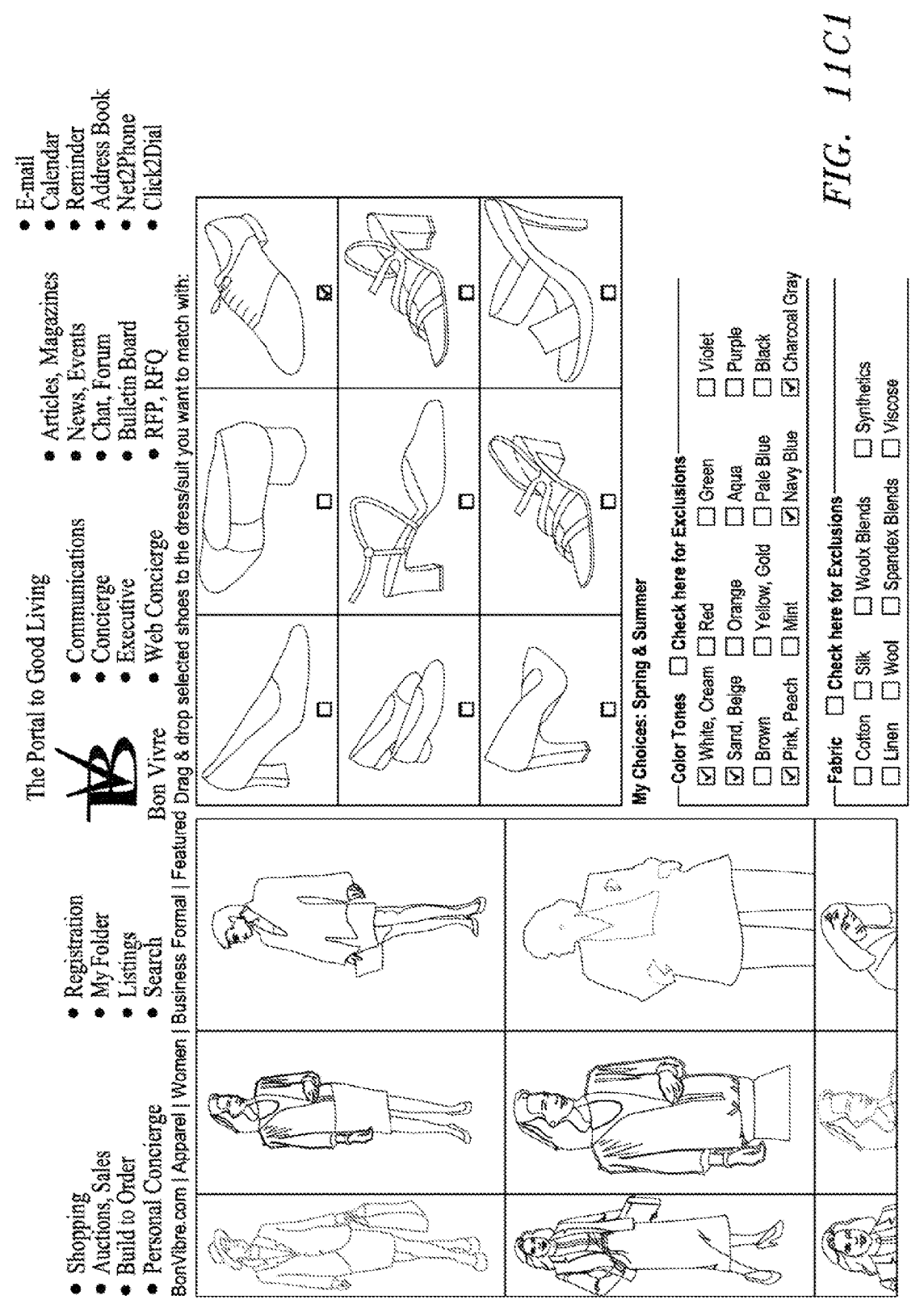
Figure 11D:
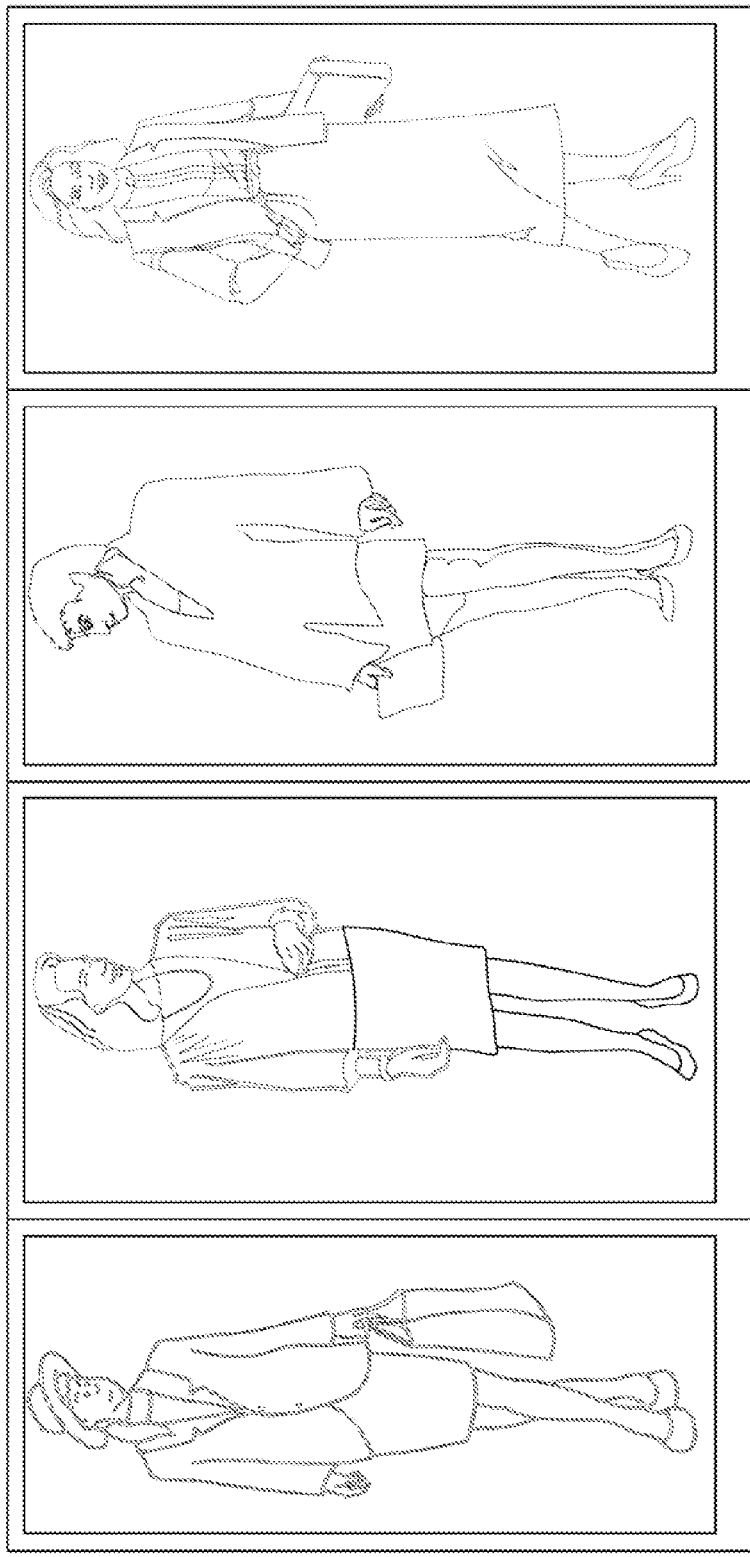

FIG. 11. The Present Invention Example—the Apparel-Wizard.

11A1 through 11A4: the Apparel Wizard Process Steps, Preference Selection Menu, and Data Entry Tables.

11B: Apparel Wizard as it appears on the web-site for a shopper who elects to shop for women's business-formal apparel. The "featured" items are already intelligently selected to suit the general taste of the shopper. The Wizard use the menu and data entry tables on the right side of the screen to solicit information and intent of the shopper's current shopping trip.

11C: An array of recommended items are sent by the Wizard to the shopper's computer screen based on the shopper's entry in 11B, as well as prior profiling knowledge of the shopper, and predetermined intelligence rules. In this example, the shopper requested Business-Formal apparel to be used for the Spring and Summer seasons, with colors in white/cream, beige/sand, pink/peach, navy, and charcoal or grey. The shopper also requested matching shoes.

11D: Accessory Configuration: On screen 11C, the shopper "drag and drop" the black/white shoes to match with the creamy-white pant-suit at the lower left corner of the array; changed the beige skirt suit on the upper left corner to pink, and accepts the suits and shoes configured by the Wizard as shown in 11C on the top row. The enlarged four selected ensembles are shown here. The detailed information and further animation and display is accessed by moving the cursor to one particular ensemble, or through clicking on the individual picture of that ensemble.

DETAILED DESCRIPTION OF THE INVENTION

The present invention, the Wizard, uses interactive, rule-driven, intelligent databases, algorithm, and software, including but not limited to the following: (1) Interactive, intelligent, guided, categorically organized, and process- and rule-driven questionnaires tagged and stored in a database, to be deployed for defining individual shopper's needs and tastes; (2) intelligent product database with detailed descriptions, and pre-determined rules of tagging and connectivity; (3) user-defined rules, (4) rule-base algorithms, (5) comparison software. The Wizard makes on-line merchandise recommendations and computer assisted selections tailored to each shopper's personal needs, tastes, and applications.

Figure 1:
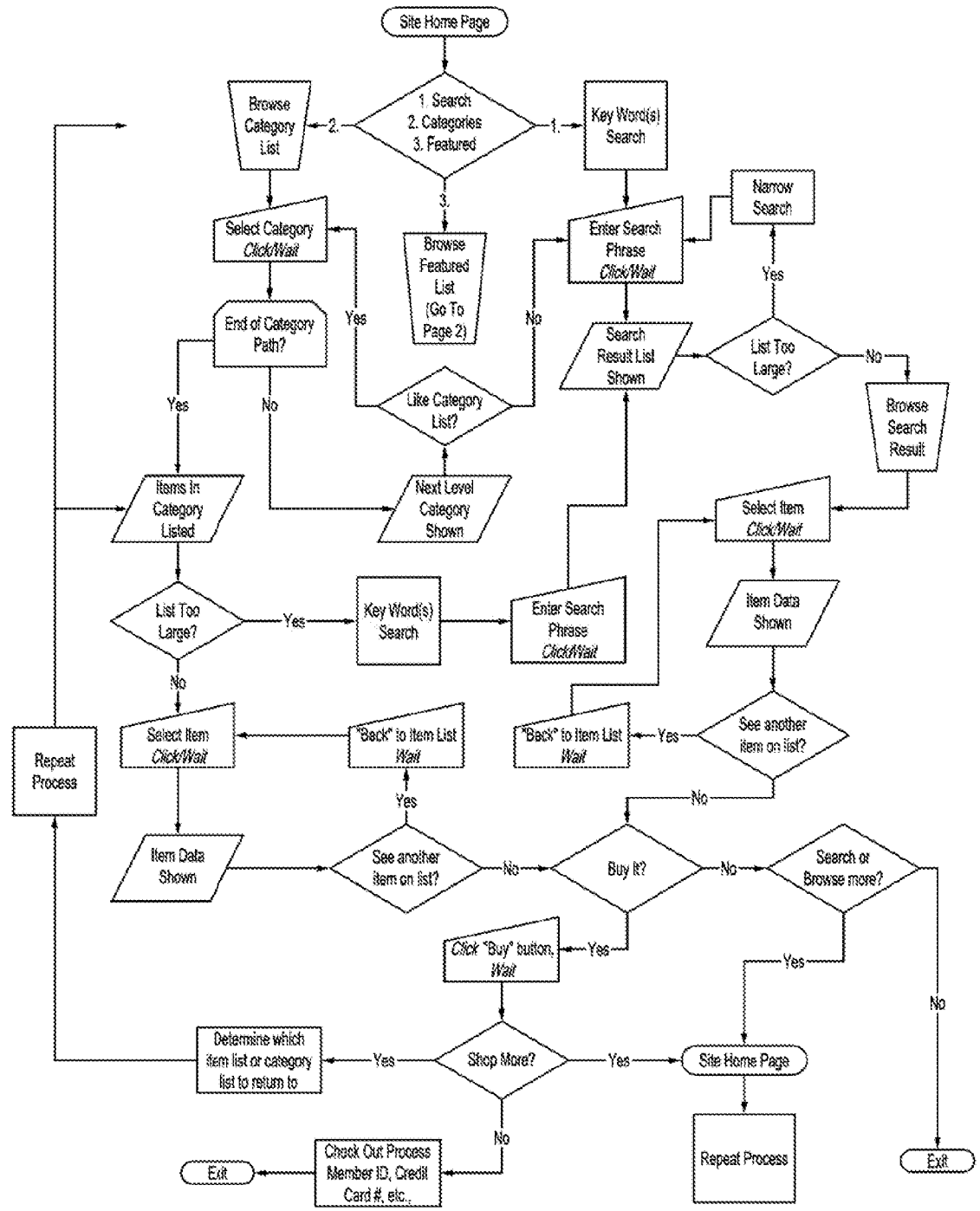
FIG. 1. The Known-Art Internet Commerce Process Flow Chart.
Figure 4A:
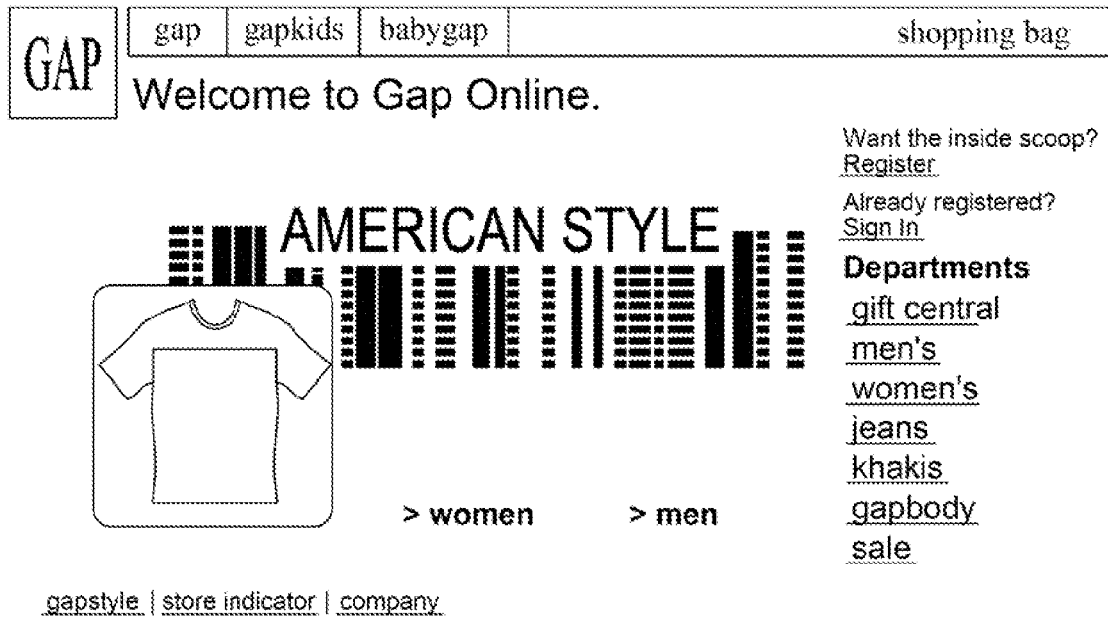
FIG. 4. The Gap.Com Process—Known-Art.
Figure 4B:
Figure 4D:
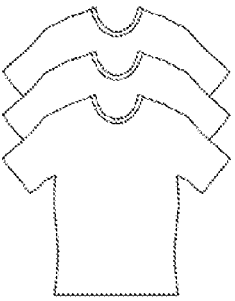
Figure 4F:
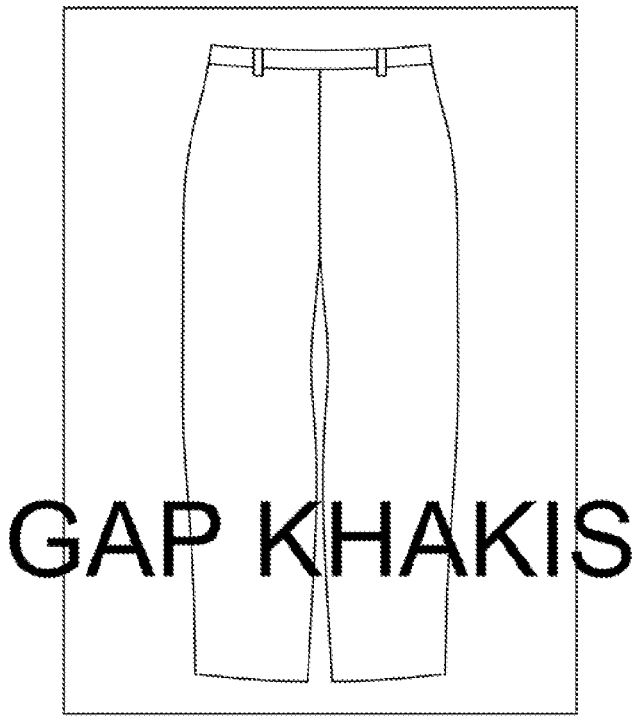
Figure 4G:
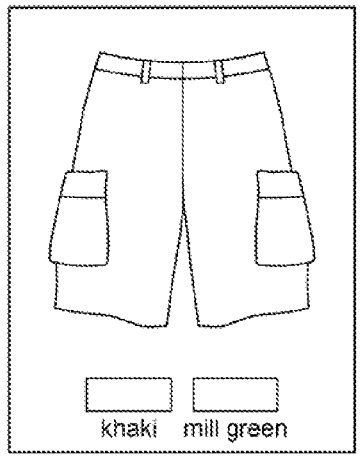

Recommended and selected items are further fit, matched, configured, animated, and displayed together on the computer screen for the shopper's review and approval. FIG. 8 shows the process flow of the present invention, in contrast to that of the known-art as shown in FIG. 1.

In the present invention, access to merchandize and information are offered through 5 options: the graphical icons, the category paths, the interactive, intelligent rule-driven questionnaire (the Wizard), the "Featured," and the "Search" function. The Wizard offers assistance again at various points, even when the Icons, Categories, Featured, and Search options were chosen at first.

The Wizard guides the intelligent information collection process with the shopper, compiles the information collected, search the intelligent database for items qualify the shopper's intent, make the recommendation by displaying the items on the computer screen for the shopper. The shopper can either elect to have the Wizard assist the selection process, or review and choose on his/her own. If the Wizard's assistance is chosen, the Wizard further explores and refines, the shoppers' intent, makes refined selections, retrieve all relevant information of selected items and their connected/related items to for a sub-database for the shopper, and display in a coordinated, organized, and comprehensible manner the refined selection recommendations. The shopper than determine whether to proceed. If affirmative, the Wizard begins to guide the shopper to configure a complete subsystem. If negative, the Wizard presents the questionnaire as answered before, and interactively works with the shopper to modify the questions and answers. When the configuration of a subsystem is completed and presented, the shopper can place the order immediately or save in a folder for revisit later, and proceed to configure another subsystem or system.

The current invention minimizes confusion, uncertainty, saves the numerous "clicks" and waits (for web page downloading) a shopper must go through in the known art process. Purchasing processes and decisions are made easier, more intelligent, more pleasurable, and more likely to be correct, thus reducing returns and wasted resources.

The embodiment of the invention entails the following:

(1) An "Interactive, intelligent, rule driven Wizard/Questionnaire database." The Wizard database is tagged, accessible, and linkable at various entry points by merchandise categories and/or merchandise types, and names.

(2) Merchandise items are grouped with its type-group database, and each described with proper keywords and detailed information. Also included are links to each item's matching items and accessories.

For example, an apparel database stores all apparel items, each with its pictures, detailed dimensions, material, make, style, color, brand, designer, pattern, usage, and descriptions, as well as artificial intelligence coordination rules of the matching colors, fabric, styles, cuts and descriptions matching apparel items and accessories. When applicable, links to other items specifically designed to match the particular items are also included—such as bags and shoes that are designed to match the dress, or ties and shirts that fit the suit.

A kitchen appliance database would link each appliance to its photographs, options, detailed descriptions, drawings, needed accessories, operating and installation manuals, as well as the list of pointers to other appliances that match the particular appliance in style, color, type, class, and operation, including links to suitable appliances from different manufacturers.

Cabinetry, countertop, sinks, faucets, and lighting databases would also link to, and complement the appliances database.

(3) A search engine, with comparison functions, artificial intelligence rules and user input rules for acceptation, rejection, recommendation, and change specifications.

(4) A layout and schematics program that adjusts, fits, and layout components according to external user specified parameter. For example, given dimensions of the room, walls, and placement of windows, selected appliances can be fit with selected counters and cabinets, layout made, and schematics and elevation diagrams made and presented.

(5) A separate database stores images of models for animation and morphing. For example, in the Apparel applications, such database would contain images of real models, or computer generated models, or morphed combination of both, of varying complexion, hair and eye colors, physical build, motion dynamics, etc., with description tags.

(6) An animation/graphics composition and morphing program with image and motion creation, manipulation, morphing, and input and output display capabilities that can select proper base images from the "models" database/library then alter, modify, or morph according to user input, to present the configured system/subsystem at the chosen settings.

(7) A video input, composition, editing, streaming and output program that serves to display assembled merchandize that are normally used in motion.

(8) A Temporary Working Database structured to accommodate the Wizard-Shopper active working data, such that the "system configuration" can be accomplished at the highest speed, and minimum data traffic time.

(9) A Dynamic Personal-Folders Database that stores customer profiling, history, and working data and links.

Figure 5A:
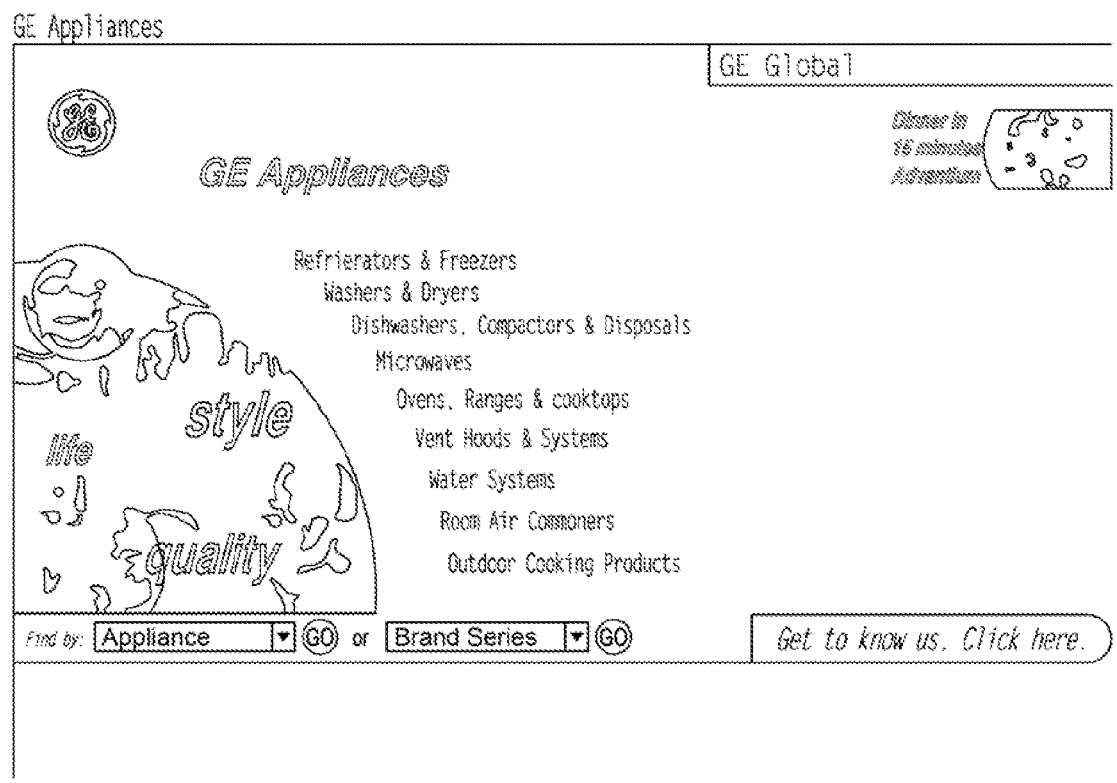
FIG. 5. The GE Appliance.Com Process—Known-Art.
Figure 5B:
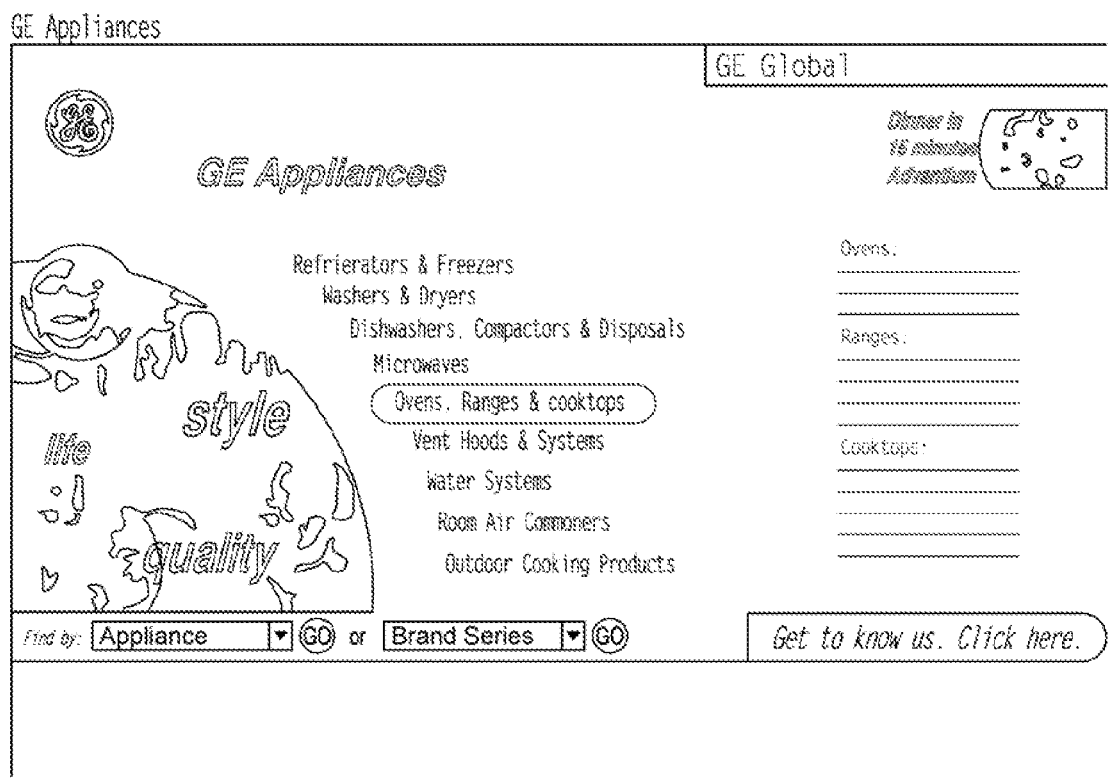

To further and concretely illustrate the current invention, an application of the invention to Appliance Shopping is shown in FIG. 9, in contrast to the processes found on GEAppliance.Com (FIG. 5) and HomePortfolio.Com (FIG. 6) sites for searching for Appliance information and dealers.

FIGS. 9A1 through 9A3 illustrates the Appliance-Wizard questionnaire and process steps. When a shopper enter the class of goods he/she is looking for, in the example here, Appliance(s) through either "search" or "category" paths, or clicking on an active icon in a graphical presentation, a specific Wizard is invoked from the Wizard/Questionnaire library/database. In this case, the Appliance-Wizard is invoked. The first set of relevant questions to guide the shopper in his/her quest is shown on the computer screen, and the shopper is prompted to high-light his/her selections by either checking the check boxes in front of each possible choices, or clicking on the text strings representing the choices. Shown here as bolded text-string when the shopper clicks each text-string representative of his/her intentions or desires of the quest.

| Appliance | | | |
|---|---|---|---|
| | | Kitchen | High-end, Extra features |
| Large | Single | Bath | |
| Small | Multiple | Laundry | Mid-range |
| | | House | |
| | | Other | Economy pricing & solid performance |

The Appliance Wizard presents the menu of large Kitchen Appliances for the shopper to select. The menu includes the "Whole Kitchen" for the shopper's convenience. After the interested appliances are selected, the Wizard presents the menu of the makers who produce the qualified appliances.

When the selection of the Maker(s) is completed, the Wizard presents the relevant menu of choices or questions as show in FIG. 9A2, in order to make intelligent and applicable recommendations. Since in our example, the shopper chose "Whole Kitchen," and GE monogram, the Wizard proceeds to ask for the preferred countertop and cabinet material, style, and color, and the approximated size, shape, and dimensions of the Kitchen. Based on the shopper input, the Wizard search the databases, performs preliminary floor plan, and presents the recommendation as shown in FIG. 9B. The Wizard prompts the shopper through the entire process in specification and configuration of the options of each appliance. The shopper clicks on an individual appliance on FIG. 9B to determine which appliance to configure first, next, etc.

FIG. 9C illustrates the Configuration Chart/Process for Ranges, 9D illustrates the Order Screen when the configuration process is completed. When the ordering process is completed, the Wizard presents FIG. 9B again for the shopper to choose the next appliances to configure. The shopper can also exit the process at any time, and the data up to that point would be saved in the Personal Folder for revisit later. During the configuration process, any similar and compatible appliances from different makers can be requested and selected.

FIG. 10 shows an instance of the inner working of the Wizard. When the shopper choose the GE Monogram Range as the product he/she wants to configure and purchase, the Wizard fetches all relevant GE Monogram Range options from the large database, and store these relevant data in a temporary "working database." This small database can be sent to the "client" computer—the shopper's computer, or retained on the site-server. The configuration process interacts with this much smaller, relevant, and local working-database, at a far faster speed, without having to traffic data through the network.

Applying the current invention to Apparels and Accessories, the Apparel Wizard solicits input from the shopper with well-designed menus and data entry tables. Based on the shopper input and pre-determined intelligence rules, the Wizard searches the product database, selects and recommends pertinent/qualified products and accessories. The Wizard also displays "ensembles" using a model or mannequin when requested. The model or mannequin is selected from the "models" database, and morphed to fit the shopper's descriptions when so requested. The model or mannequin can be further animated to walk, turn, run-way motions, sit, etc., on the shopper's computer screen for the shopper's viewing and approval.

A user/shopper is prompted to specify the types (dresses, suits, etc.), and applications (business formal, business casual, evening, day, town, cocktail, party, formal occasions, Spring and Summer, or Winter and Fall, etc.), preferred colors, fabric, style, designer, and make. Wearer's measurements and build, desired accessories, etc. can also be conveniently entered. Both "inclusion" and "exclusion" mechanism are used for the shopper's convenience in making preference selections. For example, if a shopper wishes to see all colors except orange, pink, and yellow, these colors can be "excluded," and vice versa. This "exclusion" mechanism can be implemented in many ways. For example, an "inclusion" or "exclusion" box can be "checked" before proceeding to make "checks" for color choices, as whether the color "checks" are either "inclusion" or "exclusion" checks. Or, an automated "select all" can be included, and the shopper can "uncheck" the "undesired" options to exclude them. Any preference selection step can be skipped, if the shopper wishes to keep the options open.

At any stage of input, an array of relevant and pertinent recommendations can be presented on the screen on demand. The array is narrowed or enhanced interactively, as the Wizard gains input from the shopper. Each ensemble can be altered, pieces moved from one ensemble to another, and color changed (if available), and re-assembled interactively. The "finished" and "approved" ensembles can be displayed, simulated and animated according to the shopper's choices. The shopper can also buy the whole ensemble, or any parts of the ensemble.

The can select interested items (e.g. a blouse or a dress) from the array, and further specify desired matching item(s) that many not be included in the array. For example when the shoes, bags, visors, hats, belts recommended and shown with the/a dress do not strike the shopper's fancy, the shopper can make requests to be shown other options. The Wizard searches the database based on the user's input, in combination with pre-determined, trained intelligence rules. The user can over-ride the pre-determined intelligence rules, if so desired. For example, if a user selects a light blue shirt, and specifies green for the slacks, the Wizard would respond to the user that green is not a recommended color for matching to light blue. The user can then decide override the Wizard and stay with his/her selection, change color specification, or leave the color and style selection to the intelligence rules the Wizard uses. The Wizard assembles a shopper specific "working database," such that the configuration, display, and change processes are performed quickly with this personally narrowed and selected working database. If the final ensembles need minor alteration in the cut according to the user measurements, the Wizard issues an alteration alert.

At user request, and based on the user input of the wearer's descriptions, a model can be selected or generated, wearing the items selected, and animated to walk across the computer screen, turn, sit, and stand, or make sports movements as appropriate, such as golfing or tennis.

The present invention can be applied to the personalized gathering/assembly of information, procurement, configuration, and packaging of all types products and services of all manners over a private or public electronic/computer network.

The present invention is implemented using software which can be written in many programming languages, or implemented with many web-page generation tools. The present invention can be used on a global or local computer network, on a personal computer, on viewable storage media such as a CD or DVD ROM, on a wireless telephone, on a wireless personal assistant such as a Palm Pilot®, or on any type of wired or wireless device that enables digitally stored information to be viewed. Also, information displayed and viewed using the present invention can be printed, stored to other storage medium, and electronically mailed to third parties.

Numerous modifications to and alternative embodiments of the present invention will be apparent to those skilled to the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claims is reserved.

What is claimed is:

1. An electronic system for purchasing merchandise online using a computer having a display device, comprising:
    means for selecting and purchasing merchandise, by a user, online; and
    an interactive wizard guide, selectively and optionally deployed by the user, for making online merchandise recommendations and computer-assisted selections tailorized to said user, said interactive wizard guide comprising:
        means for prompting the user to specify preferences regarding at least one type of merchandise of interest to said user, said prompting means includes means for prompting the user to answer a plurality of questions,
        means for receiving the preferences and answers to the plurality of questions to create a user profile,
        means for searching in and retrieving data from at least one database using predetermined intelligence rules together with said user profile to determine said recommendations and said selections of said merchandise and accessories to said merchandise,
        means, in response to said retrieving means, for displaying on said display device, said recommendations and said selections of said merchandise and said accessories, and
        means for overriding said interactive wizard guide.

2. The system according to claim 1, wherein:
    said prompting means comprises:
        a questionnaire database that prompts the user to answer a plurality of questions to specify the user preferences with regard to the at least one type of merchandise;
    said searching and retrieving means comprises:
        a search engine using comparison functions, said intelligence rules and user input rules;
    said wizard guide further comprising:
        a merchandise database having textual and graphical data regarding the at least one type of merchandise, the merchandise database using said intelligence rules to match the merchandise with the accessories and having links to databases for other types of merchandise;
        a layout and schematics program for preparing and displaying a floor plan depicting merchandise selected by the user, wherein the dimensions and other architectural features of the floor plan are provided by the user;
        a models database having images of models;
        an animation and morphing program for providing image and motion creation and morphing to models selected from the model database by the user, wherein the selected models wear merchandise selected by the user, the user able to alter the models and the models' features;
        a temporary working database in which the user works while using the system; and
        a personal folder database for storing the data from the temporary working database and said user profile.

3. The system according to claim 1, wherein the user specifies the user preferences by either checking at least one box in front of a possible choice or clicking on a text string representing that choice.

4. The system according to claim 1, further comprising:
means for providing the user with names of a plurality of vendors for the merchandise recommended to the user.

5. The system according to claim 4, further comprising:
means for enabling the user to select a vendor from the plurality of vendors;
means, responsive to the selected vendor, for prompting the user to specify additional information regarding products of the selected vendor.

6. The system according to claim 1, further comprising:
means for preparing and displaying, based on specifications provided by the user, a recommended floor plan showing each item of merchandise selected by the user.

7. The system according to claim 6, further comprising:
means for prompting the user to examine and specify specifications and configurations for each merchandise item.

8. The system according to claim 7, wherein the user uses an input device to click on an individual item of merchandise shown on the display device to determine which goods to configure.

9. The system according to claim 1, wherein the retrieved data is stored in a local database which is smaller then the at least one database, thereby enabling the user to interact with the system without having to traffic data through a network and thus at a faster speed than would be possible if the user had to traffic data through the network.

10. The system according to claim 1, wherein the prompting means includes menus and data entry tables to solicit said preferences from the user.

11. The system according to claim 1, wherein the interactive wizard guide includes: means for selecting a model from a model database and morphing the model using specifications provided by the user.

12. The system according to claim 11, wherein the interactive wizard guide uses an animation graphics composition morphing program to cause the model to be animated and to engage in a full range of movement displayed on the display device.

13. The system according to claim 1, wherein the interactive wizard guide includes both inclusion and exclusion mechanisms to assist the user in making preference selections.

14. The system according to claim 1, wherein the interactive wizard guide includes an automated select all feature wherein all possible preferences are automatically included unless excluded by the user.

15. The system according to claim 1, wherein at any stage of interaction with the system, an array of recommendations can be presented on the display device, the array able to be narrowed or enhanced interactively as the interactive wizard guide gains input from the user.

16. The system according to claim 1, wherein if the merchandize is clothing, the displaying means of the interactive wizard guide can display a plurality of ensembles of clothing for viewing by the user, each ensemble able to be altered with ensemble items moved from one ensemble to another, colors and patterns changed, and reassembled interactively, the ensembles able to be displayed using models and animation specified by the user.

17. The system according to claim 16, wherein the user can purchase an entire ensemble, or any part of the ensemble.

18. The system according to claim 15, wherein the user can specify additional desired matching items to be retrieved and displayed for viewing that may not be included in the array.

19. The system according to claim 1, wherein the override means includes means to allow the user to override a predetermined intelligence rule used by the interactive wizard guide to make recommendations to the user.

20. The system according to claim 19, wherein the predetermined intelligence rule pertains to determining whether two colors match.

21. The system according to claim 1, wherein the retrieved data is stored in both (1) a local database of a server, and (2) a second database on the server which is smaller then the at least one database, thereby enabling the user to interact with the system without having to traffic data through a network and thus at a faster speed than would be possible if the user had to traffic data through the network.

* * * * *